United States Patent
Yoon et al.

(10) Patent No.: US 9,939,674 B2
(45) Date of Patent: Apr. 10, 2018

(54) LIQUID CRYSTAL DISPLAY DEVICE

(71) Applicant: Samsung Display Co., Ltd., Yongin, Gyeonggi-Do (KR)

(72) Inventors: Seok Kyu Yoon, Asan-si (KR); Hee June Kwak, Yongin-si (KR); Eun Ju Kim, Suwon-si (KR); Sun Hwa Lee, Hwaseong-si (KR); Yun Seok Lee, Asan-si (KR); Jun Pyo Lee, Asan-si (KR); Sang-Uk Lim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 442 days.

(21) Appl. No.: 14/566,556

(22) Filed: Dec. 10, 2014

(65) Prior Publication Data

US 2016/0033813 A1 Feb. 4, 2016

(30) Foreign Application Priority Data

Jul. 31, 2014 (KR) ........................ 10-2014-0098507

(51) Int. Cl.
*G02F 1/1335* (2006.01)
*G02F 1/133* (2006.01)
(Continued)

(52) U.S. Cl.
CPC ....... *G02F 1/133514* (2013.01); *G02B 5/201* (2013.01); *G02F 1/13306* (2013.01);
(Continued)

(58) Field of Classification Search
CPC ......... G02F 1/133514; G02F 1/134309; G02F 1/13306
See application file for complete search history.

(56) References Cited

U.S. PATENT DOCUMENTS

| | | | |
|---|---|---|---|
| 6,124,909 | A | 9/2000 | Miyashita et al. |
| 7,362,393 | B2 | 4/2008 | Kim et al. |

(Continued)

FOREIGN PATENT DOCUMENTS

| | | |
|---|---|---|
| CN | 1776467 A | 5/2006 |
| CN | 102654593 A | 9/2012 |

(Continued)

OTHER PUBLICATIONS

EP15178829.6, European Search Report, dated Sep. 17, 2015, (8 pages).

*Primary Examiner* — Joseph L Williams
(74) *Attorney, Agent, or Firm* — Innovation Counsel LLP

(57) ABSTRACT

A liquid crystal display device that allows efficient luminance control is presented. The device includes: first, second, and third color pixel areas; a first substrate and a second substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer disposed between the first substrate and the second substrate, wherein the first color pixel area includes a first transparent region at which the first color filter is not disposed, and a ratio of the first transparent region of the first color pixel area to the first color pixel area is in a range of $\frac{1}{1000}$ to $\frac{1}{2}$, inclusive.

34 Claims, 40 Drawing Sheets

(51) Int. Cl.
    *G02F 1/1343*    (2006.01)
    *G02B 5/20*      (2006.01)
    *G02B 5/22*      (2006.01)

(52) U.S. Cl.
    CPC .......... *G02F 1/134309* (2013.01); *G02B 5/22* (2013.01); *G02F 2001/134345* (2013.01); *G02F 2201/52* (2013.01); *G02F 2203/01* (2013.01)

(56) References Cited

U.S. PATENT DOCUMENTS

| | | |
|---|---|---|
| 2007/0008462 A1 | 1/2007 | Yang et al. |
| 2013/0050618 A1 | 2/2013 | Lo et al. |
| 2013/0077284 A1 | 3/2013 | Chang et al. |
| 2013/0135567 A1 | 5/2013 | Lee et al. |
| 2013/0141481 A1 | 6/2013 | Peng et al. |

FOREIGN PATENT DOCUMENTS

| | | |
|---|---|---|
| JP | 2007033744 A | 2/2007 |
| JP | 2007-206230 | 8/2007 |
| JP | 5420632 | 11/2013 |
| KR | 1020040043865 A | 5/2004 |
| KR | 1020050064176 A | 6/2005 |
| KR | 1020060036131 A | 4/2006 |
| KR | 1020070070030 A | 7/2007 |
| KR | 1020090036258 A | 4/2009 |
| KR | 1020090090132 A | 8/2009 |
| KR | 1020110031010 A | 3/2011 |
| KR | 1020110101894 A | 9/2011 |
| WO | 2014002982 A1 | 1/2014 |

LIQUID CRYSTAL DISPLAY DEVICE

CROSS-REFERENCE TO RELATED APPLICATION

This application claims priority to and the benefit of Korean Patent Application No. 10-2014-0098507 filed in the Korean Intellectual Property Office on Jul. 31, 2014, the entire contents of which are incorporated herein by reference.

BACKGROUND (a) Technical Field

The present invention relates to a liquid crystal display device, and more particularly, to a liquid crystal display device which can have improved luminance.

(b) Description of the Related Art

As one of the most widely used flat panel displays today, a liquid crystal display device (LCD) includes two display panels on which field generating electrodes such as a pixel electrode and a common electrode are formed, and a liquid crystal layer interposed between the two display panels. The liquid crystal display device displays an image by generating an electric field on a liquid crystal layer by applying a voltage to the field generating electrodes, determining alignment directions of liquid crystal molecules of the liquid crystal layer using the generated field, and controlling polarization of incident light.

Since such a liquid crystal display device is not self-emissive, a light source is required. In this case, the light source may be a white light source for emitting white light, and the light source may be a separately provided artificial light source or a natural light source. The artificial light source used in the liquid crystal display device includes a light emitting diode (LED), a cold cathode fluorescent lamp (CCFL), and an external electrode fluorescent lamp (EEFL). The artificial light source is disposed at a back surface or a side surface of the liquid crystal display device to supply light.

In general, a color filter is employed for the liquid crystal display device to facilitate display of red, green, and blue. While the light supplied from the light source passes through a color filter, some wavelengths of light are absorbed into the color filter, generating loss of a light amount. Accordingly, a liquid crystal display device further including white pixels has been recently developed to compensate thus-reduced luminance.

However, this liquid crystal display device further including the white pixel is required to include a driving circuit for additionally driving the white pixel.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display device capable of improving luminance without adding a white pixel.

An exemplary embodiment of the present invention provides a liquid crystal display device including: a first color pixel area, a second color pixel area, and a third color pixel area; a first substrate and a second substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer disposed between the first substrate and the second substrate, wherein the first color pixel area includes a first transparent region from which the first color filter is absent, and a ratio of the first transparent region of the first color pixel area to the first color pixel area is in a range of $1/1000$ to $1/2$, inclusive.

The first transparent region may display white color.

The liquid crystal display device may further include an overcoat disposed on the first color filter, the second color filter, the third color filter, and the first transparent region.

The liquid crystal display device may further include a transparent member disposed in the first transparent region.

The second color filter and the third color filter may be disposed in the first transparent region.

In the first transparent area, the second color filter may be disposed adjacent to at least a part of the third color filter, and the first color filter may be disposed adjacent to at least a part of the second color filter.

The liquid crystal display device may further include a pixel electrode formed in each of the first, second, and third color pixel areas, wherein the pixel electrode may be formed to have a shape obtained by connecting two first parallelograms arranged symmetrically to each other, and the first transparent region may be formed of a second parallelogram including sides that are parallel with either one of the two first parallelograms.

The first transparent region may overlap with an upper right portion of the pixel electrode.

The first transparent region may overlap with a lower portion of the pixel electrode.

The first transparent region may be formed of two third parallelograms including sides that are parallel with sides of the two first parallelograms.

The first transparent region may overlap with a right portion of the pixel electrode.

The first, second, and third color pixel areas may include a plurality of domains, and the first transparent region may overlap with at least one of the plurality of domains.

The liquid crystal display device may further include a plurality of the first, second, and third color pixel areas, and the first transparent region may be disposed at different domains in an adjacent first color pixel area.

The plurality of domains may be vertically or horizontally disposed, or are disposed in a matrix form.

The first color pixel area may be adjacent to the second color pixel area, and the second color pixel area may include a second transparent region from which the second color filter is absent.

The first transparent region may be disposed at a first domain and a second domain of the first color pixel area, and the second transparent region may be disposed at a third domain and a fourth domain of the second color pixel area.

The liquid crystal display device may further include a pixel electrode formed in the first color pixel area, and the pixel electrode may include a first subpixel electrode that overlaps with the first color filter, and a second subpixel electrode that overlaps with the first transparent region.

Different data voltages may be applied to the first subpixel electrode and the second subpixel electrode.

The first color may be one of red, green, and blue.

The second color pixel area may include a second transparent region at which the second color filter is not formed, or the third color pixel area may include a third transparent region from which the third color filter is absent.

An embodiment of the present invention provides a liquid crystal display device including: a first color pixel area, a second color pixel area, and a third color pixel area; a first substrate and a second substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer disposed between the first substrate and the second substrate, wherein the second color filter is disposed in the first transparent region.

The third color filter may be further disposed in the first transparent region, and, in the first transparent area, the second color filter may be disposed adjacent to at least a part of the third color filter, while the first color filter may be disposed adjacent to at least a part of the second color filter.

The second color pixel area may include a second transparent region from which the second color filter is absent, and the first color filter may be disposed in the second transparent region.

The first color may be red and the second color may be green.

The first color may be red and the second color may be blue.

The first color may be green and the second color may be blue.

The second color pixel area may include a second transparent region from which the second color filter is absent, the third color filter may be disposed in the second transparent region, the third color pixel area may include a third transparent region from which the third color filter is absent, and the first color filter may be disposed in the third transparent region.

The first color may be red, the second color may be green, and the third color may be blue.

A ratio of the first transparent region of the first color pixel area to the first color pixel area is in a range of 1/1000 to 1/2, inclusive.

The liquid crystal display device may further include a white pixel area, and at least one of the first color filter, the second color filter, and the third color filter may be disposed in the white pixel area.

The second color pixel area may include a second transparent region from which the second color filter is absent, and the second transparent region may display a white color.

The liquid crystal display device may further include an overcoat disposed on the first color filter, the second color filter, the third color filter, and the first transparent region.

The liquid crystal display device may further include a transparent member disposed in the white pixel areas.

The second color pixel area may include a second transparent region from which the second color filter is absent, the second transparent region may display a white color, the third color pixel area may include a third transparent region from which the third color filter is absent, and at least one of the first color filter and the second color filter may be disposed in the third transparent region.

An embodiment of the present invention provides a liquid crystal display device including: a first color pixel area, a second color pixel area, and a third color pixel area; a first substrate and a second substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer disposed between the first substrate and the second substrate, wherein the first color pixel area includes a first transparent region from which the first color filter is absent, the first, second, and third color pixel areas include a plurality of domains, and the first transparent region is disposed at different domains in an adjacent first color pixel area.

The liquid crystal display device may further include a pixel electrode formed in each of the first, second, and third color pixel areas, and the pixel electrode may receive a data voltage that is lower than that of the first subpixel electrode and the first subpixel electrode.

The first transparent region may overlap with the second subpixel electrode.

Each of the first, second, and third color pixel areas may include a first subpixel area at which the first subpixel electrode is formed and a second subpixel area at which the second subpixel electrode is formed, and each of the first subpixel area and the second subpixel area may include the plurality of domains.

The first color pixel area may be adjacent to the second color pixel area, and the second color pixel area may include a second transparent region from which the second color filter is absent.

The first transparent region may be disposed at the first domain and the second domain of the first color pixel area, and the second transparent region may be disposed at the third domain and the fourth domain of the second color pixel area.

The first color pixel area may be adjacent to the second color pixel area, the second color pixel area may include a second transparent region from which the second color filter is absent, and the second transparent region may be disposed in the second subpixel area.

The second subpixel area of the first color pixel area and the second subpixel area of the second color pixel area may be diagonally disposed.

The first transparent region may be formed to have a shape that is adjacent to the first color filter, and the second transparent region may be formed adjacent to the second color filter.

Each of the first and second color filters may be formed such that at least one of the color filters has a bar shape.

The second color pixel area and the third color pixel area may be adjacent to each other, the third color pixel area may include a third transparent region at which the third color filter is disposed, and the third transparent region may be disposed at the second subpixel area.

An area of the third transparent region may be different from that of the first transparent region or the second transparent region.

The third color may be blue, the first color may be red, and the second color may be green.

The first transparent region may overlap with the first subpixel electrode.

The plurality of domains may be vertically or horizontally disposed, or disposed in a matrix form.

An embodiment of the present invention provides a liquid crystal display device including: a first color pixel area, a second color pixel area, and a third color pixel area; a first substrate and a second substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer disposed between the first substrate and the second substrate, wherein the first color pixel area includes a first transparent region at which the first color filter is not disposed, and wherein the pixel electrode includes a first subpixel electrode overlapping with the first color filter, and a second subpixel overlapping with the first transparent region, and wherein different data voltages are applied to the first subpixel electrode and the second subpixel electrode.

According to the exemplary embodiments of the present invention, the liquid crystal display device has the following effects.

According to the exemplary embodiments, it is possible to improve the luminance by inserting a white pattern into at least one of the red pixel, the green pixel, and the blue pixel without adding a white pixel.

Further, it is possible to display precise colors on a screen by moving color coordinates through adding a color filter of which color is different from that of each pixel.

DETAILED DESCRIPTION OF THE EMBODIMENTS

Figure 1:
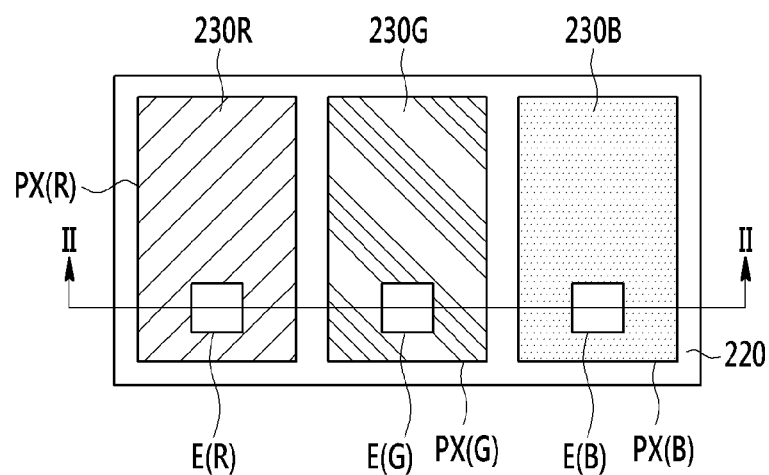
FIG. 1 is a top plan view illustrating a liquid crystal display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display device according to an exemplary embodiment of the present invention will be described with reference to FIG. 1 and FIG. 2.

Figure 2:
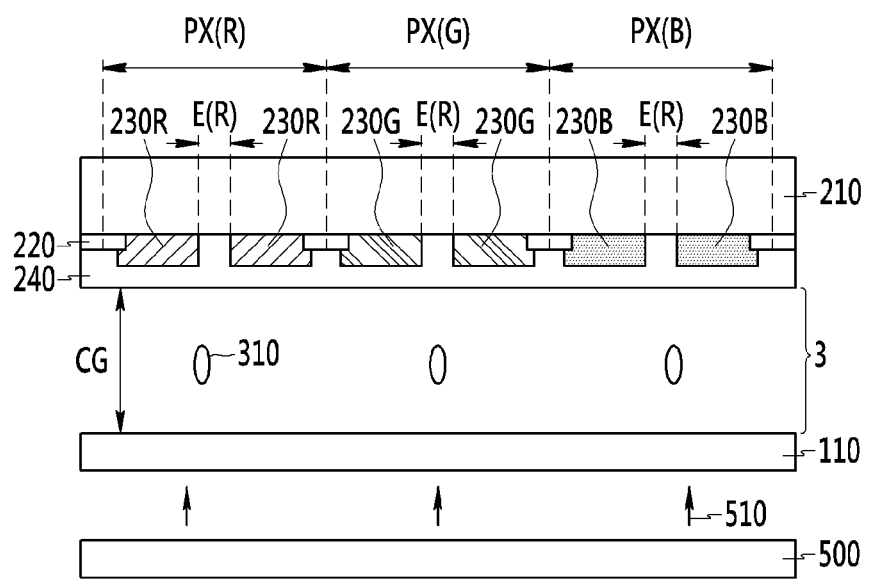
FIG. 2 is a cross-sectional view illustrating the liquid crystal display according to the exemplary embodiment of the present invention taken along the line II-II of FIG. 1.

FIG. 1 is a top plan view illustrating a liquid crystal display device according to an exemplary embodiment of the present invention, and FIG. 2 is a cross-sectional view illustrating the liquid crystal display according to the exemplary embodiment of the present invention taken along the line II-II of FIG. 1.

The liquid crystal display device according to the present exemplary embodiment includes a first substrate 110 and a second substrate 210 disposed to face each other, and a liquid crystal layer 3 disposed between the first substrate 110 and the second substrate 210.

The first substrate 110 and the second substrate 210 may be formed of glass, plastic, or the like. The liquid crystal layer 3 may include a plurality of liquid crystal molecules 310, and may be formed as a positive type or a negative type.

A light source 500 may be disposed on a rear surface of the first substrate 110. The light source 500 may include a light emitting diode (LED) to supply light 510. An orientation of the liquid crystal molecules 310 of the liquid crystal layer 3 is determined according to an electric filed generated between the first substrate 110 and the second substrate 210, and an amount of light that passes through the liquid crystal layer 3 is varied according to the orientation of the liquid crystal molecules 310. A plurality of color filters 230R, 230G, and 230B are disposed on the second substrate 210. When the light passing through the liquid crystal layer 3 passes through the color filters 230R, 230G, and 230B, some light passes therethrough and the other light is absorbed thereinto.

The liquid crystal display device may include a plurality of pixel areas PX(R), PX(G), and PX(B), and the pixels areas may be divided into a first color pixel area PX(R), a second color pixel area PX(G), and a third color pixel area PX(B). The first color pixel area PX(R), the second color pixel area PX(G), and the third color pixel area PX(B) respectively serve to display different colors, and their colors may be combined into a white color. For example, the first color pixel area PX(R), the second color pixel area PX(G), and the third color pixel area PX(B) may respectively display red, green, and blue colors.

However, the present invention is not limited thereto. For example, the first color pixel area PX(R), the second color pixel area PX(G), and the third color pixel area PX(B) may respectively display cyan, magenta, and yellow colors.

The color filters 230R, 230G, and 230B are disposed in the respective pixel areas PX(R), PX(G), and PX(B) on the second substrate 210. Specifically, the first color filter 230R, the second color filter 230G, and the third color filter 230B are respectively disposed in the first color pixel area PX(R), the second color pixel area PX(G), and the third color pixel area PX(B). The first color filter 230R may serve as a red filter for exclusively permitting red light of the white light to pass therethrough. The second color filter 230G may serve as a green filter for exclusively permitting green light of the white light to pass therethrough. The third color filter 230B may serve as a blue filter for exclusively permitting blue light of the white light to pass therethrough.

The first color pixel area PX(R) includes a first transparent region E(R) at which the first color filter 230R is not formed. Most wavelengths of light supplied from a light source may pass through the first transparent region E(R). As a result, white light passes through the first transparent region E(R), thereby displaying a white color. When viewed from the top, the first color filter 230R surrounds the first transparent region E(R).

However, the present invention is not limited thereto, and the first transparent region E(R) may be formed at an edge of the first color pixel area PX(R).

The first color filter 230R filters some wavelengths of white light, and thus a luminance of the light that is transmitted is lower than that of the white color. In the present exemplary embodiment, the first transparent region E(R), which permits all the wavelengths of white light, is formed in the first color pixel area PX(R), thereby increasing the luminance. Further, it is possible to simplify a driving circuit and accomplish cost reduction by forming a region at which the white color can be displayed, as compared with the case of additionally forming a white pixel.

A ratio of the first transparent region E(R) to the first color pixel area PX(R) is in a range of $\frac{1}{1000}$ to $\frac{1}{2}$, inclusive. The "first color pixel area PX(R)" is the entire rectangular area, not just the area that is shaded in FIG. 1. The first color filter 230R is formed in the shaded area. Thus, the first color pixel area PX(R) includes an area in which the first color filter 230R is formed and the first transparent region E(R). If the ratio of the first transparent region E(R) is smaller than $\frac{1}{1000}$, luminance enhancement is hardly obtained, and the process is not easily performed. If the ratio of the first transparent region E(R) exceeds $\frac{1}{2}$, the corresponding pixel may not appropriately display a desired color.

For example, when the first color is red, the first color pixel area PX(R) displays red diluted with white, i.e., pale red.

The second color pixel area PX(G) may include a second transparent region E(G) at which the second color filter 230G is not formed. The "second color pixel area PX(G)" is the entire rectangular area, not just the area that is shaded in FIG. 1. The second color filter 230G is formed in the shaded area. Thus, the second color pixel area PX(G) includes an area in which the second color filter 230G is formed and the second transparent region E(G).

Similarly, the third color pixel area PX(B) may include a third transparent region E(B) at which the third color filter 230B is not formed. The "third color pixel area PX(B)" is the entire rectangular area, not just the area that is shaded in FIG. 1. The third color filter 230B is formed in the shaded area. Thus, the third color pixel area PX(B)) included an area in which the third color filter 230B is formed and the third transparent region (B)).

In FIG. 1, the pixel areas PX(R), PX(G), and PX(B) are illustrated as rectangular areas that include the transparent regions E(R), E(G), and E(B), respectively, but the present invention is not limited thereto. For example, in some embodiments, the first color pixel area PX(R) may include the first transparent region E(R), and there may be no transparent region (i.e., regions with color filters removed) in the second color pixel area PX(G) or the third color pixel area PX(B). In yet other embodiments, the second color pixel area PX(G) may include the second transparent region E(G), but there may be no transparent region formed in the first color pixel area PX(G) or third color pixel area PX(B). Alternatively, the first color pixel area PX(R) and the second color pixel area PX(G) may respectively include the first transparent region E(R) and the second transparent region E(G), but there may be no transparent region formed in the third color pixel area PX(B). Various modifications are possible in addition to the aforementioned examples.

A light-blocking member 220 may be further formed at boundaries between the first color pixel area PX(R), the second color pixel area PX(G), and the third color pixel area PX(B). The light-blocking member 220 may be disposed at the boundaries between the pixel areas PX(R), PX(G), and PX(B) to prevent color mixture, light leakage, and the like.

An overcoat 240 may be further disposed on the first color filter 230R, the second color filter 230G, and the third color filter 230B. The overcoat 240 may also be disposed on the first transparent region E(R), the second transparent region E(G), and the third transparent region E(B). The overcoat 240 may serve to planarize a top surface of the second substrate 210. This planarization performed by the overcoat 240 makes the distance between the first substrate 110 and the second substrate 210 constant. As a result, the liquid crystal display device according to the present exemplary embodiment has a constant cell gap CG.

Next, a liquid crystal display device according to an exemplary embodiment of the present invention will be described in more detail with reference to FIG. 3 to FIG. 5.

Figure 3:
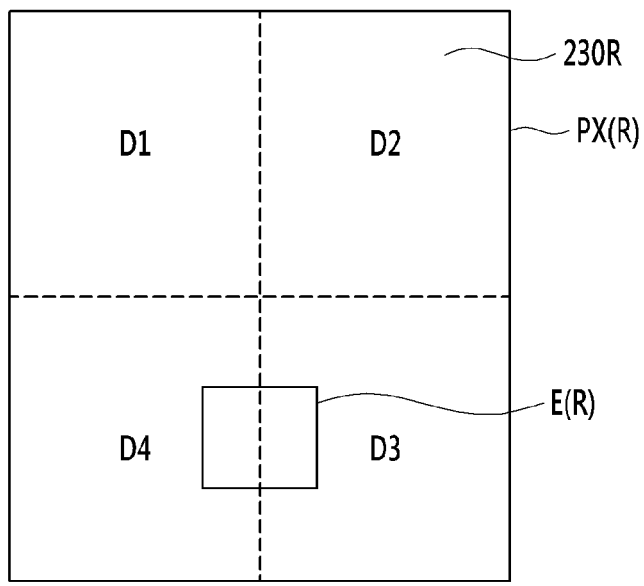
FIG. 3 is a top plan view illustrating a domain included in a pixel area of a liquid crystal display device according to an exemplary embodiment of the present invention.
Figure 4:
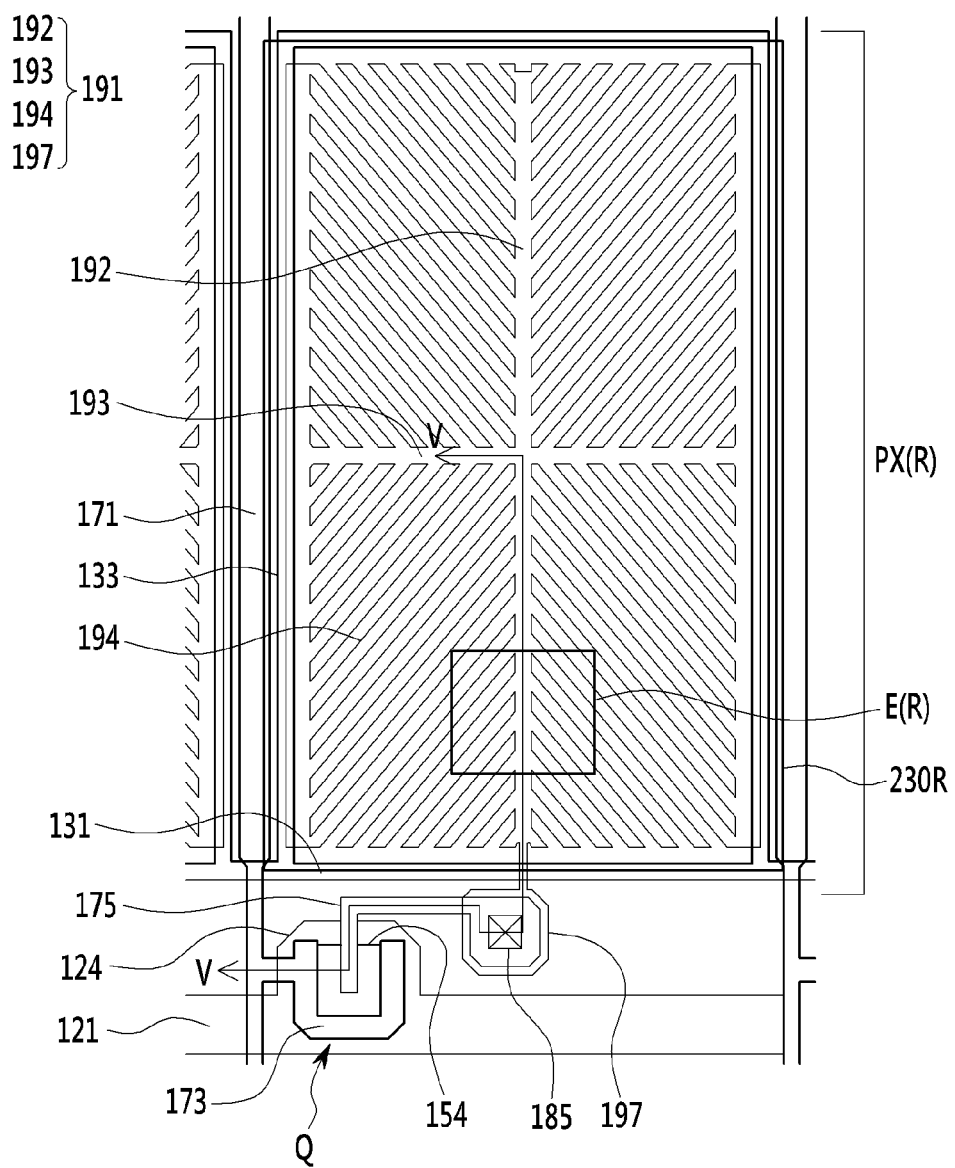
FIG. 4 is a top plan view illustrating a pixel area of a liquid crystal display device according to an exemplary embodiment of the present invention.
Figure 5:
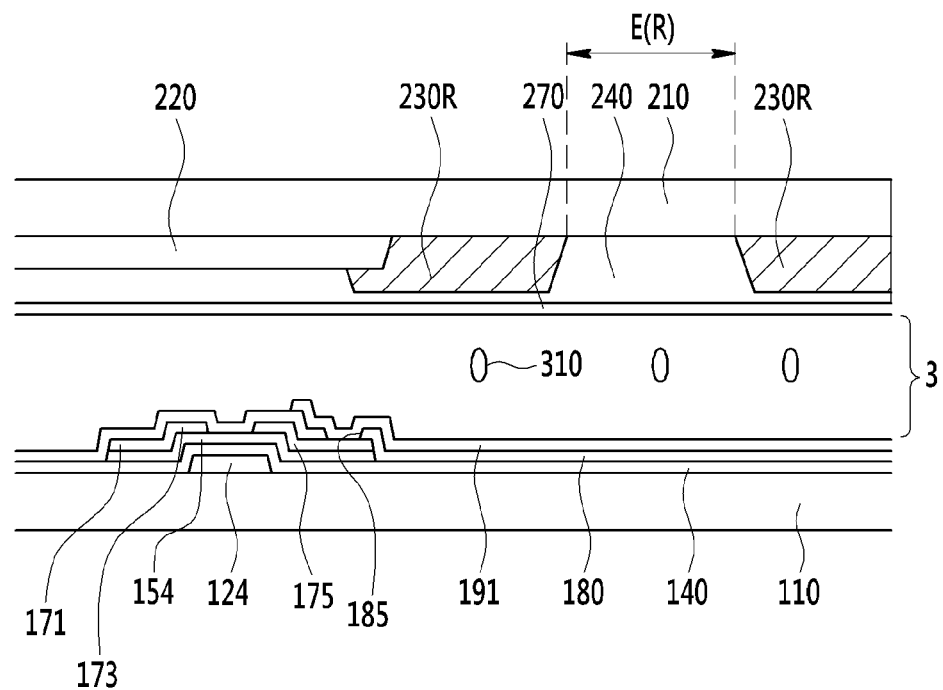
FIG. 5 is a cross-sectional view illustrating a pixel of the liquid crystal display device according to the exemplary embodiment of the present invention taken along the line V-V of FIG. 4.

FIG. 3 is a top plan view illustrating a domain included in a pixel area of a liquid crystal display device according to an exemplary embodiment of the present invention, FIG. 4 is a top plan view illustrating a pixel area of a liquid crystal display device according to an exemplary embodiment of the present invention, and FIG. 5 is a cross-sectional view illustrating a pixel of the liquid crystal display device according to the exemplary embodiment of the present invention taken along the line V-V of FIG. 4. FIG. 3, FIG. 4, and FIG. 5 show the first color pixel area.

As shown in FIG. 3, according to the present exemplary embodiment, the first color pixel area PX(R) of the liquid crystal display device includes 4 domains, i.e., a first domain D1, a second domain D2, a third domain D3, and a fourth domain D4. Specifically, the first color pixel area PX(R) is divided into 4 domains by one horizontal line and one vertical line. In this case, a domain disposed at an upper portion with respect to the horizontal line and at a left portion with respect to the vertical line is referred to as the first domain, and a domain disposed at the upper portion with respect to the horizontal line and at a right portion with respect to the vertical line is referred to as the second domain. Similarly, a domain disposed at a lower portion with respect to the horizontal line and at the right portion with respect to the vertical line is referred to as the third domain, and a domain disposed at the lower portion with respect to the horizontal line and at left portion with respect to the vertical line is referred to as the fourth domain.

Although not shown, each the second color pixel area PX(G) and the third color pixel area PX(B) may include four domains. The domains are not limited to being the same size.

The first color pixel area PX(R) includes the first transparent region E(R), and the first transparent region E(R) overlaps with at least one of the domains D1, D2, D3, and D4. For example, the first transparent region E(R) may overlap with the third domain D3 and the fourth domain D4. Alternatively, the first transparent region E(R) may overlap with the third domain D3, or overlap with the first domain D1, the second domain D2, or the like.

As shown in FIG. 4 and FIG. 5, a gate line 121 and a storage electrode line 131 are formed on the first substrate 110.

The gate line 121 mainly extends in a horizontal direction to transmit a gate signal. A gate electrode 124 is formed to protrude from the gate line 121.

The storage electrode line 131 extends in a direction that is parallel with the gate line 121, i.e., a horizontal direction, to transfer a predetermined voltage such as a common voltage. A storage electrode 133 is formed to extend from the storage electrode line 131. The storage electrode 133 may be formed to have such a shape so as to surround an edge of the first color pixel area PX(R).

A gate insulating layer 140 is formed on the gate line 121, the gate electrode 124, the storage electrode line 131, and the storage electrode 133. The gate insulating layer 140 may be formed of an inorganic insulating material, such as a silicon nitride (SiNx) and a silicon oxide (SiOx). Further, the gate insulating layer 140 may be formed of a single layer or a multilayer.

A semiconductor 154 is formed on the gate insulating layer 140. The semiconductor 154 overlaps with the gate electrode 124. The semiconductor 154 may be formed of amorphous silicon, polycrystalline silicon, or a metal oxide.

An ohmic contact member (not shown) is formed on the semiconductor 154. The ohmic contact may be made of a material such as n+ hydrogenated amorphous silicon in which an n-type impurity such as phosphorus is doped with a high concentration, or of a silicide.

A data line 171, a source electrode 173, and a drain electrode 175 are formed on the semiconductor 154. The source electrode 173 protrudes from the data line 171, and the drain electrode 175 is separated from the source electrode 173. The source electrode 173 and the drain electrode 175 overlap with the gate electrode 124.

The gate electrode 124, the source electrode 173, and the drain electrode 175 constitute one thin film transistor Q together with the semiconductor 154, and a channel of the thin film transistor Q is formed in a semiconductor disposed between the source electrode 173 and the drain electrode 175.

A passivation layer 180 is formed on the data line 171, the source electrode 173, the drain electrode 175, and an exposed portion of the semiconductor 154. A contact hole 185 is formed in the passivation layer 180 to expose at least a part of the drain electrode 175.

A pixel electrode 191 is formed on the passivation layer 180. The pixel electrode 191 may be formed of a transparent metal oxide such as indium tin oxide (ITO) or indium zinc oxide (IZO).

A general shape of the pixel electrode 191 is substantially a quadrangle. The pixel electrode 191 includes a cross-shaped stem including a horizontal stem portion 193, and a vertical stem portion 192 crossing the horizontal stem portion 193. Further, the pixel electrode 191 includes a microbranch portion 194 that extends from the horizontal stem portion 193 and the vertical stem portion 192. An extension 197 is further formed to extend from the quadrangularly formed pixel electrode 191. The extension 197 is physically and electrically connected to the drain electrode 175 through the contact hole 185 to receive a data voltage from the drain electrode 175.

The first color pixel area PX(R) is divided into four domains D1, D2, D3, and D4 by the horizontal stem portion 193 and the vertical stem portion 192 of the pixel electrode 191. The micro-branch portion 194 obliquely extends from the horizontal stem portion 193 and the vertical stem portion 192. For example, at the first domain D1, the micro-branch portion 194 extends from the horizontal stem portion 193 or the vertical stem portion 192 upwardly and toward the left. In the second domain D2, the micro-branch portion 194 extends from the horizontal stem portion 193 or the vertical stem portion 192 upwardly and toward the right. In the third domain D3, the micro-branch portion 194 extends from the horizontal stem portion 193 or the vertical stem portion 192 downwardly and toward the right. In the fourth domain D4, the micro-branch portion 194 extends from the horizontal stem portion 193 or the vertical stem portion 192 downwardly and to the left.

Each micro-branch portion 194 may form an angle of about 45 or 135 degrees with respect to the gate line 121 or the horizontal stem portion 193. The extending directions of the micro-branch portions 194 of the four domains D1, D2, D3, and D4 may be perpendicular to each other.

The pixel electrode 191 may further include an outer stem that extends along an outer circumference of the first color pixel area PX(R).

In the first color pixel area PX(R), the third color filter 230B is formed on the second substrate 210 that is disposed to face the first substrate 110. The first color filter 230R is formed at the entire first domain D1 and second domain D2 of the first color pixel area PX(R), and is formed at some regions of the third domain D3 and the fourth domain D4. The first transparent region E(R) at which no first color filter 230R is formed is disposed at the other regions of the third domain D3 and the fourth domain D4.

The light-blocking member 220 is formed at the edge of the first color pixel area PX(R), and the overcoat 240 is formed on the fourth color filter 230B and the light-blocking member 220. The overcoat 240 is also formed on the first transparent region E(R). The overcoat 240 is formed of a transparent material. Accordingly, when light passes through the first transparent region E(R), a loss is hardly generated.

A common electrode 270 is formed on the overcoat 240. The common electrode 270 may be formed of a transparent metal oxide such as indium tin oxide (ITO) or indium zinc oxide (IZO).

A predetermined voltage such as a common voltage is applied to the common electrode 270. When a data voltage is applied to the pixel electrode 191, an electric field is generated between the pixel electrode 191 and the common electrode 270, and the liquid crystal molecules 310 of the liquid crystal layer 3 disposed therebetween are arranged in a predetermined direction.

Hitherto, the first color pixel area PX(R) has been described. Each of the pixel areas PX(G) and PX(B) has a similar structure, and redundant description will be omitted.

Hitherto, the case that each of the color filters 230R, 230G, and 230B is disposed on the second substrate 210 is described, but the present invention is not limited thereto. For example, each of the color filters 230R, 230G, and 230B may be disposed on the first substrate 110. This will be described below, with reference to FIG. 6.

Figure 6:
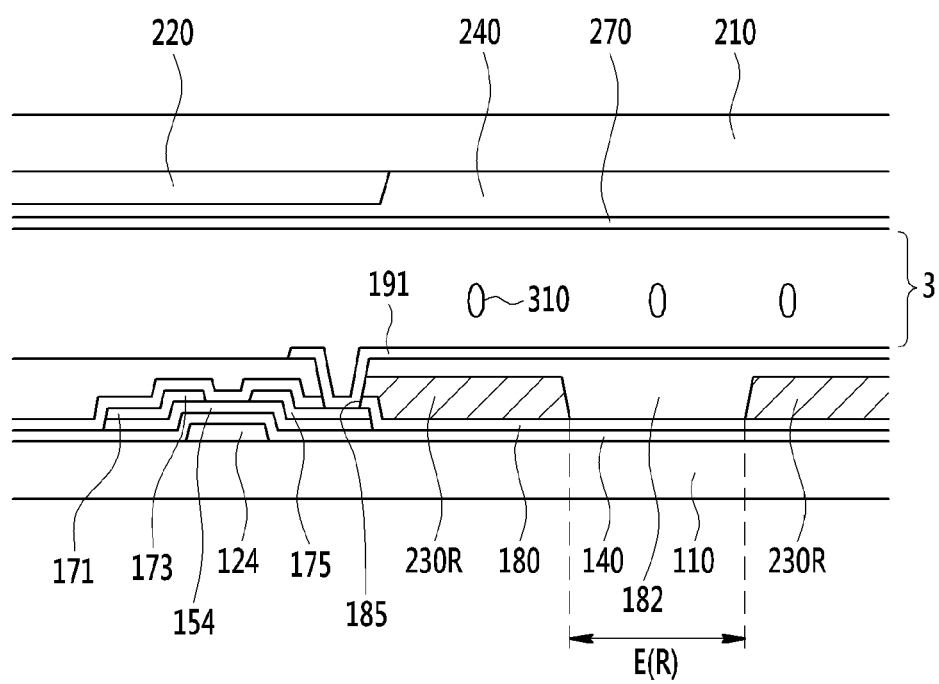
FIG. 6 is a cross-sectional view of a liquid crystal display device according to an exemplary embodiment of the present invention.

FIG. 6 is a cross-sectional view of a liquid crystal display device according to an exemplary embodiment of the present invention. FIG. 6 illustrates the first color pixel area PX(R).

As shown in FIG. 6, the gate electrode 124, the semiconductor 154, the source electrode 173, the drain electrode 175, and the passivation layer 180 are formed on the first substrate 110, and the first color filter 230R is disposed on the passivation layer 180. The first color pixel area PX(R) includes the first transparent region E(R) at which no first color filter 230G is formed.

An overcoat 182 is formed on the passivation layer 180 and the third color filter 230B, and the pixel electrode 191 may be formed on the overcoat 182.

The contact hole 185 is formed in the passivation layer 180 and the overcoat 182, and the pixel electrode 191 is connected to the drain electrode 175 through the contact hole 185.

The light-blocking member 220, the overcoat 240, and the common electrode 270 are formed on the second substrate 210.

Hitherto, the first color pixel area PX(R) has been described, and each of the pixel areas PX(G) and PX(B) has a similar structure. For example, in the second pixel area PX(G), the second color filter 230G may be disposed on the first substrate 110 in the third pixel area PX(B), and the third color filter 230B may be disposed on the first substrate 110.

Hitherto, the case that the light-blocking member 220 is formed on the second substrate 210 has been described, but the present invention is not limited thereto. For example, the light-blocking member 220 may be formed on the first substrate 110. In this case, the light-blocking member 220 may be formed on the passivation layer 180, and the overcoat 182 may be formed on the passivation layer 180, the first color filter 230R, and the light-blocking member 220.

Next, a method for forming the transparent regions E(R), E(G), and E(B) in a liquid crystal display device according to an exemplary embodiment of the present invention will be described with reference to FIG. 7 to FIG. 9.

Figure 7:
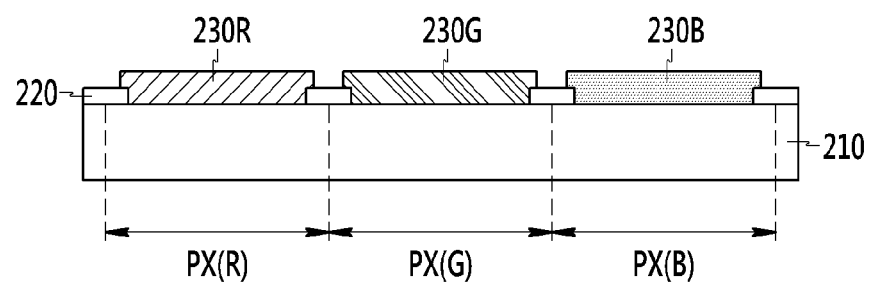
FIGS. 7, 8, and 9 are stepwise cross-sectional views illustrating a manufacturing method of a liquid crystal display device according to an exemplary embodiment of the present invention.
Figure 8:
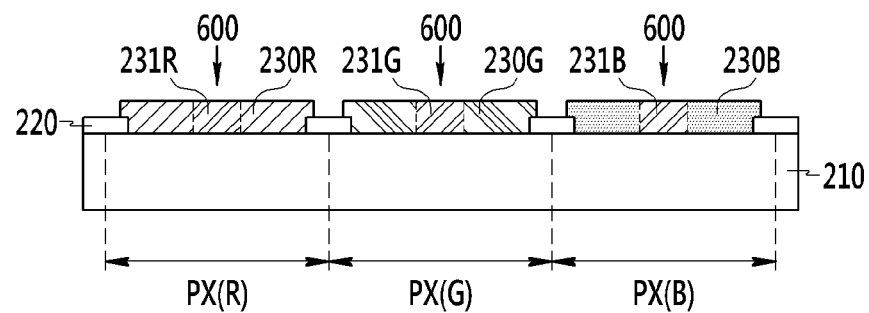
Figure 9:
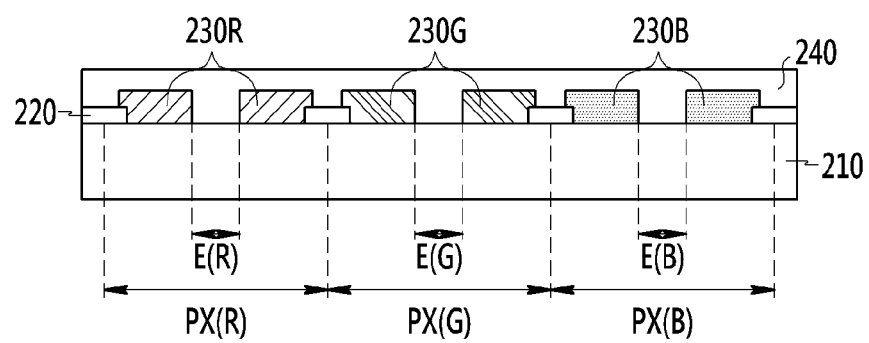

FIG. 7 to FIG. 9 are stepwise cross-sectional views illustrating a manufacturing method of a liquid crystal display device according to an exemplary embodiment of the present invention. For convenience, in FIG. 7 to FIG. 9, a surface of the second substrate 210 on which the color filters 230R, 230G, and 230B are formed is illustrated as the top surface thereof.

First, as shown in FIG. 7, the light blocking member 220 is formed at edges of the first color pixel area PX(R), the second color pixel area PX(G), and the third color pixel area PX(B) by using a light-blocking material.

Then, the first color filter 230R is formed in the entire first color pixel area PX(R). The second color filter 230G is formed in the entire second color pixel area PX(G). The third color filter 230B is formed in the entire third color pixel area PX(B).

As shown in FIG. 8, a laser 600 is irradiated into some portions of the first color pixel area PX(R), the second color pixel area PX(G), and the third color pixel area PX(B). As shown in FIG. 9, the portions into which the laser 600 is irradiated are removed in the respective color filters 230R, 230G, and 230B. Spaces in which the first color filter 230R, the second color filter 230G, and the third transparent region E(B) are removed respectively serve as the first transparent region E(R), the second transparent region E(G), and the third color filter 230B.

Next, the overcoat 240 is formed on the first color filter 230R, the second color filter 230G, and the third color filter 230B. The overcoat 240 is also formed in the first transparent region E(R), the second transparent region E(G), and the third transparent region E(B).

As described above, after the color filters 230R, 230G, and 230B are formed in the entire respective pixel areas PX(R), PX(G), and PX(B), the transparent regions E(R), E(G), and E(B) can be formed by irradiating the laser into some regions thereof. However, the present invention is not limited thereto. The transparent regions E(R), E(G), and E(B) may be formed in various ways. For example, in a photolithography method for forming the first color filter 230R, a mask may be used to prevent the first color filter 230R from being at a portion corresponding to the first transparent region E(R). Similarly, in the photolithography methods for forming the second color filter 230G and the third color filter 230B, the second color filter 230G and the third color filter 230B are not formed at portions corresponding to the second transparent region E(G) and the third transparent region E(B), respectively.

Next, a liquid crystal display device according to an exemplary embodiment of the present invention will be described with reference to FIG. 10.

Figure 10:
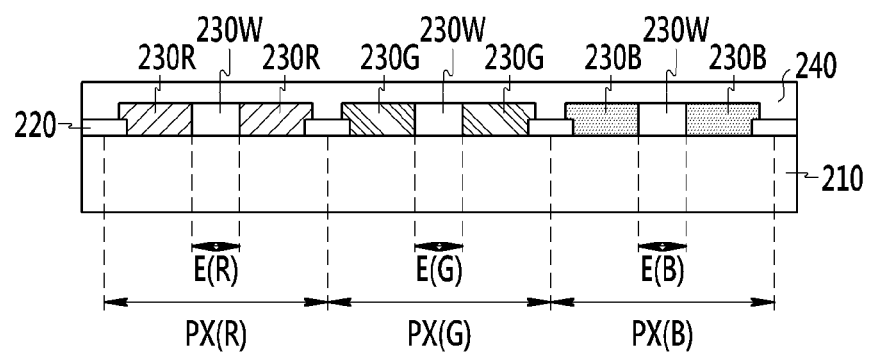
FIG. 10 is a cross-sectional view of a liquid crystal display device according to an exemplary embodiment of the present invention.

Since the liquid crystal display device according to the exemplary embodiment of the present invention illustrated in FIG. 10 is substantially the same as the liquid crystal display device according to the exemplary embodiment of the present invention illustrated in FIG. 1 and FIG. 2, any redundant description will not be provided. The present exemplary embodiment is different from the above exemplary embodiment in that a transparent member is disposed in the transparent area, and hereinafter, will be described in more detail.

FIG. 10 is a cross-sectional view of a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

The first transparent region E(R), the second transparent region E(G), and the third transparent region E(B) may display a white color. A transparent member 230W may be disposed at the first transparent region E(R), the second transparent region E(G), and the third transparent region E(B). The transparent member 230W may be formed of a transparent photoresist that permits all the wavelength bands of the visual ray region to pass therethrough.

The overcoat 240 may be formed on the first color filter 230R, the second color filter 230G, the third color filter 230B, and the transparent member 230W. The overcoat 240 may serve to planarize a top surface of the second substrate 210. The planarization can be facilitated by forming the transparent member 230W at the transparent regions E(R), E(G), and E(B).

In FIG. 10, it is illustrated that the transparent member 230W does not overlap with the color filters 230R, 230G, and 230B in the respective pixel areas PX(R), PX(G), and PX(B). However, the present invention is not limited thereto. For example, the transparent member 230W may partially overlap with the color filters 230R, 230G, and 230B in the respective pixel areas PX(R), PX(G), and PX(B).

Next, a liquid crystal display device according to an exemplary embodiment of the present invention will be described with reference to FIG. 11 and FIG. 12.

Figure 11:
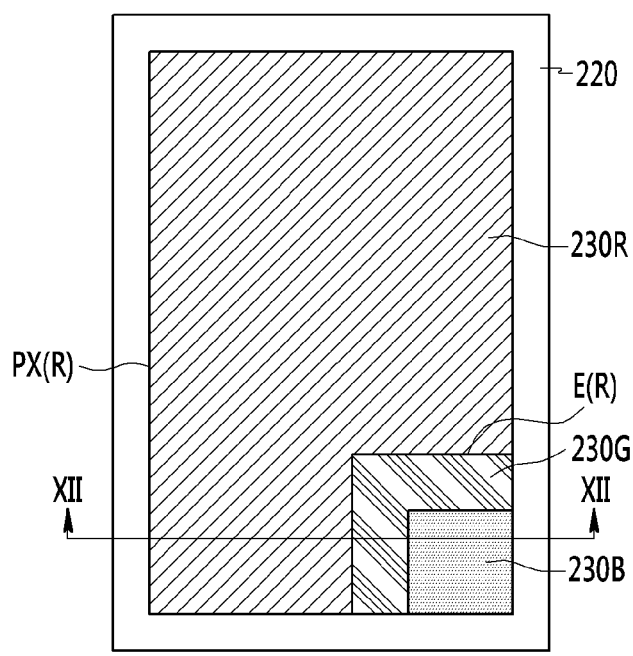
FIG. 11 is a top plan view illustrating a liquid crystal display device according to an exemplary embodiment of the present invention.
Figure 12:
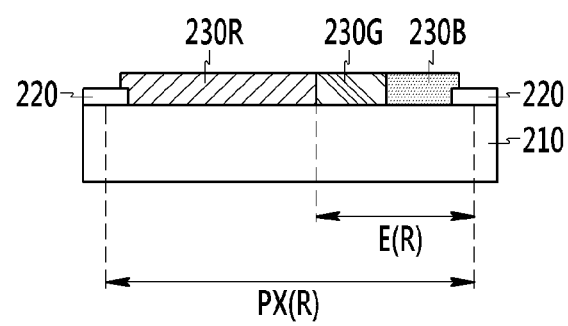
FIG. 12 is a cross-sectional view of a liquid crystal display device according to an exemplary embodiment of the present invention taken along the line XII-XII of FIG. 11.

Since the liquid crystal display device according to the exemplary embodiment of the present invention illustrated in FIG. 11 and FIG. 12 is substantially the same as the liquid crystal display device according to the exemplary embodiment of the present invention illustrated in FIG. 1 and FIG. 2, the overlapping description thereof will not be provided. The present exemplary embodiment is different from the above exemplary embodiment in that the second color filter and the third color filter as well as the first color filter are disposed in the first color pixel area, and hereinafter, will be described in more detail.

FIG. 11 is a top plan view illustrating a liquid crystal display device according to an exemplary embodiment of the present invention, and FIG. 12 is a cross-sectional view of a liquid crystal display device according to an exemplary embodiment of the present invention taken along the line XII-XII of FIG. 11.

The first color filter 230R is disposed in the first color pixel area PX(R). The first color pixel area PX(R) includes the first transparent region E(R) at which no first color filter 230R is disposed. The second color filter 230G and the third color filter 230B are disposed in the first transparent region E(R).

In the embodiment depicted in FIG. 11, the third color filter 230B is disposed at a lower right portion of the first transparent region E(R), and the second color filter 230G is disposed adjacent to at least a part of the third color filter 230B, partially surrounding the third color filter 230B. The first color filter 230R is formed adjacent to at least a part of the second color filter 230G, partially surrounding the second color filter 230G. The positions of the first color filter 230R, the second color filter 230G, and the third color filter 230B are changed without being limited thereto.

The first color filter 230R, the second color filter 230G, and the third color filter 230B may be respectively formed of a red filter, a green filter, and a blue filter. All of the light passing through the first color filter 230R, the second color filter 230G, and the third color filter 230B is combined, thereby displaying a white color. As a result, a region of the first color pixel area PX(R) can display the white color.

In this case, the second color filter 230G and the third color filter 230B may be formed to have substantially the same area. Since the first color pixel area PX(R) serves as a pixel for displaying a first color, the first color filter 230R occupies most of the area thereof.

In FIG. 11 and FIG. 12, the first color pixel area PX(R) is exclusively illustrated, but the present invention is not limited thereto. Similarly, all of the first color filter 230R, the second color filter 230G, and the third color filter 230B may be formed in the second color pixel area PX(G). In this case, since the second color pixel area PX(G) serves as a pixel for displaying a second color, the second color filter 230G occupies most of the area thereof. In addition, the first color filter 230R and the third color filter 230B are also formed to facilitate display of the white color. Similarly, all of the first color filter 230R, the second color filter 230G, and the third color filter 230B may be formed in the third color pixel area PX(B). In this case, since the third color pixel area PX(B) serves as a pixel for displaying a third color, the third color filter 230B occupies most of the area thereof. In addition, the first color filter 230R and the second color filter 230G are also formed to facilitate display of the white color.

Next, a liquid crystal display device according to an exemplary embodiment of the present invention will be described with reference to FIG. 13 and FIG. 14.

Figure 13:
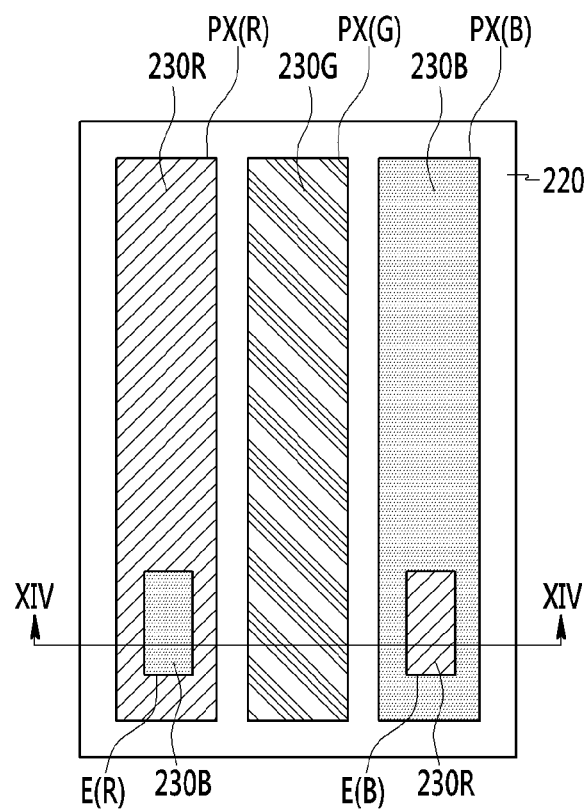
FIG. 13 is a top plan view illustrating a liquid crystal display device according to an exemplary embodiment of the present invention.
Figure 14:
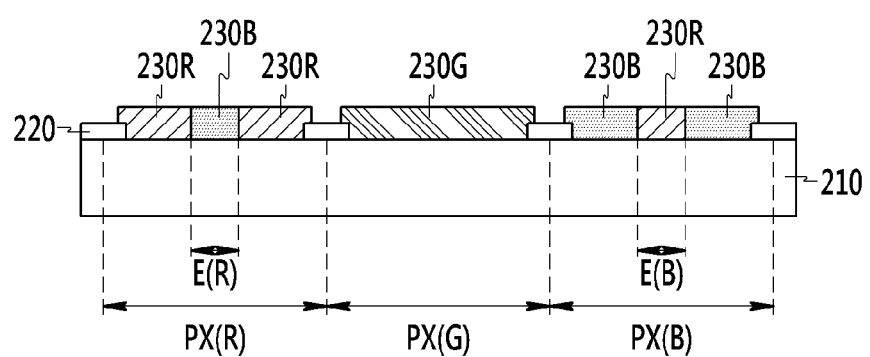
FIG. 14 is a cross-sectional view of a liquid crystal display device according to an exemplary embodiment of the present invention taken along the line XIV-XIV of FIG. 13.

Since the liquid crystal display device according to the exemplary embodiment of the present invention illustrated in FIG. 13 and FIG. 14 is substantially the same as the liquid crystal display device according to the exemplary embodiment of the present invention illustrated in FIG. 1 and FIG. 2, the overlapping description thereof will not be provided. The present exemplary embodiment is different from the above exemplary embodiment in that the third color filter is formed at a region of the first color pixel area, and the first color filter (230R) is formed at a region of the third color pixel area, and hereinafter, will be described in more detail.

FIG. 13 is a top plan view illustrating a liquid crystal display device according to an exemplary embodiment of the present invention, and FIG. 14 is a cross-sectional view of a liquid crystal display device according to an exemplary embodiment of the present invention taken along the line XIV-XIV of FIG. 13.

The first color filter 230R, the second color filter 230G, and the third color filter 230B are respectively disposed in the first color pixel area PX(R), the second color pixel area PX(G), and the third color pixel area PX(B). For example, first color filter 230R is a red filter, the second color filter 230G is a green filter, and the third color filter 230B is a blue filter.

The first color pixel area PX(R) includes the first transparent region E(R) at which no first color filter 230R is disposed, and the third color filter 230B is disposed at the first transparent region E(R). Since the first color pixel area PX(R) serves as a pixel for displaying a first color, the first color filter 230R occupies most of the area thereof. The third color filter 230B occupies the remaining area. It is illustrated that the first color filter 230R is disposed to surround the third color filter 230B, but the present invention is not limited thereto. The positions of the first color filter 230R and the third color filter 230B may be changed.

The third color pixel area PX(B) includes the third transparent region E(B) at which no third color filter 230B is disposed, and the first color filter 230R is disposed at the third transparent region E(B). Since the third color pixel area PX(B) serves as a pixel for displaying a third color, the third color filter 230B occupies most of the area thereof. The first color filter 230R occupies the remaining area. It is illustrated that the third color filter 230B is disposed to surround the first color filter 230R, but the present invention is not limited thereto. The positions of the first color filter 230R and the third color filter 230B may be changed.

In the present exemplary embodiment, a color-coordinate position of red which is displayed in first color pixel area PX(R) can be moved by partially inserting the third color filter 230B into the first color pixel area PX(R). Similarly, a color-coordinate position of blue which is displayed in the third color pixel area PX(B) can be moved by partially inserting the first color filter 230R into the third color pixel area PX(R). As such, a desired color can be precisely displayed by moving a color-coordinate position of a color which is displayed in a corresponding pixel area through partial insertion of a different color filter into each pixel area.

That is, the types and areas of the color filters 230R, 230G, and 230B to be inserted into the pixel areas PX(R), PX(G), and PX(B) can be variously controlled according to desired color coordinates. Hereinafter, modifications of this exemplary embodiment will be described with reference to FIG. 15 to FIG. 22. FIG. 15 to FIG. 22 are top plan views illustrating a liquid crystal display device according to an exemplary embodiment of the present invention.

Figure 15:
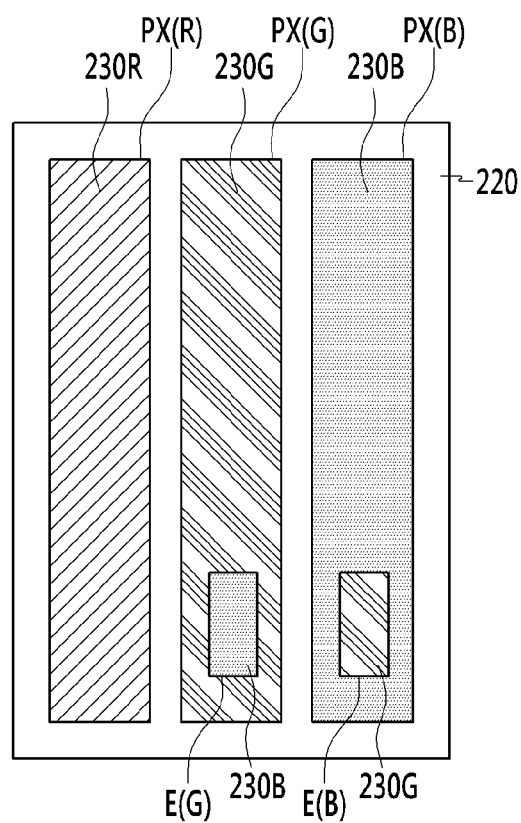
FIGS. 15, 16, 17, 18, 19, 20, 21, and 22 are top plan views illustrating a liquid crystal display device according to an exemplary embodiment of the present invention.

As shown in FIG. 15, the first color filter 230R may be disposed in the entire first color pixel area PX(R). The second color filter 230G may be mostly disposed in the second color pixel area PX(G), and the second color pixel area PX(G) may include the second transparent region E(G) at which no second color filter 230G is disposed. The third color filter 230B may be disposed in the second transparent region E(G). The third color filter 230B may be mostly disposed in the third color pixel area PX(B), and the third color pixel area PX(B) may include the third transparent region E(B) at which no third color filter 230B is disposed. The second color filter 230G may be disposed in the third transparent region E(B).

Figure 16:
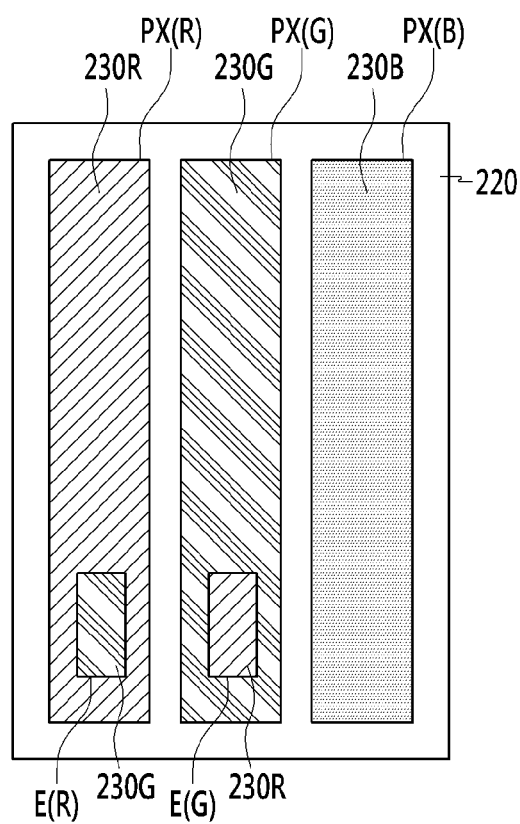

As shown in FIG. 16, the first color filter 230R may be disposed in the first color pixel area PX(R), and the first color pixel area PX(R) includes the first transparent region E(R) at which no first color filter 230R is disposed. The second color filter 230G may be disposed in the first transparent region E(R). The second color filter 230G may be mostly disposed in the second color pixel area PX(G), and the second color pixel area PX(G) may include the second transparent region E(G) at which no second color filter 230G is disposed. The first color filter 230R may be disposed in the second transparent region E(G). The third color filter 230B may be disposed in the entire third color pixel area PX(B).

Figure 17:
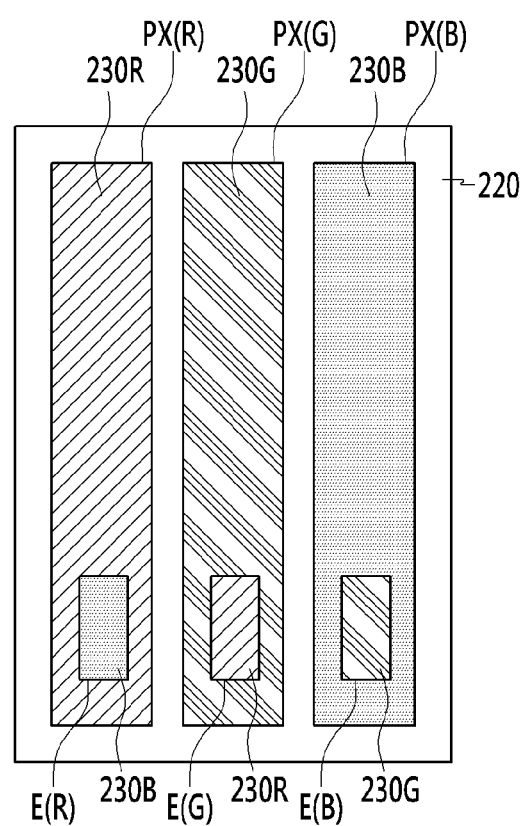

As shown in FIG. 17, the first color filter 230R may be disposed in the first color pixel area PX(R), and the first color pixel area PX(R) includes the first transparent region E(R) at which no first color filter 230R is disposed. The third color filter 230B may be disposed in the first transparent region E(R). The second color filter 230G may be mostly disposed in the second color pixel area PX(G), and the second color pixel area PX(G) may include the second transparent region E(G) at which no second color filter 230G is disposed. The first color filter 230R may be disposed in the second transparent region E(G). The third color filter 230B may be mostly disposed in the third color pixel area PX(B), and the third color pixel area PX(B) may include the third transparent region E(B) at which no third color filter 230B is disposed. The second color filter 230G may be disposed in the third transparent region E(B).

Figure 18:
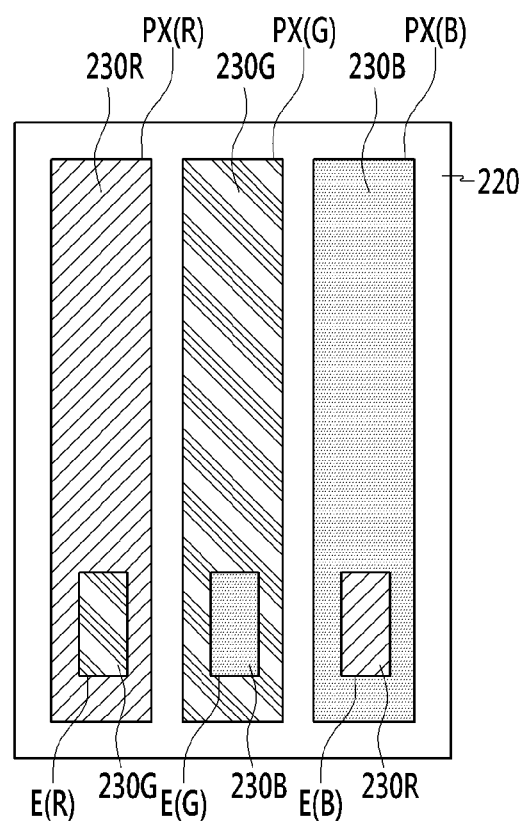

As shown in FIG. 18, the first color filter 230R may be disposed in the first color pixel area PX(R), and the first color pixel area PX(R) includes the first transparent region E(R) at which no first color filter 230R is disposed. The second color filter 230G may be disposed at the remaining region of the first transparent region E(R). The second color filter 230G may be mostly disposed in the second color pixel area PX(G), and the second color pixel area PX(G) may include the second transparent region E(G) at which no second color filter 230G is disposed. The third color filter 230B may be disposed in the second transparent region E(G). The third color filter 230B may be mostly disposed in the third color pixel area PX(B), and the third color pixel area PX(B) may include the third transparent region E(B) at which no third color filter 230B is disposed. The first color filter 230R may be disposed in the third transparent region E(B).

Figure 19:
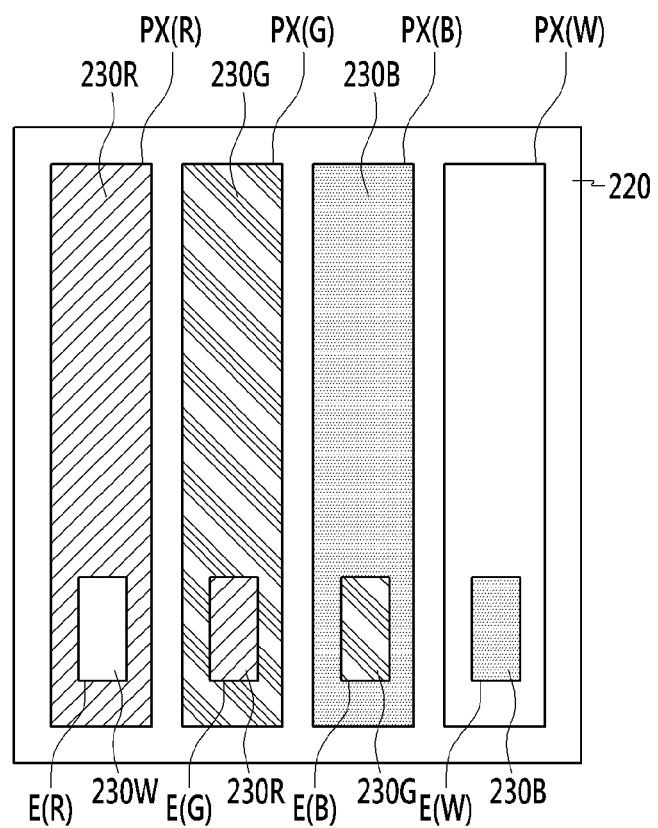

As shown in FIG. 19, the liquid crystal display device according to the present exemplary embodiment may further include a fourth color pixel area PX(W), and the fourth color pixel area PX(W) may display a white color.

The first color filter 230R may be mostly disposed in the first color pixel area PX(R), and the first color pixel area PX(R) includes the first transparent region E(R) at which no first color filter 230R is disposed. Although not shown, the transparent member may be formed in the first transparent region E(R) to facilitate easy planarization.

The second color filter 230G may be mostly disposed in the second color pixel area PX(G), and the second color pixel area PX(G) may include the second transparent region E(G) at which no second color filter 230G is disposed. The first color filter 230R may be disposed in the second transparent region E(G). The third color filter 230B may be mostly disposed in the third color pixel area PX(B), and the third color pixel area PX(B) may include the third transparent region E(B) at which no third color filter 230B is disposed. The second color filter 230G may be disposed in the third transparent region E(B). The color filters 230R, 230G, and 230B are not mostly disposed in the fourth color pixel area PX(W), and the third color filter 230B may be disposed in a region of the fourth transparent region (E(W)).

Figure 20:
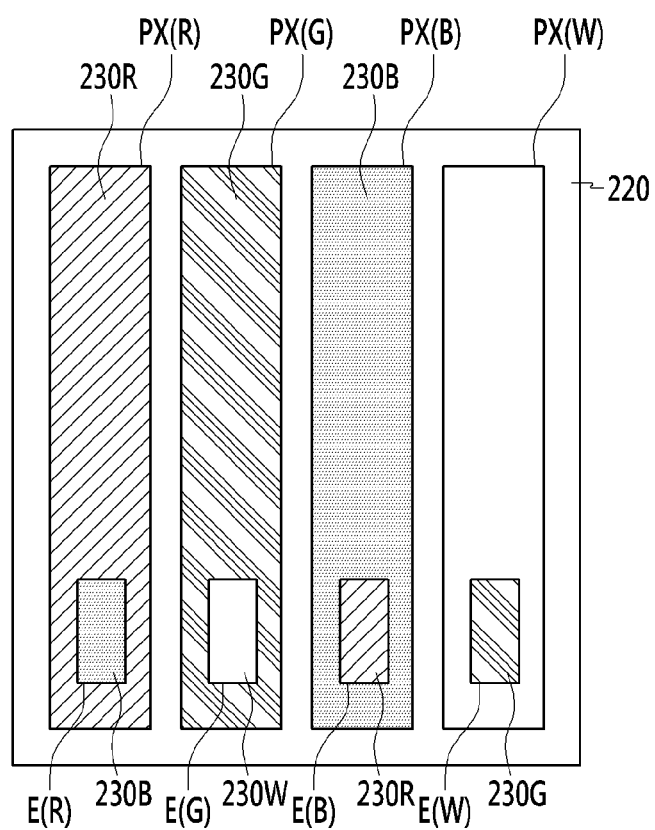

As shown in FIG. 20, the first color filter 230R may be disposed in the first color pixel area PX(R), and the first color pixel area PX(R) includes the first transparent region E(R) at which no first color filter 230R is disposed. The third color filter 230B may be disposed in the first transparent region E(R). The second color filter 230G may be mostly disposed in the second color pixel area PX(G), and the second color pixel area PX(G) may include the second transparent region E(G) at which no second color filter 230G is disposed. The third color filter 230B may be mostly disposed in the third color pixel area PX(B), and the third color pixel area PX(B) may include the third transparent region E(B) at which no third color filter 230B is disposed. The first color filter 230R may be disposed in the third transparent region E(B). The color filters 230R, 230G, and 230B may not be mostly disposed in the fourth color pixel area PX(W), and the second color filter 230G may be disposed at a region of the fourth transparent region E(W).

Figure 21:
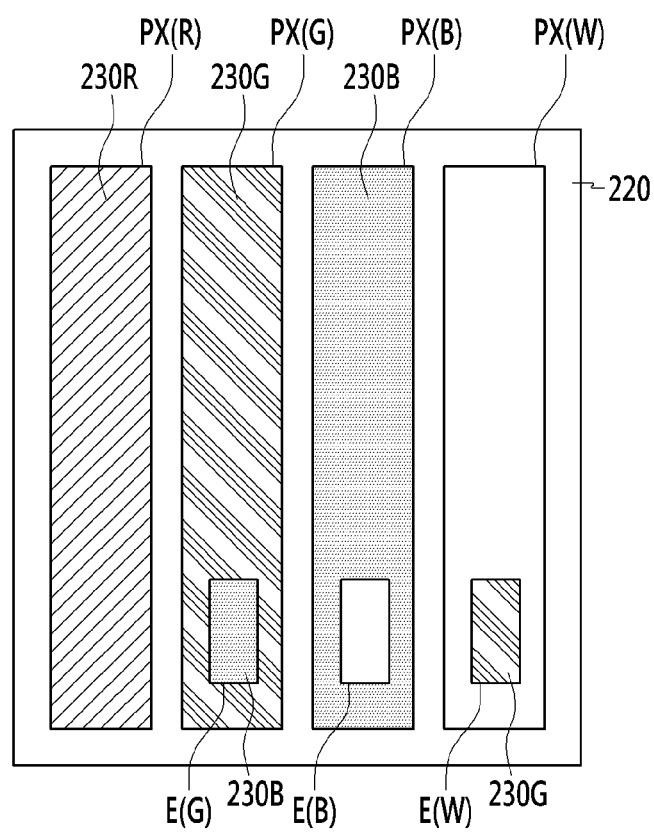

As shown in FIG. 21, the first color filter 230R may be disposed in the entire first color pixel area PX(R). The second color filter 230G may be mostly disposed in the second color pixel area PX(G), and the second color pixel area PX(G) may include the second transparent region E(G) at which no second color filter 230G is disposed. The third color filter 230B may be mostly disposed in the third color pixel area PX(B), and the third color pixel area PX(B) may include the third transparent region E(B) at which no third color filter 230B is disposed. The color filters 230R, 230G, and 230B may not be mostly disposed in the fourth color pixel area PX(W), and the second color filter 230G may be disposed at a region of the fourth transparent region E(W).

Figure 22:
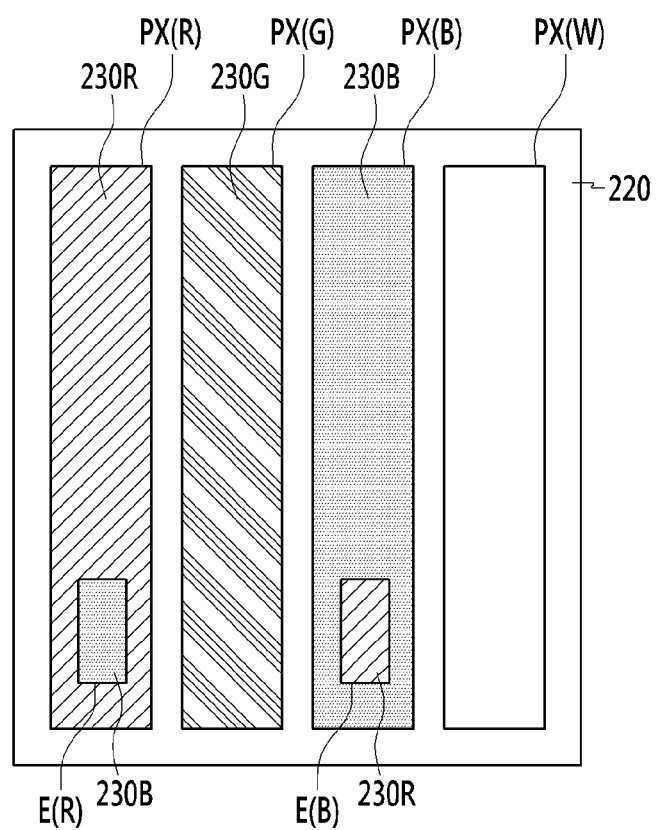

As shown in FIG. 22, the first color filter 230R may be disposed in the first color pixel area PX(R), and the first color pixel area PX(R) includes the first transparent region E(R) at which no first color filter 230R is disposed. The third color filter 230B may be disposed in the first transparent region E(R). The second color filter 230G may be mostly disposed in the second color pixel area PX(G). The third color filter 230B may be mostly disposed in the third color pixel area PX(B), and the third color pixel area PX(B) may include the third transparent region E(B) at which no third color filter 230B is disposed. The first color filter 230R may be disposed in the third transparent region E(B). The color filters 230R, 230G, and 230B may not be disposed in the fourth color pixel area PX(W).

The transparent regions may be disposed in various ways in addition to the aforementioned examples made with respect to FIG. 13 to FIG. 22, and various color types of color filters may be disposed in the transparent regions.

Next, a liquid crystal display device according to an exemplary embodiment of the present invention will be described with reference to FIG. 23 and FIG. 24.

Figure 23:
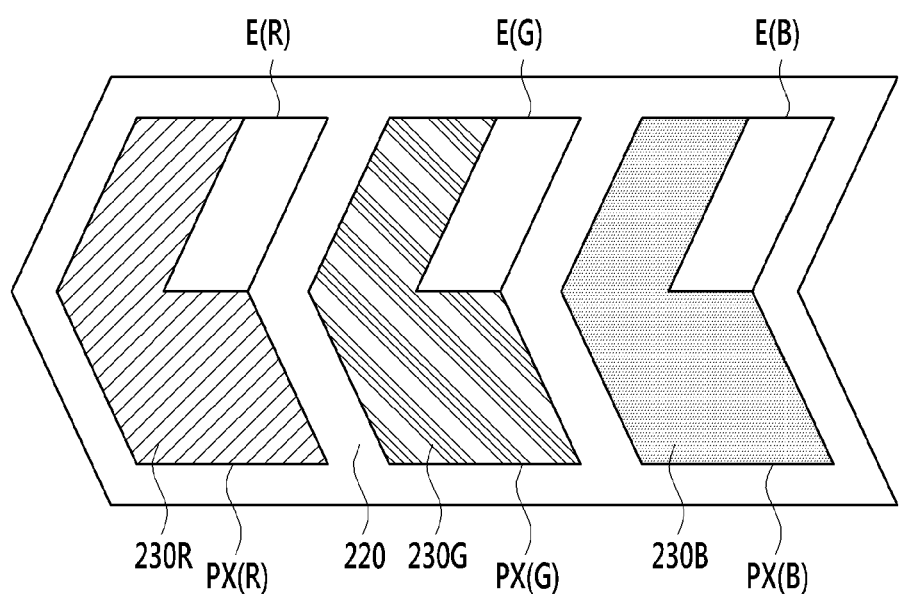
FIG. 23 is a top plan view illustrating a liquid crystal display device according to an exemplary embodiment of the present invention.
Figure 24:
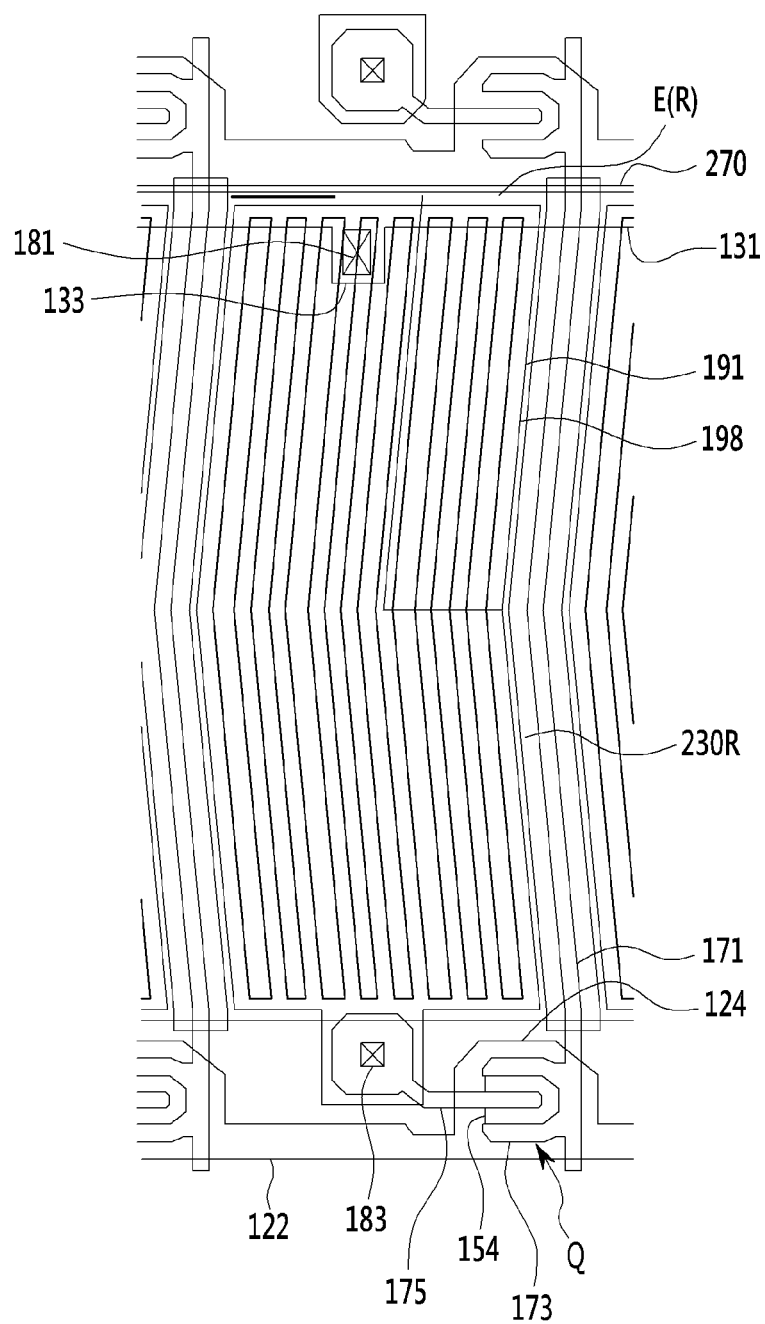
FIG. 24 is a top plan view illustrating one pixel included in a liquid crystal display device according to an exemplary embodiment of the present invention.

Since the liquid crystal display device according to the exemplary embodiment of the present invention illustrated in FIG. 23 and FIG. 24 is substantially the same as the liquid crystal display device according to the exemplary embodiment of the present invention illustrated in FIG. 1 and FIG. 2, any redundant description thereof will be omitted. The present exemplary embodiment is different from the above exemplary embodiment in the positions of the transparent regions, and hereinafter, will be described in more detail.

FIG. 23 is a top plan view illustrating a liquid crystal display device according to an exemplary embodiment of the present invention, and FIG. 24 is a top plan view illustrating one pixel included in a liquid crystal display device according to an exemplary embodiment of the present invention.

As shown in FIG. 23, the first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

When viewed from the top, each of the pixel areas PX(R), PX(G), PX(B), and PX(W) are formed to have a shape obtained by connecting two parallelograms to be symmetrical to each other. The two parallelograms may be vertically disposed. The pixel areas PX(R), PX(G), and PX(B) are respectively formed to have parallelogrammic shapes. The color filters 230R, 230G, and 230B are formed within the the shapes defined by the pixel areas PX(R), PX(G). Each of the color filters 230R, 230G, and 230B may be disposed on all of a lower parallelogram and a part of an upper parallelogram, where pairs of parallelograms constituting each of the pixel areas PX(R), PX(G), and PX(B).

The first transparent region E(R), the second transparent region E(G), and the third transparent region E(B) may be respectively formed to have parallelogrammic shapes along the shapes of the pixel areas PX(R), PX(G), and PX(B). Each of the transparent regions E(R), E(G), and E(B) may be disposed at an upper right portion of each of the pixel areas PX(R), PX(G), and PX(B). In other words, each of the transparent regions E(R), E(G), and E(B) may be disposed at a right part of the upper one of a corresponding pair among pairs of parallelograms constituting each of the pixel areas PX(R), PX(G), and PX(B).

The first transparent region E(R), the second transparent region E(G), and the third transparent region E(B) may display a white color. Although not shown, a transparent member may be disposed at the first transparent region E(R), the second transparent region E(G), and the third transparent region E(B).

In FIG. 23, the pixel areas PX(R), PX(G), and PX(B) are illustrated to respectively include the transparent regions E(R), E(G), and E(B), but the present invention is not limited thereto. For example, the first color pixel area PX(R) may include the first transparent region E(R), and no region with color filters removed may be formed in the second color pixel area PX(G) or the third color pixel area PX(B). Alternatively, the second color pixel area PX(G) may include the second transparent region E(G), and no region with color filters removed may be formed in the first color pixel area PX(G) or the third color pixel area PX(B). Further alternatively, the first color pixel area PX(R) and the second color pixel area PX(G) may respectively include the first transparent region E(R) and the second transparent region E(G), and no region with color filters removed may be formed in the third color pixel area PX(B). Various modifications are possible in addition to the aforementioned examples.

As shown in FIG. 24, a gate line 122 and a gate electrode 124 that is protruded therefrom are formed on a substrate (not shown). A storage electrode line 131 and a storage electrode 133 that is protruded therefrom are formed in a direction that is parallel with the gate line 122. The gate line 122, the storage electrode line 131, and the like may be formed on the same substrate as that of the color filters 230R, 230G, and 230B, or on a substrate that is disposed to be opposite to that of the color filters 230R, 230G, and 230B.

The gate line 122 mainly extends in a horizontal direction to transmit a gate signal. The storage electrode line 131 also mainly extends in the horizontal direction to transfer a predetermined voltage such as a common voltage.

A gate insulating layer (not shown) is formed on the gate line 122, the gate electrode 124, the storage electrode line 131, and the storage electrode 133. The gate insulating layer may be formed of an inorganic insulating material, such as a silicon nitride (SiNx) and a silicon oxide (SiOx).

A semiconductor 154 is formed on a gate insulating layer 140. The semiconductor 154 overlaps with the gate electrode 124.

A data line 171 crossing the gate line 122, a source electrode 173 protruding from the data line 171 toward an upper portion of the gate electrode 124, and a drain electrode 175 that is separated from the source electrode 173 are formed on the semiconductor 154.

The gate electrode 124, the source electrode 173, and the drain electrode 175 constitute one thin film transistor Q together with the semiconductor 154, and a channel of the thin film transistor Q is formed in a semiconductor disposed between the source electrode 173 and the drain electrode 175.

The data line 171 is formed to be substantially perpendicular to the gate line 122. The data line 171 is formed to have a shape that is bent once according to the shape of the fourth color pixel area PX(W). At the portion at which the data line 171 is bent, the two parallelograms constituting the shape of the fourth color pixel area PX(W) contact each other.

A first passivation layer (not shown) is formed on the data line 171, the source electrode 173, and the drain electrode 175. A first contact hole 181 is formed in the first passivation layer to expose the storage electrode 133.

A common electrode 270 that is connected to the storage electrode 133 through the first contact hole 181 is formed on the first passivation layer. The common electrode 270 may be formed on a whole part of the fourth color pixel area PX(W) in a planar shape, and common electrodes 270 may be formed in the adjacent pixel areas PX(R), PX(G), PX(B), and PX(W). The common electrode 270 is formed of a transparent metal oxide such as indium tin oxide (ITO) or indium zinc oxide (IZO).

A second passivation layer (not shown) is formed on the common electrode 270. A second contact hole 183 is formed in the first passivation layer and the second passivation layer to expose the drain electrode 175.

The pixel electrode 191 that is connected to the drain electrode 175 of the thin film transistor through the second contact hole 183 is formed on the second passivation layer. The pixel electrode 191 is formed to correspond to the shape of the fourth color pixel area PX(W). In other words, the pixel electrode 191 is formed to have a shape obtained by connecting two parallelograms to be symmetrical to each other. The pixel electrode 191 is formed of a transparent metal oxide such as indium tin oxide (ITO) or indium zinc oxide (IZO). The pixel electrode 191 includes a plurality of slits 198.

The common electrode 270 and the pixel electrode 191 are formed at different layers, with the second passivation layer interposed between the layers. In this case, the common electrode 270 is formed at the whole part of the fourth color pixel area PX(W), and the slits 198 are formed in the pixel electrode 191. Liquid crystal molecules included in the liquid crystal layer of the liquid crystal display device are moved by a horizontal electric field that is generated between the common electrode 270 and the pixel electrode 191.

Hitherto, it is described that the common electrode 270 is formed in the planar shape and the slits 198 are formed in the pixel electrode 191, but the present invention is not limited thereto. For example, the slits may be formed in the common electrode 270 as well as the pixel electrode 191. In this case, the pixel electrode 191 and the common electrode 270 may be formed at the same layer by using the same material, and may be alternately disposed in parallel.

The first color filter 230R is disposed in the first color pixel area PX(R). The first color pixel area PX(R) includes the first transparent region E(R) at which no first color filter 230R is disposed. The first transparent region E(R) is formed of a first parallelogram including sides that are parallel with two second parallelograms constituting the shape of the pixel electrode 191. Further, the long sides of the first transparent region E(R) may be parallel with the slits 198 of the pixel electrode 191.

The first transparent region E(R) may overlap with an upper right part of the pixel electrode 191. However, the position of the first transparent region E(R) may be varied without being limited thereto. The first color filter 230R is disposed at a region of first color pixel area PX(R) other than the region at which the first transparent region E(R) is disposed.

FIG. 24 illustrates the first color pixel area PX(R), and similarly, each of the second color pixel area PX(G) and the third color pixel area PX(B) may have substantially the same pixel structure as the first color pixel area PX(R).

Next, a liquid crystal display device according to an exemplary embodiment of the present invention will be described with reference to FIG. 25.

Figure 25:
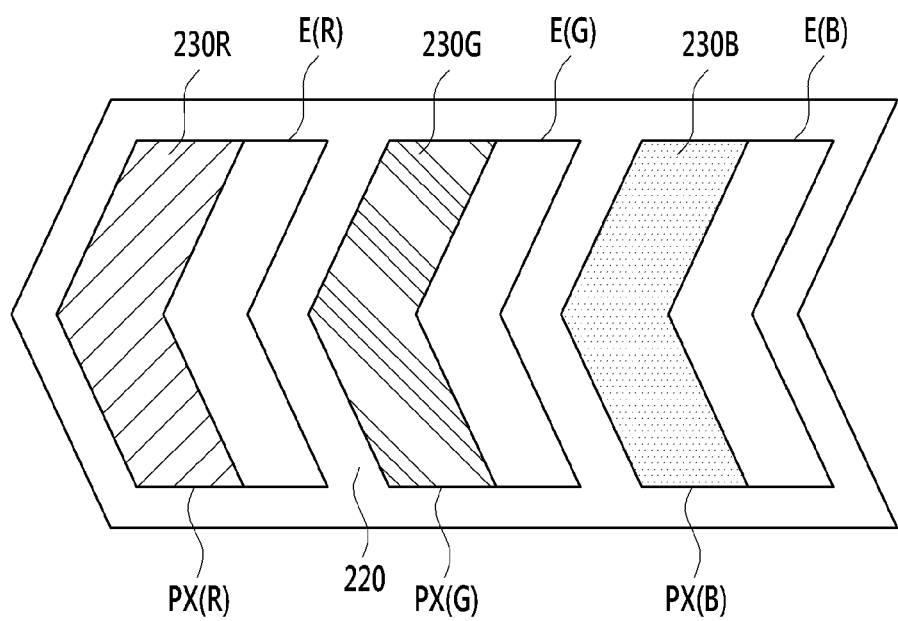
FIG. 25 is a top plan view illustrating a liquid crystal display device according to an exemplary embodiment of the present invention.

Since the liquid crystal display device according to the exemplary embodiment of the present invention illustrated in FIG. 25 is substantially the same as the liquid crystal display device according to the exemplary embodiment of the present invention illustrated in FIG. 23 and FIG. 24, the overlapping description thereof will not be provided. The present exemplary embodiment is different from the above exemplary embodiment in the positions of the transparent regions, and hereinafter, will be described in more detail.

FIG. 25 is a top plan view illustrating a liquid crystal display device according to an exemplary embodiment of the present invention.

Specifically, the first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

Each of the pixel areas PX(R), PX(G), PX(B), and PX(W) is formed to have a shape obtained by connecting two parallelograms to be symmetrical to each other. A pixel electrode (not shown) is formed to have a shape obtained by connecting two parallelograms to be symmetrical to each other, like the shapes of the pixel areas PX(R), PX(G), and PX(B) disposed in the respective pixel areas PX(R), PX(G), and PX(B).

The first transparent region E(R), the second transparent region E(G), and the third transparent region E(B) are respectively formed to have parallelogrammic shapes along the shapes of the pixel area PX(R), PX(G), and PX(B). The transparent regions E(R), E(G), and E(B) may be respectively formed at right parts of the pixel areas PX(R), PX(G), and PX(B). In other words, each of the transparent regions E(R), E(G), and E(B) may be formed at right parts of an upper one and a lower one of a corresponding pair among pairs of parallelograms constituting each of the pixel areas PX(R), PX(G), and PX(B). As a result, the transparent regions E(R), E(G), and E(B) may respectively overlap with right parts of the pixel electrodes formed in the pixel areas PX(R), PX(G), and PX(B).

The first transparent region E(R), the second transparent region E(G), and the third transparent region E(B) may display a white color. Although not shown, a transparent member may be disposed at the first transparent region E(R), the second transparent region E(G), and the third transparent region E(B).

The pixel areas PX(R), PX(G), and PX(B) are illustrated to respectively include transparent regions E(R), E(G), and E(B), but the present invention is not limited thereto. For example, some of the pixel areas PX(R), PX(G), and PX(B) may include corresponding transparent regions.

Next, a liquid crystal display device according to an exemplary embodiment of the present invention will be described with reference to FIG. 26.

Figure 26:
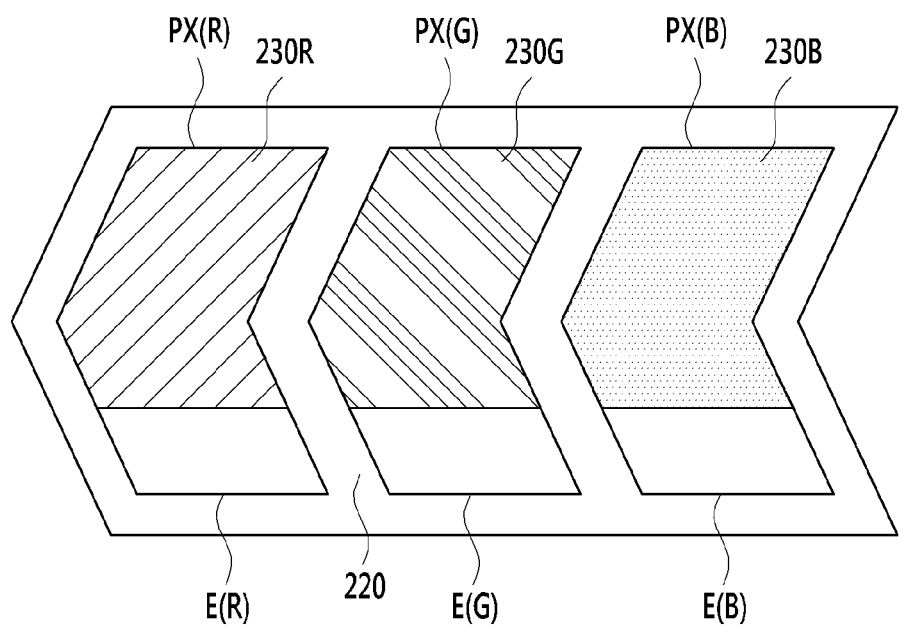
FIG. 26 is a top plan view illustrating a liquid crystal display device according to an exemplary embodiment of the present invention.

Since the liquid crystal display device according to the exemplary embodiment of the present invention illustrated in FIG. 26 is substantially the same as the liquid crystal display device according to the exemplary embodiment of the present invention illustrated in FIG. 23 and FIG. 24, the overlapping description thereof will not be provided. The present exemplary embodiment is different from the above exemplary embodiment in the positions of the transparent regions, and hereinafter, will be described in more detail.

FIG. 26 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

Each of the pixel areas PX(R), PX(G), PX(B), and PX(W) are formed to have a shape obtained by connecting two parallelograms arranged symmetrically to each other. A pixel electrode (not shown) is formed to have a shape obtained by connecting two parallelograms to be symmetrical to each other, like the shapes of the pixel areas PX(R), PX(G), and PX(B) disposed in the respective pixel areas PX(R), PX(G), and PX(B).

The first transparent region E(R), the second transparent region E(G) and the third transparent region E(B) are respectively formed to have parallelogrammic shapes along the shapes of the pixel area PX(R), PX(G), and PX(B).

The transparent regions E(R), E(G), and E(B) may be respectively disposed at lower portions of the pixel areas PX(R), PX(G), and PX(B). In other words, each of the transparent regions E(R), E(G), and E(B) may be disposed at a region of a lower one of a corresponding pair among pairs of parallelograms constituting each of the pixel areas PX(R), PX(G), and PX(B). As a result, the transparent regions E(R), E(G), and E(B) respectively overlap with lower parts of the pixel electrodes formed in the pixel areas PX(R), PX(G), and PX(B).

The first transparent region E(R), the second transparent region E(G), and the third transparent region E(B) may display a white color. Although not shown, a transparent member may be disposed at the first transparent region E(R), the second transparent region E(G), and the third transparent region E(B).

The pixel areas PX(R), PX(G), and PX(B) are illustrated to respectively include transparent regions E(R), E(G), and E(B), but the present invention is not limited thereto. For example, some of the pixel areas PX(R), PX(G), and PX(B) may include corresponding transparent regions.

Next, a liquid crystal display device according to an exemplary embodiment of the present invention will be described with reference to FIG. 27 to FIG. 29.

Figure 27:
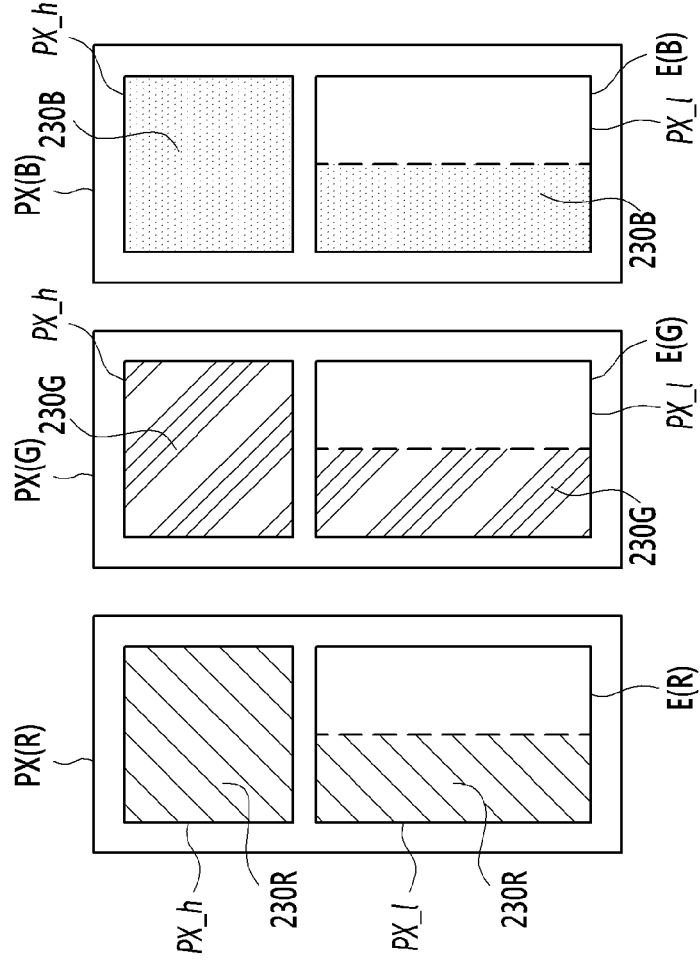
FIG. 27 is a top plan view illustrating a liquid crystal display device according to an exemplary embodiment of the present invention.
Figure 28:
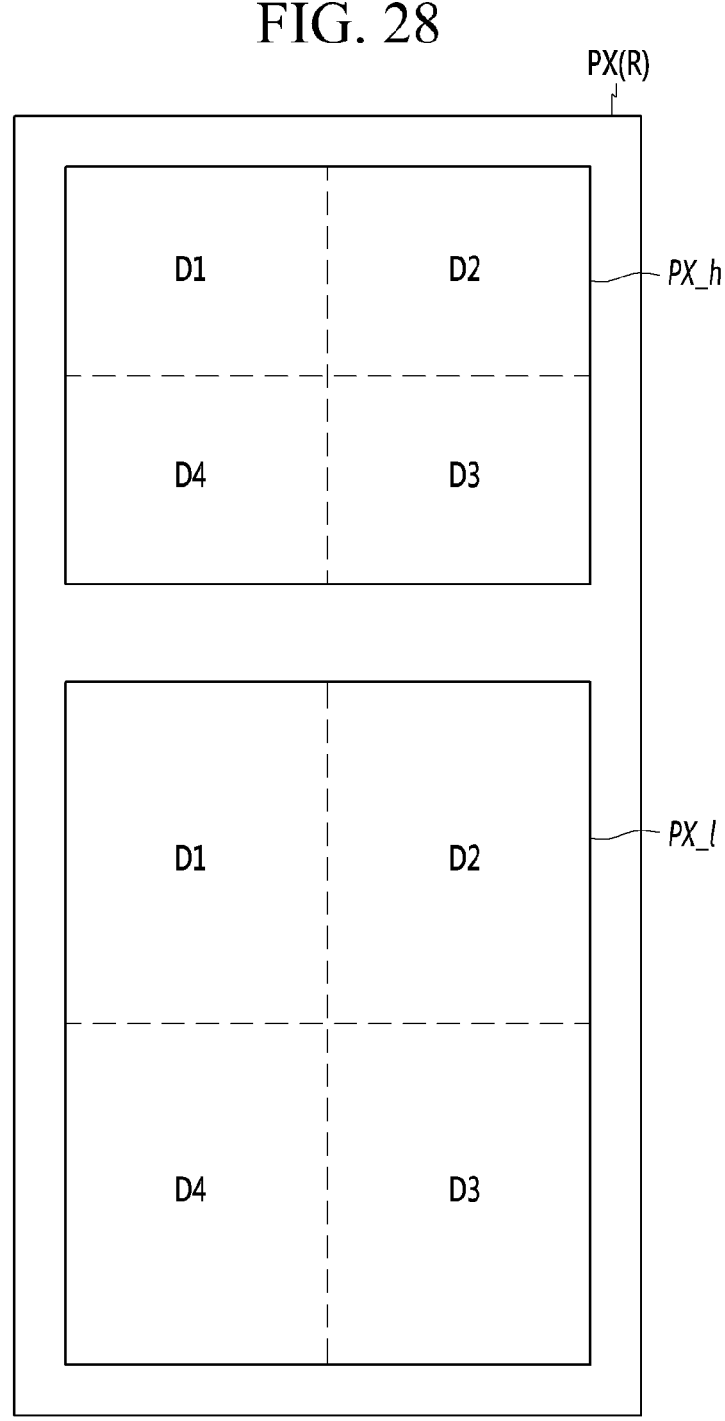
FIG. 28 is a top plan view illustrating domains included in one pixel of a liquid crystal display device according to an exemplary embodiment of the present invention.
Figure 29:
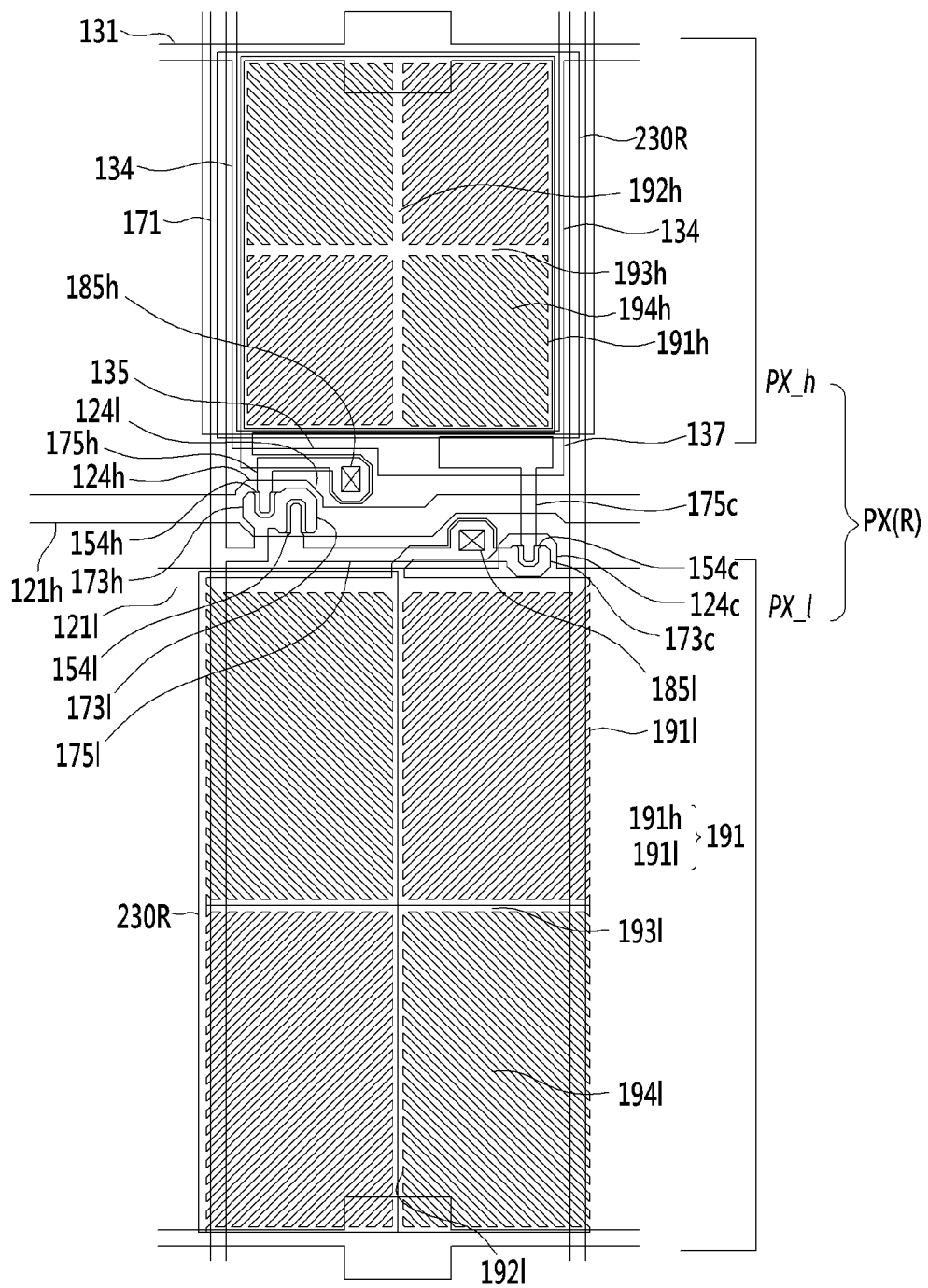
FIG. 29 is a top plan view illustrating one pixel included in a liquid crystal display device according to an exemplary embodiment of the present invention.

Since the liquid crystal display device according to the exemplary embodiment of the present invention illustrated in FIG. 27 to FIG. 29 is substantially the same as the liquid crystal display device according to the exemplary embodiment of the present invention illustrated in FIG. 1 to FIG. 5, the overlapping description thereof will not be provided. The present exemplary embodiment is different from the above exemplary embodiment in the positions of the transparent regions, and hereinafter, will be described in more detail.

FIG. 27 is a top plan view illustrating a liquid crystal display device according to an exemplary embodiment of the present invention, FIG. 28 is a top plan view illustrating domains included in one pixel of a liquid crystal display device according to an exemplary embodiment of the present invention, and FIG. 29 is a top plan view illustrating one pixel included in a liquid crystal display device according to an exemplary embodiment of the present invention. FIG. 28 and FIG. 29 show the first color pixel area.

As shown in FIG. 27, the first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

Each of the pixel areas PX(R), PX(G), and PX(B) may be formed to have a substantially quadrangular shape. Each of the pixel areas PX(R), PX(G), and PX(B) may include a first subpixel area PX_h and a second subpixel area PX_l. The first subpixel area PX_h and the second subpixel area PX_l may be vertically arranged. However, the disposing pattern of the first subpixel area PX_h and the second subpixel area PX_l may be changed.

In each of the pixel areas PX(R), PX(G), and PX(B), each of the color filters 230R, 230G, and 230B is disposed in the entire first subpixel area PX_h, and is disposed at a region of the second subpixel area PX_l. For example, each of the color filters 230R, 230G, and 230B may be disposed at a left region of the second subpixel area PX_l.

As shown in FIG. 28, in the liquid crystal display device according to the present exemplary embodiment, each of the first subpixel area PX_h and the second subpixel area PX_l of the first color pixel area PX(R) includes 4 domains, i.e., a first domain D1, a second domain D2, a third domain D3, and a fourth domain D4. Each of the first subpixel area PX_h and the second subpixel area PX_l of the first color pixel area PX(R) is divided into 4 domains by one horizontal line and one vertical line. In this case, a domain disposed at an upper portion with respect to the horizontal line and at a left portion with respect to the vertical line is referred to as the first domain, and a domain disposed at the upper portion with respect to the horizontal line and at a right portion with respect to the vertical line is referred to as the second domain. Similarly, a domain disposed at a lower portion with respect to the horizontal line and at the right portion with respect to the vertical line is referred to as the third domain, and a domain disposed at the lower portion with respect to the horizontal line and at left portion with respect to the vertical line is referred to as the fourth domain.

Although not shown, each the second color pixel area PX(G) and the third color pixel area PX(B) may include four domains.

The first color pixel area PX(R) includes the first transparent region E(R), and the first transparent region E(R) overlaps with at least one of the domains D1, D2, D3, and D4 of the second subpixel area PX_l. For example, the first transparent region E(R) may overlap with the third domain D3 and the fourth domain D4 of the second subpixel area PX_l. Alternatively, the first transparent region E(R) may overlap with the third domain D3 of the second subpixel area PX_l, or may overlap with the first domain D1, the second domain D2 of the second subpixel area PX_l, or the like.

The first transparent region E(R), the second transparent region E(G), and the third transparent region E(B) may display a white color. Although not shown, a transparent member may be disposed at the first transparent region E(R), the second transparent region E(G), and the third transparent region E(B).

The pixel areas PX(R), PX(G), and PX(B) are illustrated to respectively include transparent regions E(R), E(G), and E(B), but the present invention is not limited thereto. For example, some of the pixel areas PX(R), PX(G), and PX(B) may include corresponding transparent regions.

As shown in FIG. 29, a plurality of gate conductors including a first gate line 121h, a second gate line 121l, and a storage electrode line 131 are formed on a substrate (not shown). The gate conductors 121h, 121l, and 131 may be formed on the same substrate as that of the color filters 230R, 230G, and 230B, or on a substrate that is disposed to be opposite to that of the color filters 230R, 230G, and 230B.

The first gate line 121h and the second gate line 121l mainly extend in a horizontal direction to transmit a gate signal. The first gate line 121h includes a first gate electrode 124h and a second gate electrode 124l, and the second gate line 121l includes a third gate electrode 124c. The first gate electrode 124h and the second gate electrode 124l may be integrally formed as a single unit.

The storage electrode line 131 also mainly extends in the horizontal direction to transfer a predetermined voltage such as a common voltage. The storage electrode line 131 includes a storage electrode 137 that extends downwardly.

Each of the pixel areas PX(R), PX(G), and PX(B) may include a first subpixel area PX_h and a second subpixel area PX_l. The first subpixel area PX_h and the second subpixel area PX_l may be vertically disposed. The first gate line 121h and the second gate line 121l may be formed at a boundary between the first subpixel area PX_h and the second subpixel area PX_l. The storage electrode line 131 may be formed at an upper edge of the first subpixel area PX_h.

A gate insulating layer (not shown) is formed on the gate conductors 121h, 121l, and 131.

Semiconductors 154h, 154l, and 154c are formed on the gate insulating layer. The first semiconductor 154h is formed to overlap the first gate electrode 124h, the second semiconductor 154l is formed to overlap the second gate electrode 124l, and the third semiconductor 154c is formed to overlap the third gate electrode 124c.

Data conductors including a data line 171, a first source electrode 173h, a second source electrode 173l, a third source electrode 173c, a first drain electrode 175h, a second drain electrode 175l, and a third drain electrode 175c are formed on the semiconductors 154h, 154l, and 154c and the gate insulating layer.

The data line 171 transfers a data signal and mainly extends in a vertical direction to cross the first gate line 121h and the second gate line 121l. The first source electrode 173h and the second source electrode 173l are respectively formed to protrude from the data line 171 on the first gate electrode 124h and the second gate electrode 124l. The first source electrode 173h and the second source electrode 173l are connected to each other.

One end portion of the first drain electrode 175h is partially surrounded by the first source electrode 173h, and the other end portion thereof is formed at the center of the first subpixel area PX_h. One end portion of the second drain electrode 175l is partially surrounded by the second source electrode 173l, and the other end portion thereof is formed at the center of the second subpixel area PX_l.

The third source electrode 173c is connected to the second drain electrode 175l, and the third drain electrode 175c is formed on the third gate electrode 124c to be spaced apart from the third source electrode 173c. The third drain electrode 175c overlaps with the storage electrode 137, thereby forming a capacitor Cs.

The first/second/third gate electrode 124h/124l/124c, the first/second/third source electrode 173h/173l/173c, and the first/second/third drain electrode 175h/175l/175c form a first/second/third thin film transistor (TFT) Qh/Ql/Qc along with the first/second/third semiconductor 154h/154l/154c, and a channel of the thin film transistor is respectively formed in the semiconductor 154h/154l/154c between the source electrode 173h/173l/173c and the drain electrode 175h/175l/175c.

A passivation layer (not shown) is formed on the data conductors 171, 173h, 173l, 173c, 175h, 175l, and 175c and the exposed semiconductors 154h, 154l, and 154c.

A first contact hole 185h and a second contact hole 185l are respectively formed in the passivation layer to expose at least a part of the first drain electrode 175h and at least a part of the second drain electrode 175l.

Pixel electrodes 191h and 191l are formed on the passivation layer. The pixel electrodes 191h and 191l of which have a substantially quadrangular shape include a first subpixel electrode 191h and a second subpixel electrode 191l. The first subpixel electrode 191h is formed in the first subpixel area PX_h, the second subpixel electrode 191l is formed in the second subpixel area PX_l.

The first sub-pixel electrode 191h and the second sub-pixel electrode 191l include cross-shaped stem portions formed by horizontal stem portions 193h and 193l and vertical stem portions 192h and 192l crossing the horizontal stem portions 193h and 193l. Further, the first sub-pixel electrode 191h and the second sub-pixel electrode 191l include a plurality of micro-branch portions 194h and 194l, respectively.

The first subpixel area PX_h and the second subpixel area PX_l of the first color pixel area PX(R) are respectively divided into four domains D1, D2, D3, and D4 by the horizontal stem portions 193h and 193l and the vertical stem portions 192h and 192l. The micro-branch portions 194h and 194l obliquely extend from the horizontal stem portions 19hl and 193l and the vertical stem portions 192h and 192l, and the extension direction may form an angle of approximately 45° or 135° with the gate line 121 or the horizontal stem portions 193*h* and 193*l*. Further, the directions in which the micro-branch portions 194*h* and 194*l* in two adjacent sub-regions extend may be orthogonal to each other.

The first sub-pixel electrode 191*h* and the second sub-pixel electrode 191*l* may further include outer stem portions surrounding outer sides of the first subpixel electrode 191*h* and the second subpixel electrode 191*l*, respectively The first subpixel electrode 191*h* is connected to the first drain electrode 175*h* through the first contact hole 185*h* to receive a data voltage, and the second subpixel electrode 191*l* is connected to the second drain electrode 175*l* through the second contact hole 185*l* to receive a data voltage.

When a gate-on voltage is applied to the first gate line 121*h*, the first thin film transistor Qh and the second thin film transistor Ql are respectively turned on to apply the data voltage of the data line 171 to the first subpixel electrode 191*h* and second subpixel electrode 191*l*.

When a gate-off voltage is applied to the first gate line 121*h* and a gate-on voltage is applied to the second gate line 121*l*, the first thin film transistor Qh and the second thin film transistor Ql are turned off and the third thin film transistor Qc is turned on. Accordingly, a charge of the second subpixel electrode 191*l* flows to the capacitor Cs, and thus the voltage charged to the second subpixel electrode 191*l* is reduced. As a result, a pixel voltage applied to the second subpixel electrode 191*l* becomes lower than a pixel voltage applied to the first subpixel electrode 191*h*, and this voltage difference may improve side visibility of the liquid crystal display device.

The first color filter 230R is disposed in the entire first subpixel area PX_h of the first color pixel area PX(R). The first color filter 230R is disposed at a left region of the second subpixel area PX_l of the first color pixel area PX(R), but is not formed at a right region thereof. That is, the first color filter 230R is disposed at the first domain D1 and the fourth domain D4 of the second pixel PX_I of the first color pixel PX(R). The first color pixel area PX(R) includes the first transparent region E(R) at which no first color filter 230R is disposed, and the first transparent region E(R) overlaps with the second domain D2 and the third domain D3.

FIG. 29 illustrates the first color pixel area PX(R), and each of the second color pixel area PX(G) and the third color pixel area PX(B) may have substantially the same pixel structure as the first color pixel area PX(R).

In the present exemplary embodiment, each of the pixel areas PX(R), PX(G), and PX(B) is divided into two subpixel areas PX_h and PX_l, and the transparent regions E(R), E(G), and E(B) are disposed in the second subpixel area PX_l of the two subpixel areas PX_h and PX_l, which has a relatively weak magnitude of an electric field. The transparent regions E(R), E(G), and E(B) display a white color, thereby improving the luminance when each of the pixel areas PX(R), PX(G), and PX(B) displays a high gray. Further, when each of the pixel areas PX(R), PX(G), and PX(B) displays a low gray, it is possible to improve the color reproducibility.

Next, a liquid crystal display device according to an exemplary embodiment of the present invention will be described with reference to FIG. 30.

Figure 30:
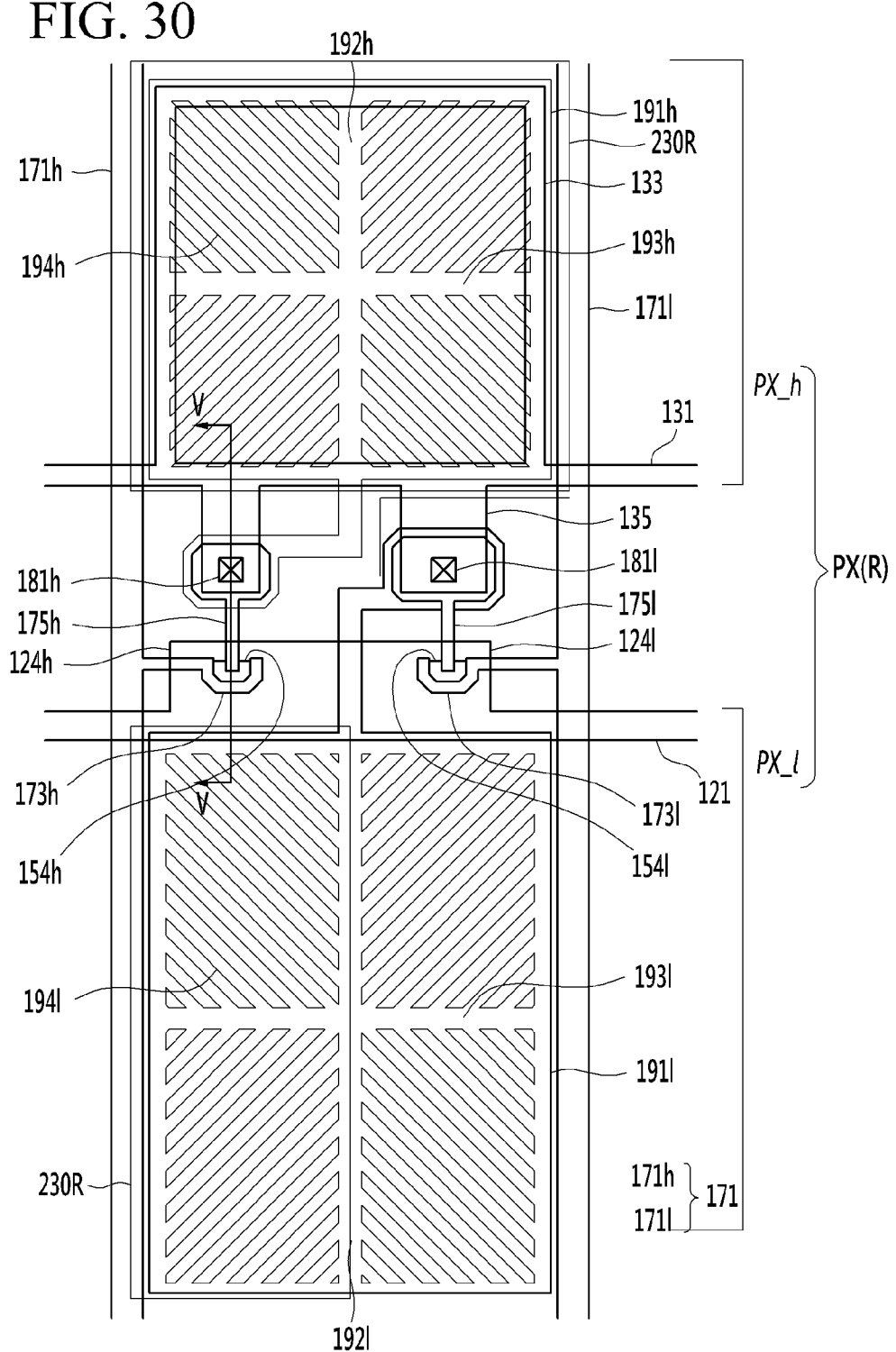
FIG. 30 is a top plan view illustrating one pixel included in a liquid crystal display device according to an exemplary embodiment of the present invention.

Since the liquid crystal display device according to the exemplary embodiment of the present invention illustrated in FIG. 30 is substantially the same as the liquid crystal display device according to the exemplary embodiment of the present invention illustrated in FIG. 27 to FIG. 29, the overlapping description thereof will not be provided. The present exemplary embodiment is different from the above exemplary embodiment in that the pixel design for the thin film transistor or the like, and hereinafter, will be described in more detail.

FIG. 30 is a top plan view illustrating one pixel included in a liquid crystal display device according to an exemplary embodiment of the present invention.

The first color filter 230R is disposed in the first color pixel area PX(R). The first color pixel area PX(R) includes the first transparent region E(R) at which no first color filter (230R) is formed. The first color pixel area PX(R) may have a substantially quadrangular shape, and may include a first subpixel area PX_h and a second subpixel area PX_l. The first color filter 230R is disposed in the entire first subpixel area PX_h, and is disposed at a region of the second subpixel area PX_l. The first transparent region E(R) may display a white color, and although not shown, a transparent member may be disposed in the first transparent region E(R).

The gate line 121 and a first gate electrode 124*h* and second gate electrode 124*l* protruding from the gate line 121 are formed on a substrate (not shown). The gate line 121, the first gate electrode 124*h*, and the second gate electrode 124*l* may be formed on the same substrate as that of the color filter 230R, or on a substrate that is disposed to be opposite to that of the color filter 230R.

The gate line 121 mainly extends in a horizontal direction to transmit a gate signal. The first gate electrode 124*h* and the second gate electrode 124*l* upwardly protrude at an upper portion of the gate line 121 when viewed from the top. The first gate electrode 124*h* and the second gate electrode 124*l* are connected to each other to form one protrusion. However, the present invention is not limited thereto, and the protruding form of the first gate electrode 124*h* and the second gate electrode 124*l* may be variously modified.

A storage electrode line 131 and storage electrodes 133 and 135 protruding from the storage electrode line 131 may be further formed on the substrate 110.

The storage electrode line 131 extends in a direction parallel to the gate line 121, and is formed to be spaced apart from the gate line 121. The storage electrode line 131 may be formed at the same layer as the gate line 121 by using the same material as that of the gate line 121. The storage electrode 133 protruding above the storage electrode line 131 is formed to surround an edge of the first subpixel area PXa. The storage electrode 135 protruding below the storage electrode line 131 is formed to be adjacent to the first gate electrode 124*h* and the second gate electrode 124*l*. A predetermined voltage may be applied to the storage electrode line 131.

A gate insulating layer (not shown) is formed on the gate line 121, the first gate electrode 124*h*, the second gate electrode 124*l*, the storage electrode line 131, and the storage electrodes 133 and 135. The gate insulating layer may be made of an inorganic insulating material such as a silicon nitride (SiNx) and a silicon oxide (SiOx). Further, the gate insulating layer may be formed of a single layer or a multilayer.

The first semiconductor 154*h* and the second semiconductor 154*l* may be formed on the gate insulating layer. The first semiconductor 154*h* may overlap with the first gate electrode 124*h*, and the second semiconductor 154*l* may overlap with the second gate electrode 124*l*. Each of the first semiconductor 154*h* and the second semiconductor 154*l* may be formed of amorphous silicon, polycrystalline silicon, or a metal oxide.

An ohmic contact member (not shown) is formed on the first semiconductor 154h and the second semiconductor 154l. The ohmic contact may be made of a material such as n+ hydrogenated amorphous silicon in which an n-type impurity such as phosphorus is doped with a high concentration, or of a silicide.

The second semiconductor 154l, the gate insulating layer, the first data line 171h, the second data line 171l, the first source electrode 173h, the first drain electrode 175h, the second source electrode 173l, and the second drain electrode 175l are formed on the first semiconductor 154h.

The first data line 171h and the second data line 171l transfer data signals and mainly extend in a vertical direction to cross the gate line 121 and the storage electrode line 131.

The first data line 171h and the second data line 171l transfer different data voltages. The data voltage transferred through the second data line 171l may be lower than the data voltage transferred through the first data line 171h. Alternatively, the data voltage transferred by the second data line 171l may be higher than the data voltage transferred by the first data line 171h.

The first source electrode 173h protrudes above the first gate electrode 124h from the first data line 171h, and the second source electrode 173l protrudes above the second gate electrode 124l from the second data line 171l. Each of the first drain electrode 175h and the second drain electrode 175l include one wide end portion and the other rod-shaped end portion. The wide end portions of the first drain electrode 175h and the second drain electrode 175l overlap with the storage electrode 135 protruding below the storage electrode line 131. The rod-shaped end portions of the first drain electrode 175h and the second drain electrode 175l are partially surrounded by the first source electrode 173h and the second source electrode 173l, respectively.

The first and second gate electrodes 124h and 124l, the first and second source electrodes 173h and 173l, and the first and second drain electrodes 175h and 175l form first and second thin film transistors (TFT) Qh and Ql together with the first and second semiconductors 154h and 154l, and channels of the thin film transistors are formed in the semiconductors 154h and 154l between the source electrodes 173h and 178l and the drain electrodes 175h and 175l, respectively.

A passivation layer (not shown) is formed on the first semiconductor 154h exposed between the first data line 171h, the second data line 171l, the first source electrode 173h, the first drain electrode 175h, the first source electrode 173h, and the first drain electrode 175h, and the second semiconductor 154l exposed between the second source electrode 173l, the drain electrode 175l, the second source electrode 173l, and the second drain electrode 175l.

A first contact hole 181h and a second contact hole 181l are respectively formed in the passivation layer to expose a wide end portion of the first drain electrode 175h and a wide end portion of the second drain electrode 175l.

A pixel electrode 191 is formed on the passivation layer. The pixel electrode 191 may be formed of a transparent metal oxide such as indium tin oxide (ITO) or indium zinc oxide (IZO).

The pixel electrode 191 includes the first subpixel electrode 191h and the second subpixel electrode 191l. The first subpixel electrode 191h and the second subpixel electrode 191l are vertically disposed with respect to the gate line 121 and the storage electrode line 131. The first subpixel electrode 191h is disposed in the first subpixel area PX_h, and the second subpixel electrode 191l is disposed in the second subpixel area PX_l. However, the disposal pattern of the first subpixel electrode 191h and the second subpixel electrode 191l may be variously changed without being limited thereto.

A general shape of each of the first sub-pixel electrode 191h and the second sub-pixel electrode 191l may be a quadrangle, and the first sub-pixel electrode 191h and the second sub-pixel electrode 191l include cross-shaped stem portions formed by horizontal stem portions 193h and 193l and vertical stem portions 192h and 192l crossing the horizontal stem portions 193h and 193l. Further, each of the first sub-pixel electrode 191h and the second sub-pixel electrode 191l includes a plurality of micro-branch portions 194h and 194l.

The first subpixel area PX_h and the second subpixel area PX_l of the first color pixel area PX(R) are divided into four sub-regions by the horizontal stem portions 193h and 193l and the vertical stem portions 192h and 192l. The micro-branch portions 194h and 194l obliquely extend from the horizontal stem portions 193hl and 193l and the vertical stem portions 192h and 192l, and the extension direction may form an angle of approximately 45° or 135° with the gate line 121 or the horizontal stem portions 193h and 193l. Further, the directions in which the micro-branch portions 194h and 194l in two adjacent sub-regions extend may be orthogonal to each other.

In the present exemplary embodiment, the first sub-pixel electrode 191h and the second sub-pixel electrode 191l may further include outer stem portions surrounding outer sides of the first sub-pixel PXa and the second sub-pixel PXb, respectively.

The first sub-pixel electrode 191h is connected to the first drain electrode 175h through the first contact hole 185h, and the second sub-pixel electrode 191l is connected to the second drain electrode 175l through the second contact hole 181l. Accordingly, when the first thin film transistor Qh and the second thin film transistor Ql are turned on, different data voltages are respectively applied from the first drain electrode 175h and the second drain electrode 175l to the first subpixel electrode 191h and the second subpixel electrode 191l, and this voltage difference may improve side visibility of the liquid crystal display device.

The first color filter 230R is disposed in the entire first subpixel area PX_h of the first color pixel area PX(R). The first color filter 230R is disposed at a left region of the second subpixel area PX_l of the first color pixel area PX(R), but is not formed at a right region thereof. That is, the first color filter 230R is disposed at the first domain D1 and the fourth domain D4 of the second pixel PX_l of the first color pixel PX(R). The first color pixel area PX(R) includes the first transparent region E(R) at which no first color filter 230R is disposed, and the first transparent region E(R) overlaps with the second domain D2 and the third domain D3.

FIG. 30 illustrates the first color pixel area PX(R), and similarly, each of the second color pixel area PX(G) and the third color pixel area PX(B) may have substantially the same pixel structure as the first color pixel area PX(R).

Next, a liquid crystal display device according to an exemplary embodiment of the present invention will be described with reference to FIG. 31.

Figure 31:
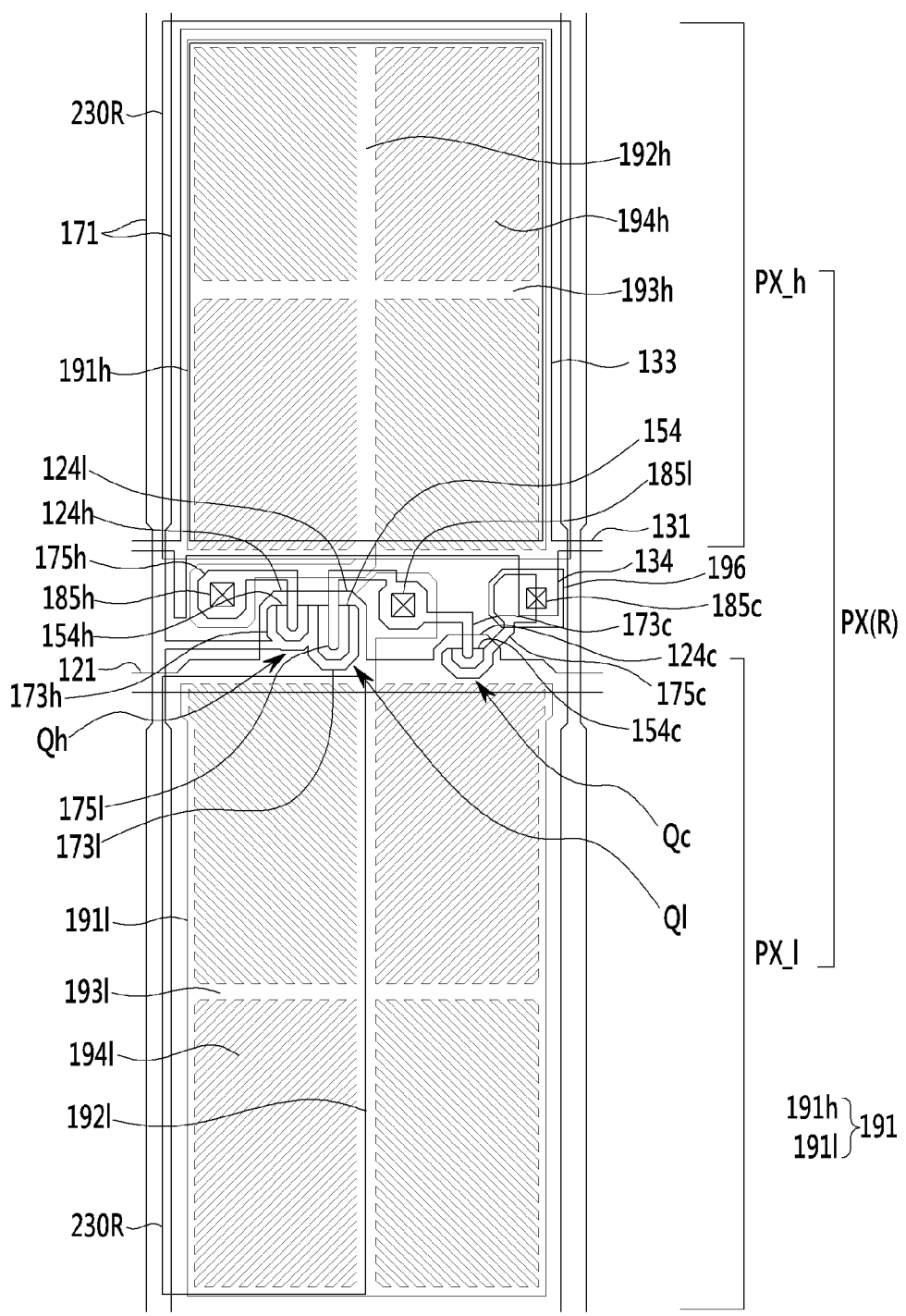
FIG. 31 is a top plan view illustrating one pixel included in a liquid crystal display device according to an exemplary embodiment of the present invention.

Since the liquid crystal display device according to the exemplary embodiment of the present invention illustrated in FIG. 31 is substantially the same as the liquid crystal display device according to the exemplary embodiment of the present invention illustrated in FIG. 27 to FIG. 29, any repetitive description will not be provided. The present exemplary embodiment is different from the above exemplary embodiment in that the pixel design for the thin film transistor and the like, and hereinafter, will be described in more detail.

FIG. 31 is a top plan view illustrating one pixel included in a liquid crystal display device according to an exemplary embodiment of the present invention.

The first color filter 230R is disposed in the first color pixel area PX(R). The first color pixel area PX(R) includes the first transparent region E(R) at which no first color filter (230R) is formed. The first color pixel area PX(R) may have a substantially quadrangular shape, and may include a first subpixel area PX_h and a second subpixel area PX_l. The first color filter 230R is disposed in the entire first subpixel area PX_h, and is disposed at a region of the second subpixel area PX_l. The first transparent region E(R) may display a white color, and although not shown, a transparent member may be disposed in the first transparent region E(R).

A gate line 121 and a storage electrode line 131 are formed on a substrate (not shown). The gate line 121, a first gate electrode 124h, and a second gate electrode 124l may be formed on the same substrate as that of the color filter 230R, or on a substrate that is disposed to be opposite to that of the color filter 230R. The gate line 121 mainly extends in a horizontal direction to transmit a gate signal. The first gate electrode 124h and the second gate electrode 124l are formed to extend from the gate line 121 to be connected to each other. A third gate electrode 124c is formed to protrude from the gate line 121 to be separated from the first gate electrode 124h and the second gate electrode 124l. The first to third gate electrodes 124h, 124l, and 124c are connected to the same gate line 121 to receive the same gate signal.

The storage electrode line 131 extends in the same direction as that of the gate line 121, and a predetermined voltage is applied to the storage electrode line 131. A storage electrode 133 and a protrusion 134 are formed to protrude from the storage electrode line 131. The storage electrode 133 may be formed to surround a first subpixel electrode 191h to be described later, and the protrusion 134 may protrude toward the gate line 121.

A gate insulating layer (not shown) is formed on the gate line 121, the first to third gate electrodes 124h, 124l, and 124c, the storage electrode line 131, the storage electrode 133, and the protrusion 134. The gate insulating layer may be an inorganic insulating material such as a silicon nitride (SiNx) or a silicon oxide (SiOx). Further, the gate insulating layer may be formed of a single layer or a multilayer.

A first semiconductor 154h, a second semiconductor 154l, and a third semiconductor 154c are formed on the gate insulating layer. The first semiconductor 154h is disposed on the first gate electrode 124h, the second semiconductor 154l is disposed on the second gate electrode 124l, and third semiconductor 154c is disposed on the third gate electrode 124c.

The first source electrode 173h, the first drain electrode 175h, the second source electrode 173l, the second drain electrode 175l, the third source electrode 173c, and the third drain electrode 175c are formed on the first to third semiconductors 154h, 154l, and 154c and the gate insulating layer.

The first to third semiconductors 154h, 154l, and 154c may be formed on the first to third gate electrodes 124h, 124l, and 124c, and may also be formed below the data line 171. The second semiconductor 154l and the third semiconductor 154c may be formed to be connected to each other. However, the present invention is not limited thereto. For example, the first to third semiconductors 154h, 154l, and 154c may be formed only on the first to third gate electrodes 124h, 124l, and 124c, and the second semiconductor 154l and the third semiconductor 154c may be formed to be separate from each other.

The data line 171 transfers a data signal and mainly extends in a vertical direction to cross the gate line 121.

The first source electrode 173h is formed to protrude from the data line 171 on the first gate electrode 124h. The first source electrode 173h may have a bent C-shape on the first gate electrode 124h.

The first drain electrode 175h is formed to be spaced apart from the first source electrode 173h on the first gate electrode 124h. A channel is formed on the first semiconductor layer 154h corresponding to an exposed part between the first source electrode 173h and the first drain electrode 175h spaced apart from each other.

The second source electrode 173l is formed to protrude from the data line 171 on the second gate electrode 124l. The second source electrode 173l may have a bent C-shape on the second gate electrode 124l.

The second drain electrode 175l is formed to be spaced apart from the second source electrode 173l on the second gate electrode 124l. A channel is formed on the second semiconductor layer 154l corresponding to an exposed part between the second source electrode 173l and the second drain electrode 175l spaced apart from each other.

The third source electrode 173c is connected to the second drain electrode 175l, and is formed on the third gate electrode 124c.

The third drain electrode 175c is formed on the third gate electrode 124c to be spaced apart from the third source electrode 173c. A channel is formed in a portion of the third semiconductor layer 151c that is exposed between the third source electrode 173c and the third drain electrode 175c that are formed to be spaced apart from each other.

The first gate electrode 124h, the first semiconductor 154h, the first source electrode 173h, and the first drain electrode 175h constitute a first thin film transistor Qh. Further, the second gate electrode 124l, the second semiconductor 154l, the second source electrode 173l, and the second drain electrode 175l constitute a second thin film transistor Ql, and the third gate electrode 124c, the third semiconductor 154c, the third source electrode 173c, and the third drain electrode 175c constitute a third thin film transistor Qc.

A passivation layer (not shown) is formed on the data line 171, the first to third source electrodes 173h, 173l, and 173c, and the first to third drain electrodes 175h, 175l, and 175c.

The passivation layer has a first contact hole 185h for exposing a portion of the first drain electrode 175a, a second contact hole 185l for exposing a portion of the second drain electrode 175b, and a third contact hole 185c for exposing portions of the protrusion 134 and the third drain electrode 175c.

A first subpixel electrode 191h and a second subpixel electrode 191l are formed on the passivation layer. In addition, a bridge electrode 196 is formed on the passivation layer.

The first subpixel electrode 191h is connected to the first drain electrode 175h through the first contact hole 185h, and the second subpixel electrode 191l is connected to the second drain electrode 175l through the second contact hole 185l. The bridge electrode 196 is electrically connected to the protrusion 134 and the third drain electrode 175c through the third contact hole 185c. As a result, the third drain electrode 175c is connected to the storage electrode line 131.

A data voltage is applied to the first subpixel electrode 191h and the second subpixel electrode 191l from the first drain electrode 175h and the second drain electrode 175l, respectively. In this case, a portion of the data voltage applied to the second drain electrode 175l is divided through the third source electrode 173c such that the voltage applied to the second subpixel electrode 191I may be smaller than the voltage applied to the first subpixel electrode 191h. This is a case in which the data voltage applied to the first subpixel electrode 191h and the second subpixel electrode 191I is positive, and in contrast, when the data voltage applied to the first subpixel electrode 191h and the second subpixel electrode 191I is negative, the voltage applied to the first subpixel electrode 191h may be smaller than the voltage applied to the second subpixel electrode 191I.

An area of the second subpixel electrode 191I may be approximately one to two times larger than that of the first subpixel electrode 191h.

The first subpixel electrode 191h and the second subpixel electrode 191l neighbor each other in the column direction, the overall shape thereof is quadrangular, and each includes a cross-like stem having a horizontal stem 192h (192l) and a vertical stem 193h (192l) intersecting thereto. Further, the first subpixel electrode 191h and the second subpixel electrode 191I are respectively divided into four subregions by the horizontal stem portions 193h and 193l and the vertical stem portions 192h and 192l, and each of the subregions includes a plurality of micro-branch portions 194h and 194l.

The first subpixel area PX_h and the second subpixel area PX_l of the first color pixel area PX(R) are respectively divided into four domains D1, D2, D3, and D4 by the horizontal stem portions 193h and 193l and the vertical stem portions 192h and 192l. The micro-branch portions 194h and 194l obliquely extend from the horizontal stem portions 19hl and 193l and the vertical stem portions 192h and 192l, and the extension direction may form an angle of approximately 45° or 135° with the gate line 121 or the horizontal stem portions 193h and 193l. Further, the directions in which the micro-branch portions 194h and 194l in two adjacent subregions extend may be orthogonal to each other.

The first color filter 230R is disposed in the entire first subpixel area PX_h of the first color pixel area PX(R). The first color filter 230R is disposed at a left region of the second subpixel area PX_l of the first color pixel area PX(R), but is not formed at a right region thereof. That is, the first color filter 230R is disposed at the first domain D1 and the fourth domain D4 of the second pixel PX_l of the first color pixel PX(R). The first color pixel area PX(R) includes the first transparent region E(R) at which no first color filter 230R is disposed, and the first transparent region E(R) overlaps with the second domain D2 and the third domain D3.

FIG. 31 illustrates the first color pixel area PX(R), and similarly, each of the second color pixel area PX(G) and the third color pixel area PX(B) may have substantially the same pixel structure as the first color pixel area PX(R).

Next, a liquid crystal display device according to an exemplary embodiment of the present invention will be described with reference to FIG. 32.

Figure 32:
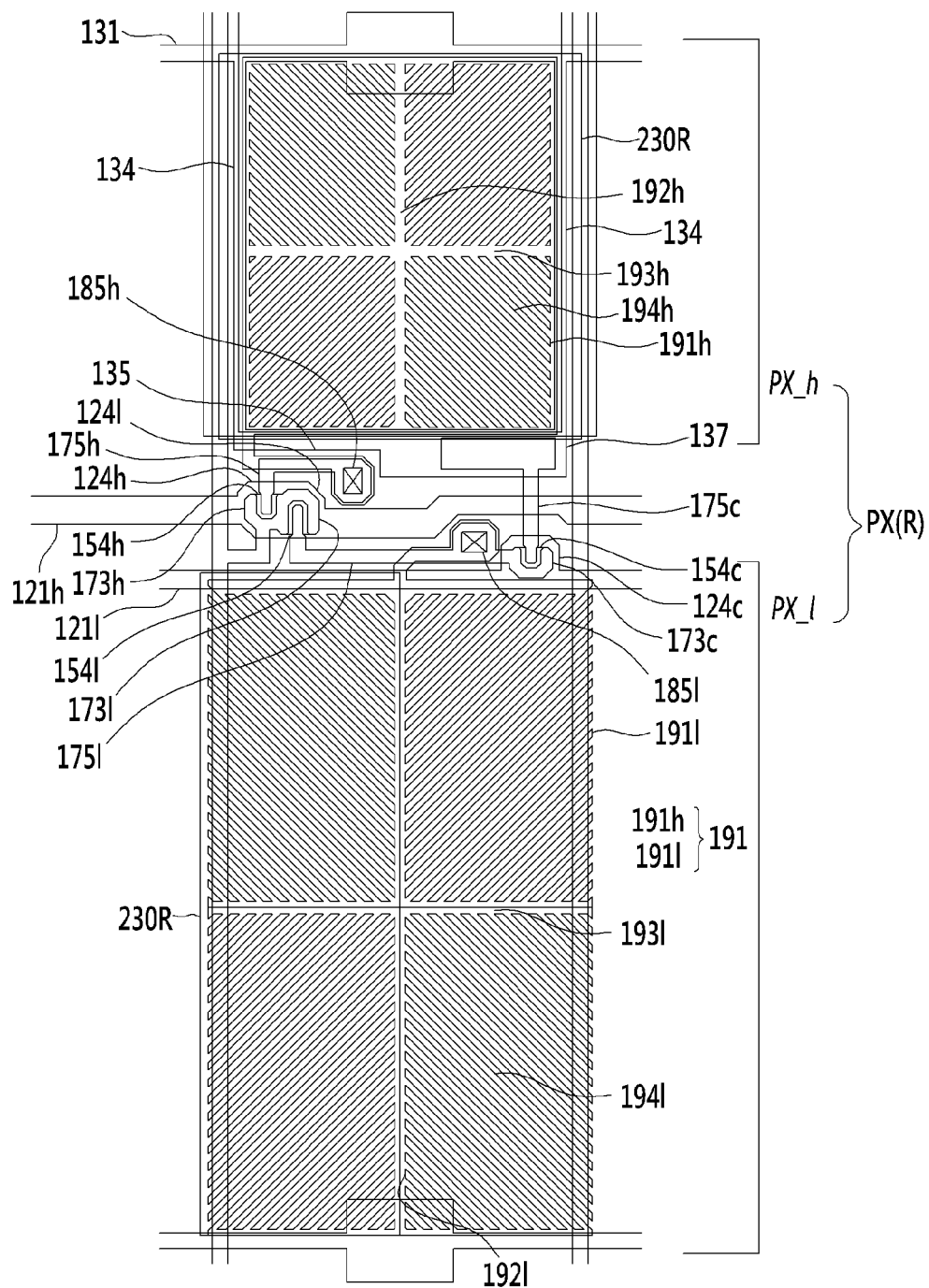
FIG. 32 is a top plan view illustrating one pixel included in a liquid crystal display device according to an exemplary embodiment of the present invention.

Since the liquid crystal display device according to the exemplary embodiment of the present invention illustrated in FIG. 32 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the shape of the pixel electrode, and hereinafter, will be described in more detail.

FIG. 32 is a top plan view illustrating one pixel included in a liquid crystal display device according to an exemplary embodiment of the present invention.

The first color filter 230R is disposed in the first color pixel area PX(R). The first color pixel area PX(R) includes the first transparent region E(R) at which no first color filter (230R) is formed. The first color pixel area PX(R) may have a substantially quadrangular shape, and may include a first subpixel area PX_h and a second subpixel area PX_l. The first color filter 230R is disposed in the entire first subpixel area PX_h, and is disposed at a region of the second subpixel area PX_l. The first transparent region E(R) may display a white color, and although not shown, a transparent member may be disposed in the first transparent region E(R).

The pixel electrodes 191h and 191l, each of which has a substantially quadrangular shape, include a first subpixel electrode 191h and a second subpixel electrode 191l. The first subpixel electrode 191h is formed in the first subpixel area PX_h, and the second subpixel electrode 191l is formed in the second subpixel area PX_l.

The first sub-pixel electrode 191h and the second sub-pixel electrode 191l include cross-shaped stem portions formed by horizontal stem portions 193h and 193l and vertical stem portions 192h and 192l crossing the horizontal stem portions 193h and 193l. The first subpixel electrode 191h includes one horizontal stem portion 193h and one vertical stem portion 192, and the second subpixel electrode 191l includes one horizontal stem portion 193l and two vertical stem portions 192l. The two vertical stem portion 192l are horizontally disposed in parallel with each other. Further, the first subpixel electrode 191h and the second subpixel electrode 191l respectively include a plurality of micro-branch portions 194h and 194l.

The second subpixel area PX_l includes a first subregion and a second subregion. In the first subregion, one of the two vertical stem portions 192l, the horizontal stem portion 193l, and the micro-branch portion 194l extending therefrom are formed. In the second subregion, the other one of the two vertical stem portions 192l, the horizontal stem portion 193l, and the micro-branch portion 194l extending therefrom are formed. The first subregion and the second subregion may be respectively disposed at a left portion and a right portion. In the second subpixel area PX_l, the first color filter 230R and the first transparent region E(R) may be respectively disposed at the first subregion and the second subregion. However, the present invention is not limited thereto. For example, in the second subpixel area PX_l, the first color filter 230R and the first transparent region E(R) may be respectively disposed at the second subregion and the first subregion.

In the present exemplary embodiment, in the second subpixel area PX_l, all of the micro-branch portions 194l extending in four directions are formed at the region at which the first color filter 230R is disposed. Further, in the first transparent region E(R), all of the micro-branch portions 194l extending in four directions are formed. As a result, a screen viewed from a left portion of the liquid crystal display device may be substantially the same as a screen viewed from a right portion thereof, thereby improving side visibility of the liquid crystal display device.

FIG. 32 illustrates the first color pixel area PX(R), and similarly, each of the second color pixel area PX(G) and the third color pixel area PX(B) may have substantially the same pixel structure as the first color pixel area PX(R).

Next, a liquid crystal display device according to an exemplary embodiment of the present invention will be described with reference to FIG. 33.

Figure 33:
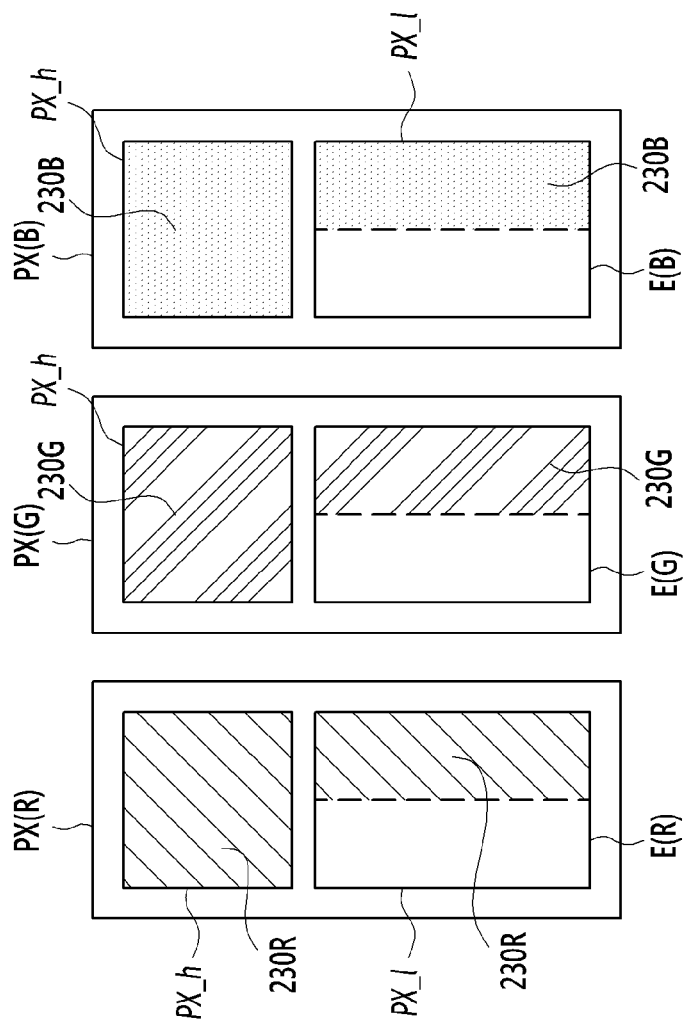
FIG. 33 is a top plan view illustrating a liquid crystal display device according to an exemplary embodiment of the present invention.

Since the liquid crystal display device according to the exemplary embodiment of the present invention illustrated in FIG. 33 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the positions of the transparent regions, and hereinafter, will be described in more detail.

FIG. 33 is a top plan view illustrating a liquid crystal display device according to an exemplary embodiment of the present invention.

The first color filter 230R is disposed in the first color pixel area PX(R). The first color pixel area PX(R) includes the first transparent region E(R) at which no first color filter (230R) is formed. The first color pixel area PX(R) may have a substantially quadrangular shape, and may include a first subpixel area PX_h and a second subpixel area PX_l. The first color filter 230R is disposed in the entire first subpixel area PX_h, and is disposed on less than all of the second subpixel area PX_l. The first transparent region E(R) may display a white color, and although not shown, a transparent member may be disposed in the first transparent region E(R).

In the second subpixel area PX_l, the first color filter 230R and the first transparent region E(R) may be respectively disposed at a right region and a left region.

In other words, in the above exemplary embodiment of FIG. 27 to FIG. 29, in the second subpixel area PX_l, the first color filter 230R and the first transparent region E(R) are formed at the left region and the right region, while in the present exemplary embodiment, the positions thereof are switched. Further, in the above exemplary embodiment, the first transparent region E(R) is formed at the first domain D1 and the fourth domain D4 of the four domains D1, D2, D3, and D4, while in the present exemplary embodiment, the first transparent region E(R) is formed at the second domain D2 and the third domain D3 thereof.

The second color filter 230G is disposed in the second color pixel area PX(G), and the second color pixel area PX(G) includes the second transparent region E(G) at which the second color filter 230G is not disposed. The third color filter 230B is disposed in the third color pixel area PX(B), and the third color pixel area PX(B) includes the third transparent region E(B) at which the third color filter 230B is not disposed. The second transparent region E(G) and the third transparent region E(B)b are respectively formed at the left region of the second subpixel area PX_l of the second color pixel area PX(G) and the third color pixel area PX(B).

Next, a liquid crystal display device according to an exemplary embodiment of the present invention will be described with reference to FIG. 34.

Figure 34:
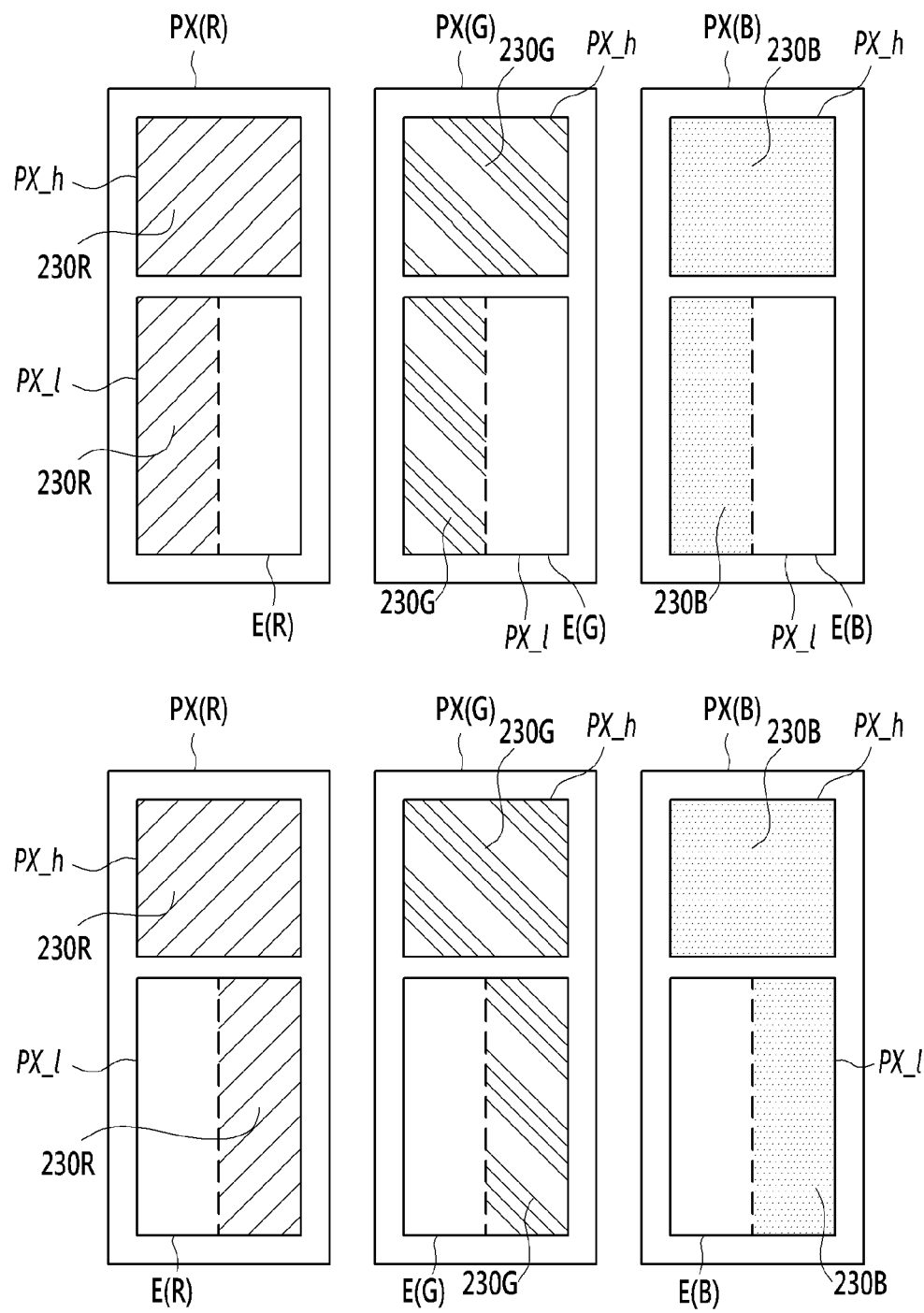
FIG. 34 is a top plan view illustrating a liquid crystal display device according to an exemplary embodiment of the present invention.

Since the liquid crystal display device according to the exemplary embodiment of the present invention illustrated in FIG. 34 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the positions of the transparent regions, and hereinafter, will be described in more detail.

FIG. 34 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

Each of the pixel areas PX(R), PX(G), and PX(B) may include a plurality of corresponding pixel areas. Positions of first transparent regions E(R) of adjacent first color pixel areas PX(R) are different from each other. For example, a first transparent region E(R) of an upper one of two first color pixel area PX(R) that are vertically adjacent to each other overlaps with the second domain D2 and the third domain D3 of the second subpixel area PX_l, and a first transparent region E(R) of a lower first color pixel area PX(G) overlaps with the first domain D1 and the fourth domain D4 of the second subpixel area PX_l.

Positions of second transparent regions E(G) of adjacent second color pixel areas PX(G) are different from each other, and positions of second transparent regions E(G) of the adjacent third color pixel areas PX(B) are different from each other.

At each of the domains D1, D2, D3, and D4, micro-branch portions of pixel electrodes are formed in different directions. The transparent regions E(R), E(G), and E(B) are formed at some of the four domains D1, D2, D3, and D4. In this case, if the positions of the transparent regions E(R), E(G), and E(B) in all the pixel areas PX(R), PX(G), and PX(B) are the same, a screen viewed from a left portion of the liquid crystal display device may be different from a screen viewed from a right portion thereof. In the present exemplary embodiment, the screens viewed from the left portion and right portion of the liquid crystal display device can be made substantially the same by adjusting the shape, size, and positions of the transparent regions E(R), E(G), and E(B) in the adjacent pixel areas PX(R), PX(G), and PX(B), thereby improving side visibility of the liquid crystal display device.

Next, a liquid crystal display device according to an exemplary embodiment of the present invention will be described with reference to FIG. 35.

Figure 35:
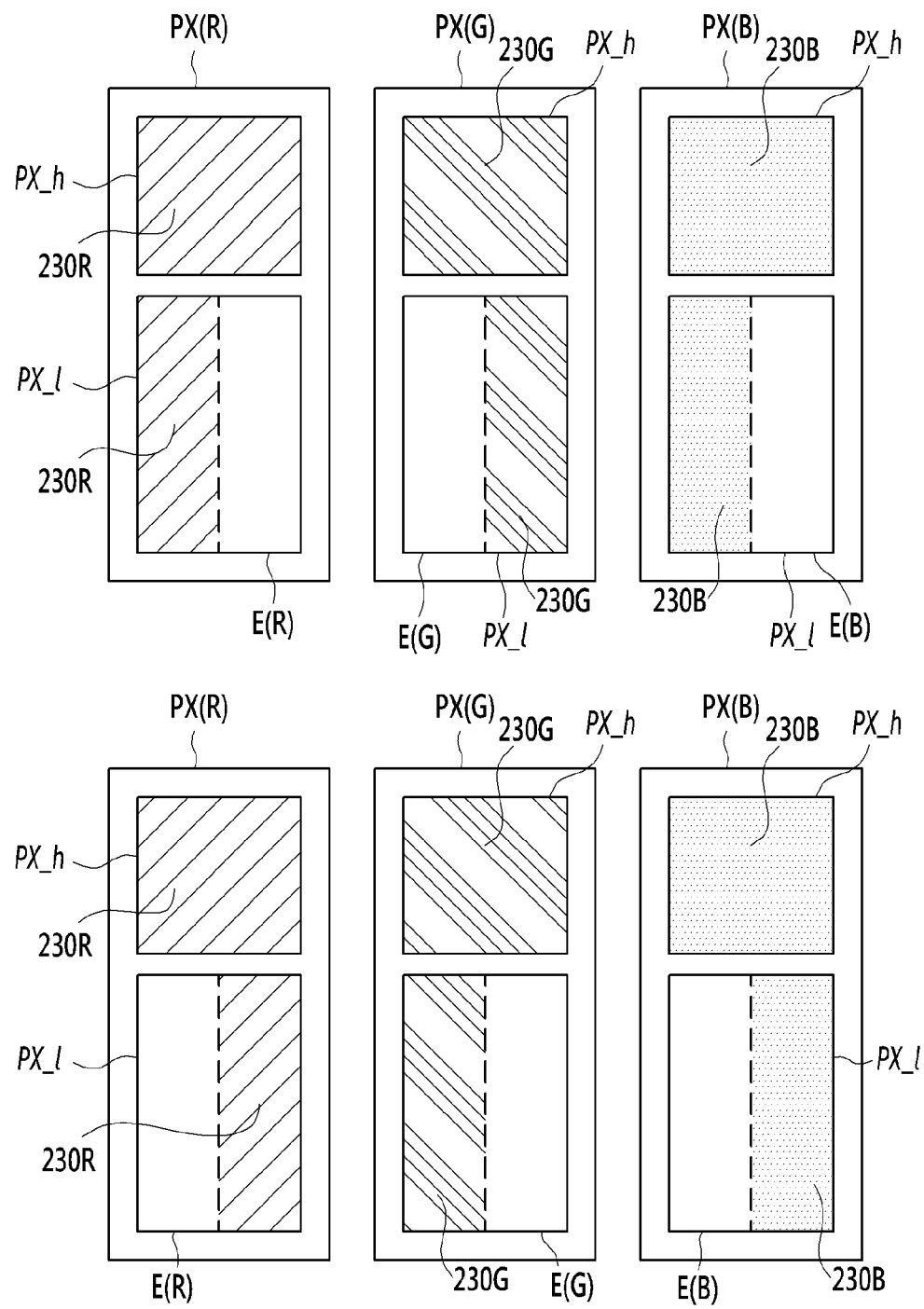
FIG. 35 is a top plan view illustrating a liquid crystal display device according to an exemplary embodiment of the present invention.

Since the liquid crystal display device according to the exemplary embodiment of the present invention illustrated in FIG. 35 is substantially the same as the liquid crystal display device according to the exemplary embodiment of the present invention illustrated in FIG. 35, any repetitive description will not be provided. The present exemplary embodiment is different from the above exemplary embodiment in the positions of the transparent regions, and hereinafter, will be described in more detail.

FIG. 35 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

Each of the pixel areas PX(R), PX(G), and PX(B) may include a plurality of corresponding pixel areas. The second color pixel area PX(G) is adjacent to the first color pixel area PX(R), and positions of the first transparent region E(R) of the first color pixel area PX(R) and the second transparent region E(G) of the second color pixel area PX(G) are different from each other. For example, the first transparent region E(R) overlaps with the second domain D2 and the third domain D3 of the second subpixel area PX_l of the first color pixel area PX(R), and the adjacent second transparent region E(G) overlaps with the first domain D1 and fourth domain D4 of the second subpixel area PX_l of the second color pixel area PX(G).

Similarly, the third color pixel area PX(B) is adjacent to the second color pixel area PX(G), and positions of the second transparent region E(G) of the second color pixel area PX(G) and the third transparent region E(B) of the third color pixel area PX(B) are different from each other. For example, the second transparent region E(G) overlaps with the first domain D1 and the fourth domain D4 of the second subpixel area PX_l of the second color pixel area PX(G), and the adjacent third transparent region E(B) overlaps with the second domain D2 and the third domain D3 of the second subpixel area PX_l of the third color pixel area PX(B).

Further, positions of first transparent regions E(R) of adjacent first color pixel areas PX(R) are different from each other. For example, a first transparent region E(R) of an upper one of two first color pixel area PX(R) that are vertically adjacent to each other overlaps with the second domain D2 and the third domain D3 of the second subpixel area PX_l, and a first transparent region E(R) of a lower first color pixel area PX(G) overlaps with the first domain D1 and the fourth domain D4 of the second subpixel area PX_l.

Positions of second transparent regions E(G) of adjacent second color pixel areas PX(G) are different from each other, and positions of second transparent regions E(G) of the adjacent third color pixel areas PX(B) are different from each other.

Next, a liquid crystal display device according to an exemplary embodiment of the present invention will be described with reference to FIG. 36 and FIG. 37.

Figure 36:
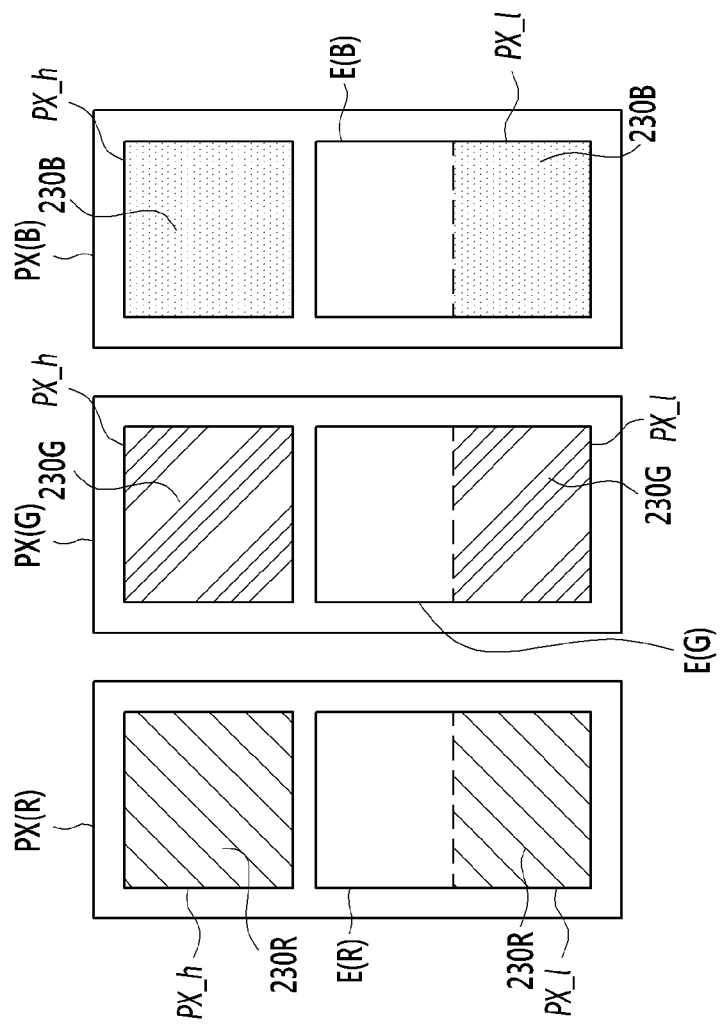
FIG. 36 is a top plan view illustrating a liquid crystal display device according to an exemplary embodiment of the present invention.
Figure 37:
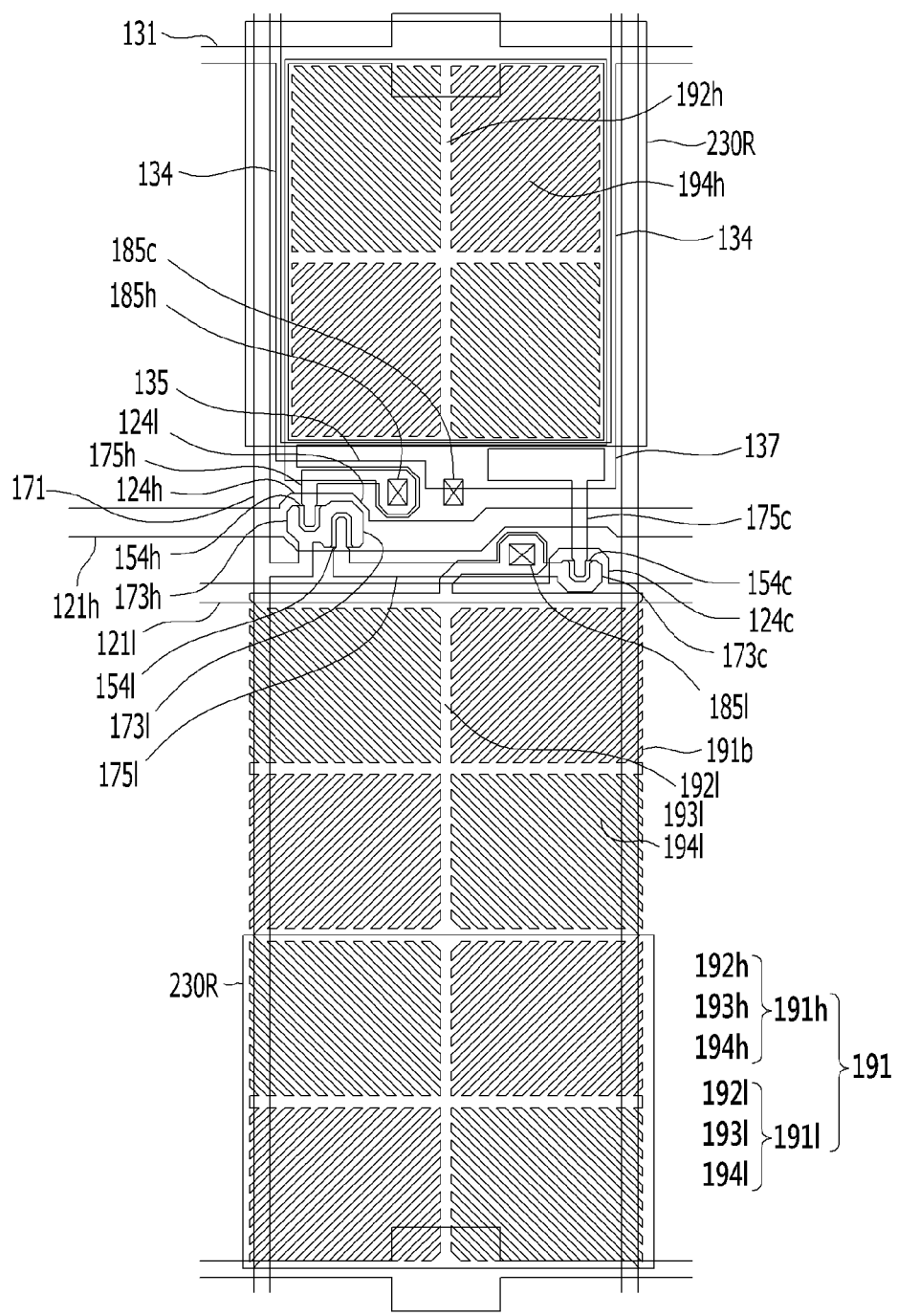
FIG. 37 is a top plan view illustrating one pixel included in a liquid crystal display device according to an exemplary embodiment of the present invention.

Since the liquid crystal display device according to the exemplary embodiment of the present invention illustrated in FIG. 36 and FIG. 37 is substantially the same as the liquid crystal display device according to the exemplary embodiment of the present invention illustrated in FIG. 27 to FIG. 29, the overlapping description thereof will not be provided. The present exemplary embodiment is different from the above exemplary embodiment in the positions of the transparent regions, and hereinafter, will be described in more detail.

FIG. 36 is a top plan view illustrating a liquid crystal display device according to an exemplary embodiment of the present invention, and FIG. 37 is a top plan view illustrating one pixel included in a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

The first color filter 230R is disposed in the first color pixel area PX(R). The first color pixel area PX(R) includes the first transparent region E(R) at which no first color filter 230R is formed. The first color pixel area PX(R) may have a substantially quadrangular shape, and may include a first subpixel area PX_h and a second subpixel area PX_l. The first color filter 230R is disposed in the entire first subpixel area PX_h, and is disposed at a region of the second subpixel area PX_l. The first transparent region E(R) may display a white color, and although not shown, a transparent member may be disposed in the first transparent region E(R).

The pixel electrodes 191$h$ and 191$l$ which have a substantially quadrangular shape include a first subpixel electrode 191$h$ and a second subpixel electrode 191$l$. The first subpixel electrode 191$h$ is formed in the first subpixel area PX_h, the second subpixel electrode 191$l$ is formed in the second subpixel area PX_l.

The first sub-pixel electrode 191$h$ and the second sub-pixel electrode 191$l$ include cross-shaped stem portions formed by horizontal stem portions 193$h$ and 193$l$ and vertical stem portions 192$h$ and 192$l$ crossing the horizontal stem portions 193$h$ and 193$l$. The first subpixel electrode 191$h$ includes one horizontal stem portion 193$h$ and one vertical stem portion 192$h$, and the second subpixel electrode 191$l$ includes two horizontal stem portions 193$l$ and one vertical stem portion 192$l$. The two horizontal stem portions 193$l$ are vertically disposed in parallel with each other. Further, the first sub-pixel electrode 191$h$ and the second sub-pixel electrode 191$l$ include a plurality of micro-branch portions 194$h$ and 194$l$, respectively.

The second subpixel area PX_l includes a first subregion and a second subregion. In the first subregion, one of the two horizontal stem portions 193$l$, the vertical stem portion 192$l$, and the micro-branch portions 194$l$ extending therefrom are formed. In the second subregion, the other one of the two horizontal stem portions 193$l$, the vertical stem portion 192$l$, and the micro-branch portion 194$l$ extending therefrom are formed. The first subregion and the second subregion may be respectively disposed at an upper portion and a lower portion. In the second subpixel area PX_l, the first color filter 230R and the first transparent region E(R) may be respectively disposed at the second subregion and the first subregion. However, the present invention is not limited thereto. For example, in the second subpixel area PX_l, the first color filter 230R and the first transparent region E(R) may be respectively disposed at the first subregion and the second subregion.

In the present exemplary embodiment, in the second subpixel area PX_l, all of the micro-branch portions 194$l$ extending in four directions are formed at the region at which the first color filter 230R is disposed. Further, in the first transparent region E(R), all of the micro-branch portions 194$l$ extending in four directions are formed. As a result, a screen viewed from a left portion of the liquid crystal display device may be substantially the same as a screen viewed from a right portion thereof, thereby improving side visibility of the liquid crystal display device.

FIG. 37 illustrates the first color pixel area PX(R), and similarly, each of the second color pixel area PX(G) and the third color pixel area PX(B) may have substantially the same pixel structure as the first color pixel area PX(R).

Next, a liquid crystal display device according to an exemplary embodiment of the present invention will be described with reference to FIG. 38.

Figure 38:
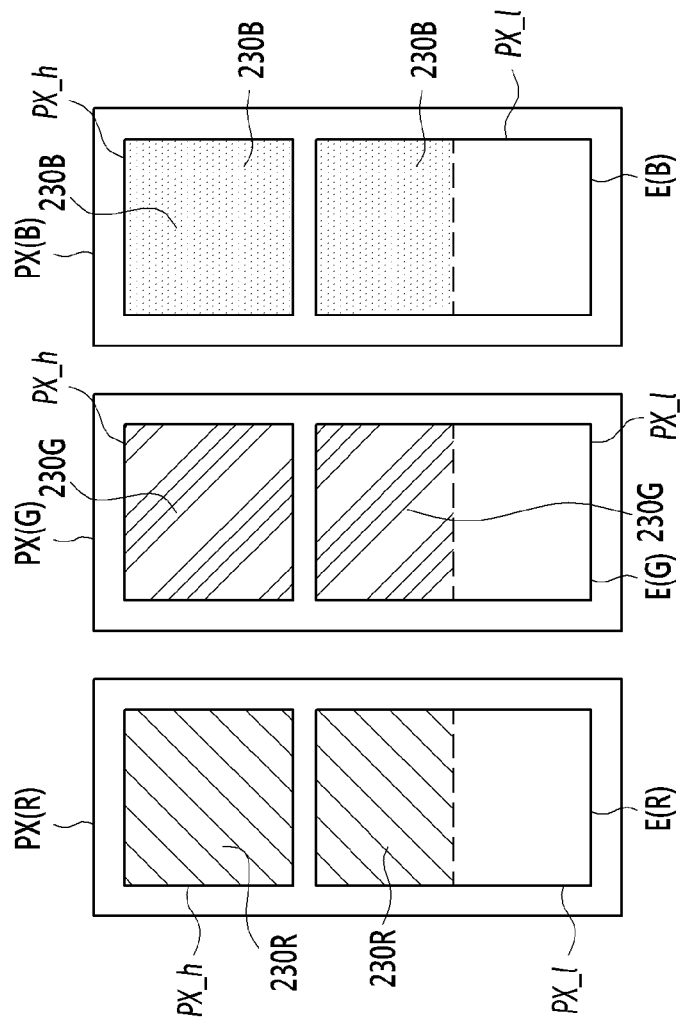
FIG. 38 is a top plan view illustrating a liquid crystal display device according to an exemplary embodiment of the present invention.

Since the liquid crystal display device according to the exemplary embodiment of the present invention illustrated in FIG. 38 is substantially the same as the liquid crystal display device according to the exemplary embodiment of the present invention illustrated in FIG. 36 and FIG. 37, any repetitive description will be omitted. The present exemplary embodiment is different from the above exemplary embodiment in the positions of the transparent regions, and hereinafter, will be described in more detail.

FIG. 38 is a top plan view illustrating a liquid crystal display device according to an exemplary embodiment of the present invention.

The first color filter 230R is disposed in the first color pixel area PX(R). The first color pixel area PX(R) includes the first transparent region E(R) at which no first color filter (230R) is formed. The first color pixel area PX(R) may have a substantially quadrangular shape, and may include a first subpixel area PX_h and a second subpixel area PX_l. The first color filter 230R is disposed in the entire first subpixel area PX_h, and is disposed at a region of the second subpixel area PX_l. The first transparent region E(R) may display a white color, and although not shown, a transparent member may be disposed in the first transparent region E(R).

The second subpixel area PX_l may be divided into a first subregion and a second subregion, and the first color filter 230R and the first transparent region E(R) may be respectively disposed in the first subregion and the second subregion. The first subregion and the second subregion may be respectively disposed at an upper portion and a lower portion.

In other words, in the above exemplary embodiment of FIG. 36 and FIG. 37, in the second subpixel area PX_l, the first color filter 230R and the first transparent region E(R) are formed at the lower region and the upper region, while in the present exemplary embodiment, the positions thereof are switched.

The second color filter 230G is disposed in the second color pixel area PX(G). The second color pixel area PX(G) includes the second transparent region E(G) at which the second color filter 230G is not disposed. The third color filter 230B is disposed in the third color pixel area PX(B). The third color pixel area PX(B) includes the third transparent region E(B) at which the third color filter 230B is not disposed. The second transparent region E(G) and the third transparent region E(B) are formed at the second subregion of the second subpixel area PX_l of each of the second color pixel area PX(G) and the third color pixel area PX(B).

Next, a liquid crystal display device according to an exemplary embodiment of the present invention will be described with reference to FIG. 39.

Figure 39:
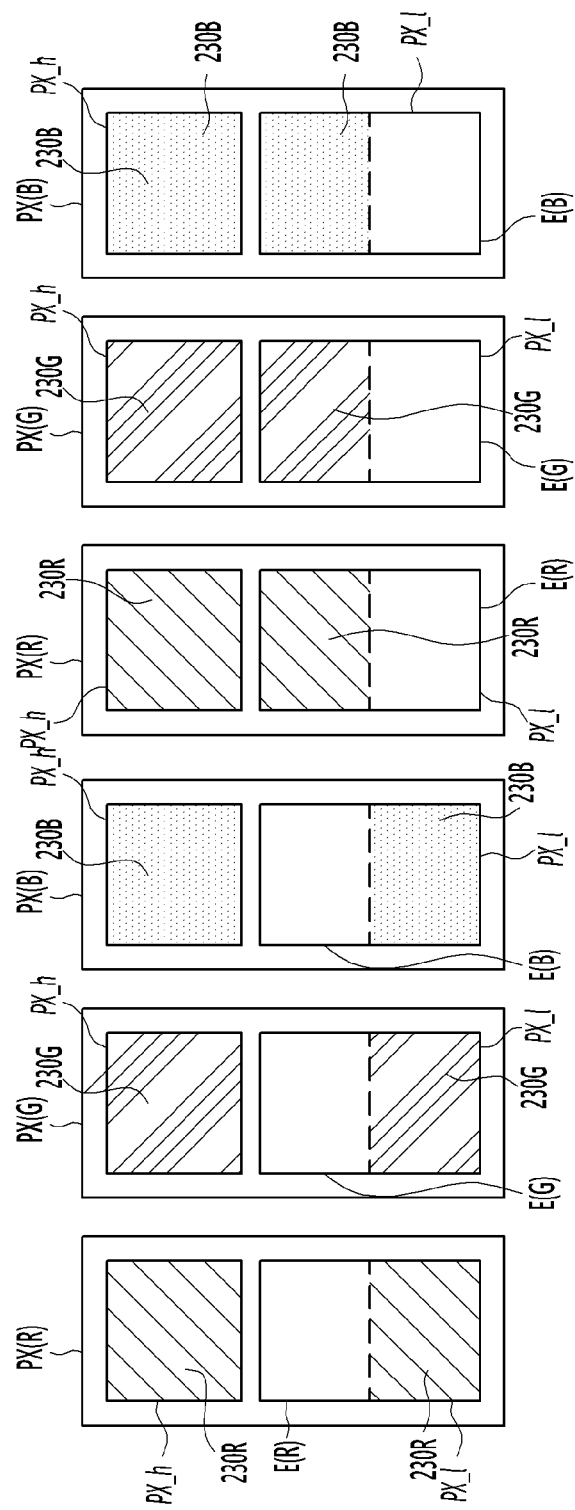
FIG. 39 is a top plan view illustrating a liquid crystal display device according to an exemplary embodiment of the present invention.

Since the liquid crystal display device according to the exemplary embodiment of the present invention illustrated in FIG. 39 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the positions of the transparent regions, and hereinafter, will be described in more detail.

FIG. 39 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

Each of the pixel areas PX(R), PX(G), and PX(B) may include a plurality of corresponding pixel areas. Positions of first transparent regions E(R) of adjacent first color pixel areas PX(R) are different from each other. The second subpixel area PX_l of each of the pixel areas PX(R), PX(G), and PX(B) may be divided into a first subregion and a second subregion, and the first subregion and the second subregion may be respectively disposed at an upper portion and a lower portion.

For example, a first transparent region E(R) of a left one of the two first color pixel areas PX(R) that are horizontally adjacent to each other overlaps with the first subregion of the second subpixel area PX_l, and a first transparent region E(R) of a right first color pixel area PX(R) overlaps with the second subregion of the second subpixel area PX_l.

Positions of second transparent regions E(G) of adjacent second color pixel areas PX(G) are different from each other, and positions of third transparent regions E(B) of the adjacent third color pixel areas PX(B) are different from each other.

Next, a liquid crystal display device according to an exemplary embodiment of the present invention will be described with reference to FIG. 40.

Figure 40:
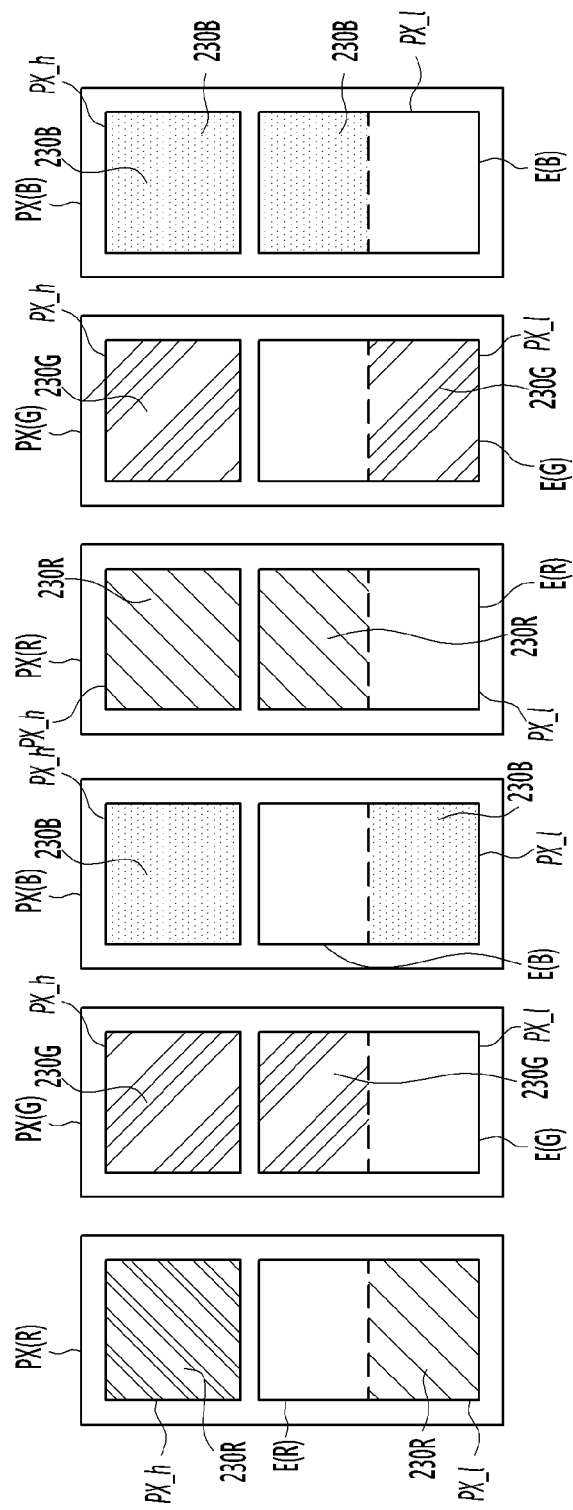
FIG. 40 is a top plan view illustrating a liquid crystal display device according to an exemplary embodiment of the present invention.

Since the liquid crystal display device according to the exemplary embodiment of the present invention illustrated in FIG. 40 is substantially the same as the liquid crystal display device according to the exemplary embodiment of the present invention illustrated in FIG. 39, any repetitive description will be omitted. The present exemplary embodiment is different from the above exemplary embodiment in the positions of the transparent regions, and hereinafter, will be described in more detail.

FIG. 40 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

Each of the pixel areas PX(R), PX(G), and PX(B) may include a plurality of corresponding pixel areas. The second color pixel area PX(G) is adjacent to the first color pixel area PX(R), and positions of the first transparent region E(R) of the first color pixel area PX(R) and the second transparent region E(G) of the second color pixel area PX(G) are different from each other. For example, the first transparent region E(R) of the first color pixel area PX(R) is disposed at the first subregion of the second subpixel area PX_l, and the second transparent region E(G) of the second color pixel area PX(G) that is adjacent to the first color pixel area PX(R) is disposed in the second subregion of the second subpixel area PX_l. In the second subpixel area PX_l, the first subregion and the second subregion are respectively disposed at the upper portion and the lower portion.

Similarly, the third color pixel area PX(B) is adjacent to the second color pixel area PX(G), and positions of the second transparent region E(G) of the second color pixel area PX(G) and the third transparent region E(B) of the third color pixel area PX(B) are different from each other. For example, the second transparent region E(G) of the second color pixel area PX(G) is disposed at the second subregion of the second subpixel area PX_l, and the third transparent region E(B) of the third color pixel area PX(B) that is adjacent to the second color pixel area PX(G) is disposed at the first subregion of the second subpixel area PX_l.

Further, positions of first transparent regions E(R) of adjacent first color pixel areas PX(R) are different from each other. For example, a first transparent region E(R) of a left one of the two first color pixel areas PX(R) that are horizontally adjacent to each other is disposed in the first subregion of the second subpixel area PX_l, and a first transparent region E(R) of a right first color pixel area PX(R) is disposed in the second subregion of the second subpixel area PX_l.

Positions of second transparent regions E(G) of adjacent second color pixel areas PX(G) are different from each other, and positions of third transparent regions E(B) of the adjacent third color pixel areas PX(B) are different from each other.

Next, a liquid crystal display device according to an exemplary embodiment of the present invention will be described with reference to FIG. 41.

Figure 41:
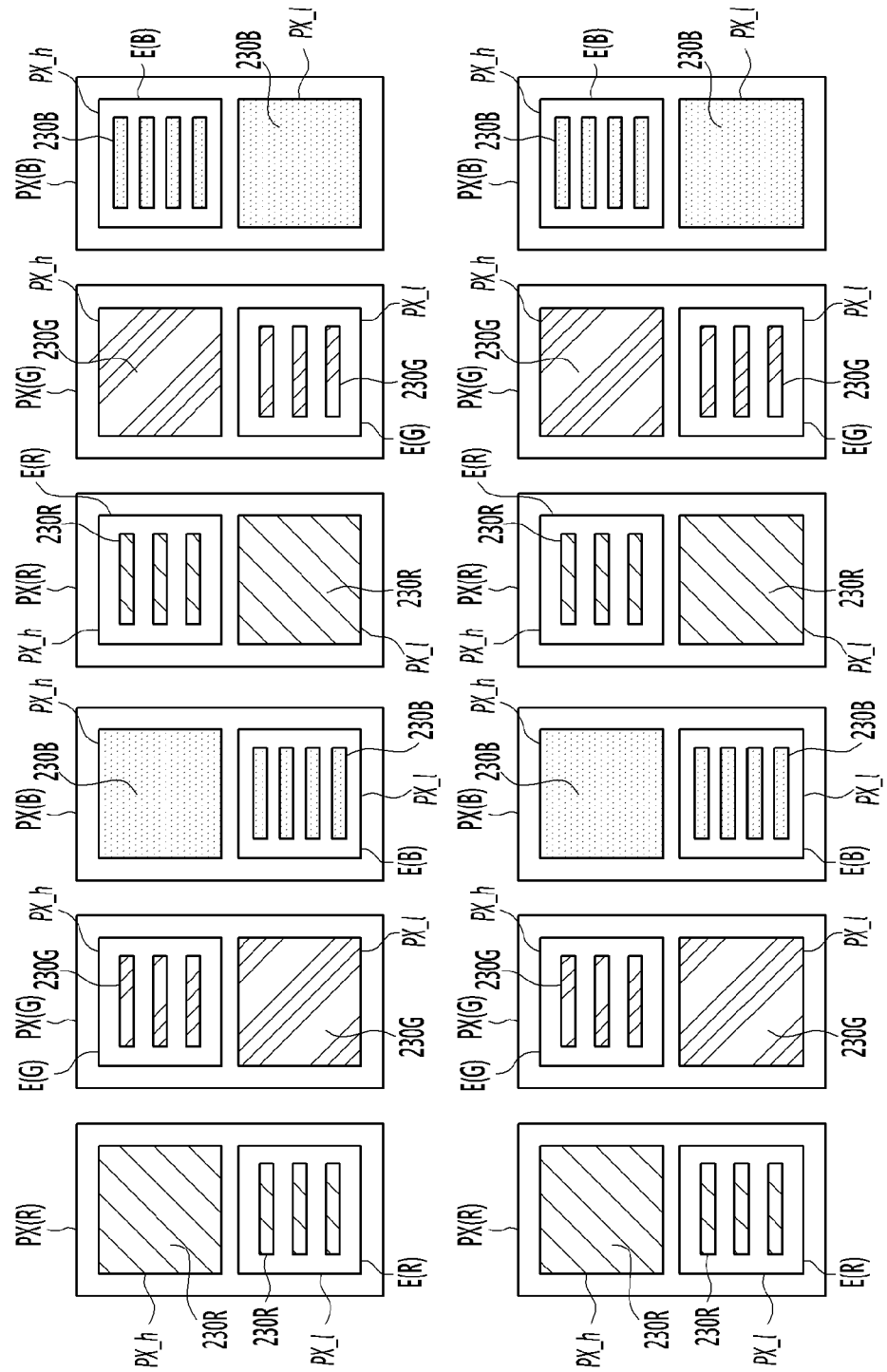
FIG. 41 is a top plan view illustrating a liquid crystal display device according to an exemplary embodiment of the present invention.

Since the liquid crystal display device according to the exemplary embodiment of the present invention illustrated in FIG. 41 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the shapes and positions of the transparent regions, and hereinafter, will be described in more detail.

FIG. 41 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the first transparent region E(R), the second transparent region E(G), and the third transparent region E(B).

Each of the pixel areas PX(R), PX(G), and PX(B) may be formed substantially in a quadrangular shape, and may include the first subpixel area PX_h and the second subpixel area PX_l. Each of the color filters 230R, 230G, and 230B is disposed in the entire first subpixel area PX_h, and is disposed at a region of the second subpixel area PX_l. Each of the transparent regions E(R), E(G), and E(B) may display a white color, and although not shown, a transparent member may be disposed at each of the transparent regions E(R), E(G), and E(B).

The first subpixel areas PX_h and the second subpixel areas PX_l of adjacent pixel areas PX(R), PX(G), and PX(B) may be diagonally disposed. For example, the first subpixel area PX_h and the second subpixel area PX_l of the first color pixel area PX(R) may be respectively disposed at the upper region and the lower region. The first subpixel area PX_h and the second subpixel area PX_l of the second color pixel area PX(G) that is adjacent to the first color pixel area PX(R) may be respectively disposed at the lower region and the upper region. As a result, the first subpixel areas PX_h of each of the pixel areas PX(R), PX(G), and PX(B) may be disposed in a zigzag form, and the second subpixel areas PX_l may also be disposed in the zigzag form.

The second subpixel areas PX_l disposed at the transparent regions E(R), E(G), and E(B) may be visible as stripes. In the present exemplary embodiment, a specific pattern can be prevented from being displayed by disposing the second subpixel area PX_l disposed at the transparent regions E(R), E(G), and E(B) in the zigzag form.

Each of the color filters 230R, 230G, and 230B may be formed such that at least one of the color filters 230R, 230G, and 230B has a bar shape. In the second subpixel area PX_l, the transparent regions E(R), E(G), and E(B) are respectively formed to have such a shape so as to surround the color filters 230R, 230G, and 230B. For example, in the second subpixel area PX_l of the first color pixel area PX(R), the first color filter 230R may be formed to have a shape of three bars that are separated from each other. The first transparent region E(R) is generally formed to have a quadrangular shape excluding a portion at which the first color filter 230R is disposed.

The color filters 230R, 230G, and 230B formed at the second subpixel area PX_l of each of the pixel areas PX(R), PX(G), and PX(B) may have different sizes. For example, a first color filter 230R and a second color filter 230G, each of which has three bars, may be formed in the second subpixel area PX_l of the first color pixel area PX(R) and the first subpixel area PX_h of the second color pixel area PX(G), and a third color filter 230B having a shape of four bars may be formed in the second subpixel area PX_l of the third color pixel area PX(B). In this case, the bars of each of the color filters 230R, 230G, and 230B may be formed to have the same size. However, the present invention is not limited thereto. For example, the bars of each of the color filters 230R, 230G, and 230B may be formed to have different sizes, thereby adjusting areas of the color filters 230R, 230G, and 230B formed in the second subpixel area PX_l of each of the pixel areas PX(R), PX(G), and PX(B).

The third color filter 230B may include a blue filter or a green filter. A yellowish phenomenon generated in the transparent regions E(R), E(G), and E(B) can be prevented by forming the blue filter or the green filter to have a relatively wide area.

Next, a liquid crystal display device according to an exemplary embodiment of the present invention will be described with reference to FIG. 42.

Figure 42:
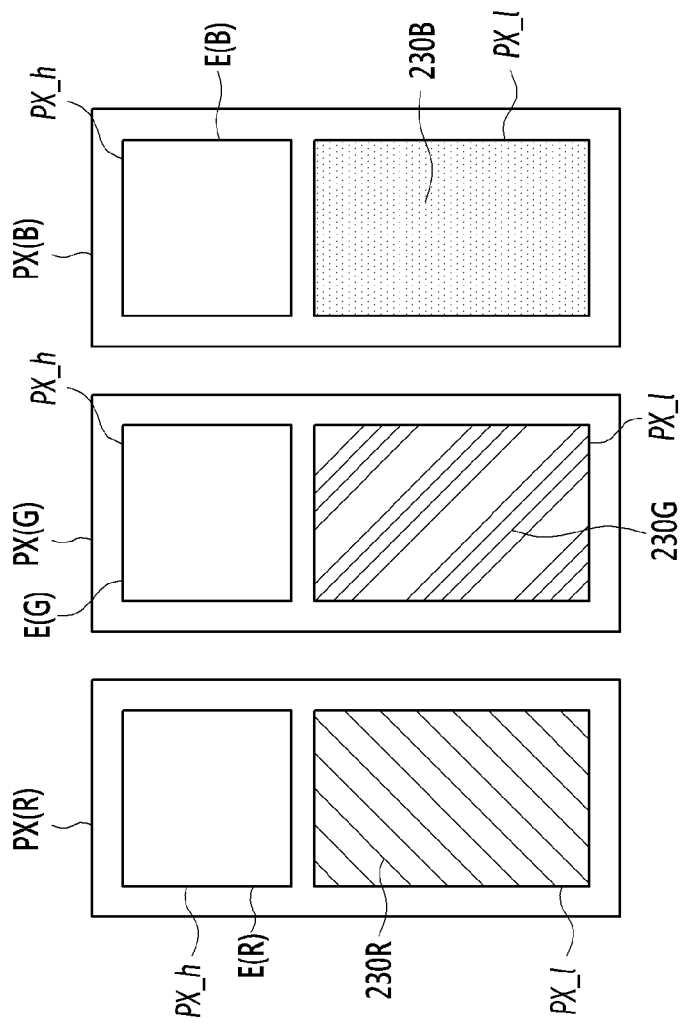
FIG. 42 is a top plan view illustrating a liquid crystal display device according to an exemplary embodiment of the present invention.

Since the liquid crystal display device according to the exemplary embodiment of the present invention illustrated in FIG. 42 is substantially the same as the liquid crystal display device according to the exemplary embodiment of the present invention illustrated in FIG. 27 to FIG. 29, any repetitive description will be omitted. The present exemplary embodiment is different from the above exemplary embodiment in the positions of the transparent regions, and hereinafter, will be described in more detail.

FIG. 42 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

Each of the pixel areas PX(R), PX(G), and PX(B) may be formed to have a substantially quadrangular shape. Each of the pixel areas PX(R), PX(G), and PX(B) may include a first subpixel area PX_h and a second subpixel area PX_l. The first subpixel area PX_h and the second subpixel area PX_l may be vertically arranged.

In each of the pixel areas PX(R), PX(G), and PX(B), the color filters 230R, 230G, and 230B are disposed in the entire second subpixel areas PX_l, and the transparent regions E(R), E(G), and E(B) are disposed in the entire first subpixel areas PX_h. However, the present invention is not limited thereto. For example, the transparent regions E(R), E(G), and E(B) may be formed at a portion of the first subpixel area PX_h, and the color filters 230R, 230G, and 230B may be formed at the remaining portion thereof.

In the present exemplary embodiment, each of the pixel areas PX(R), PX(G), and PX(B) is divided into two subpixel areas PX_h and PX_l, and the transparent regions E(R), E(G), and E(B) are disposed in the second subpixel area PX_l of the two subpixel areas PX_h and PX_l, which has a relatively strong magnitude of an electric field.

Next, a liquid crystal display device according to an exemplary embodiment of the present invention will be described with reference to FIG. 43.

Figure 43:
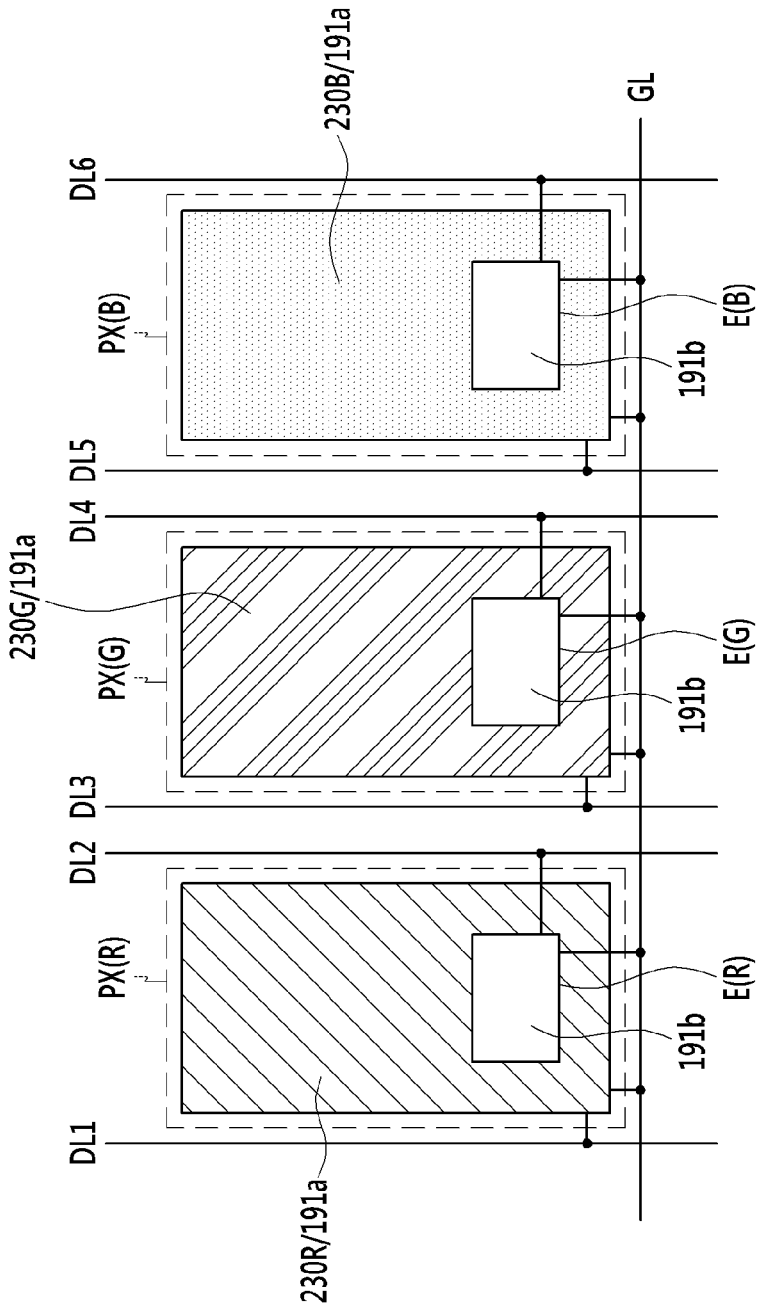
FIG. 43 is a top plan view illustrating a liquid crystal display device according to an exemplary embodiment of the present invention.

Since the liquid crystal display device according to the exemplary embodiment of the present invention illustrated in FIG. 43 is substantially the same as the liquid crystal display device according to the exemplary embodiment of the present invention illustrated in FIG. 1 and FIG. 2, the overlapping description thereof will not be provided. The present exemplary embodiment is different from the above exemplary embodiment in that the transparent regions E(R), E(G), and E(B) are driven by using an additional voltage, and hereinafter, will be described in more detail.

FIG. 43 is a top plan view illustrating a liquid crystal display device according to an exemplary embodiment of the present invention.

The first color filter 230R, the second color filter 230G, and the third color filter 230B are respectively disposed in the first color pixel area PX(R), the second color pixel area PX(G), and the third color pixel area PX(B). The first color pixel area PX(R), the second color pixel area PX(G), and the third color pixel area PX(B) respectively include the transparent regions E(R), E(G), and E(B) at which the color filters 230R, 230G, and 230B are not disposed.

The first transparent region E(R) may display a white color, and although not shown, a transparent member may be disposed in the first transparent region E(R).

The first subpixel electrode 191a and the second subpixel electrode 191b are disposed in each of the pixel areas PX(R), PX(G), and PX(B). The first subpixel electrode 191a is overlapped with the color filters 230R, 230G, and 230B, and the second subpixel electrode 191b is overlapped with the transparent regions E(R), E(G), and E(B).

A gate line GL mainly extends in the horizontal direction, and data lines DL1 to DL6 mainly extend in the vertical line. The data lines DL1 to DL6 are formed at opposite ends of the pixel areas PX(R), PX(G), and PX(B). For example, the first data line DL1 and the second data line DL2 are respectively formed at a left end and a right end of the first color pixel area PX(R). The third data line DL3 and the fourth data line DL4 are respectively formed at a left end and a right end of the second color pixel area PX(G). The fifth data line DL5 and the sixth data line DL6 are respectively formed at a left end and a right end of the third color pixel area PX(B).

The first subpixel electrode 191a of the first color pixel area PX(R) is connected to the gate line GL and the first data line DL1, and the second subpixel electrode 191b thereof is connected to the gate line GL and the second data line DL2. The first subpixel electrode 191a of the second color pixel area PX(G) is connected to the gate line GL and the third data line DL3, and the second subpixel electrode 191b thereof is connected to the gate line GL and the fourth data line DL4. The first subpixel electrode 191a of the third color pixel area PX(B) is connected to the gate line GL and the fifth data line DL5, and the second subpixel electrode 191b thereof is connected to the gate line GL and the sixth data line DL6. Although not shown, each of the subpixel electrodes 191a and 191b are connected to the gate line GL and the data lines DL1 to DL6 through thin film transistors.

As a result, the first subpixel electrode 191a and the second subpixel electrode 191b formed in each of the pixel areas PX(R), PX(G), and PX(B) are connected to the different data lines DL1 to DL6, and thus different data voltages may be applied thereto.

For example, a data voltage corresponding to a red gray, a data voltage corresponding to a green gray, and a data voltage corresponding to a blue gray may be respectively applied to the first data line DL1, the third data line DL3, and the fifth data line DL5. A data voltage corresponding to a white gray, i.e., a data voltage for adjusting the luminance, may be respectively applied to the second, fourth, and sixth data lines DL2, DL4, and DL6.

In the case that the transparent regions E(R), E(G), and E(B) are driven by using the same voltage as that used to drive the portions at which the color filters 230R, 230G, and 230B are formed, even when high luminance is not required, a white color may be displayed on the transparent regions E(R), E(G), and E(B), thereby displaying pale colors. In the present exemplary embodiment, the white pattern portion can be selectively driven only when the high luminance is required, by driving the transparent regions E(R), E(G), and E(B) independently of the portions at which the color filters 230R, 230G, and 230B are formed, thereby preventing pale colors of the pixel areas PX(R), PX(G), and PX(B) from being displayed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 3: liquid crystal layer | 110: first substrate |
| 121: gate line | 131: storage electrode line |
| 171: data line | 191: pixel electrode |
| 191h: first subpixel electrode | 191l: second subpixel electrode |
| 210: second substrate | 220: light blocking member |
| 230R: first color filter | 230G: second color filter |
| 230B: third color filter | 500: light source |
| 600: laser | PX(R): first color pixel area |
| PX(G): second color pixel area | PX(B): third color pixel area |
| E(R): first transparent region | |
| E(G): second transparent region | |
| E(B): third transparent region | |

What is claimed is:

1. A liquid crystal display device comprising:
   a first color pixel area, a second color pixel area, and a third color pixel area;
   a first substrate and a second substrate;
   a first color filter disposed in the first color pixel area on the first substrate or the second substrate;
   a second color filter disposed in the second color pixel area on the first substrate or the second substrate;
   a third color filter disposed in the third color pixel area on the first substrate or the second substrate; and
   a liquid crystal layer disposed between the first substrate and the second substrate,
   wherein the first color pixel area includes a first transparent region from which the first color filter is absent, and
   a ratio of the first transparent region of the first color pixel area to the first color pixel area is in a range of $1/1000$ to $1/2$, inclusive.

2. The liquid crystal display device of claim 1, wherein the first transparent region displays white color.

3. The liquid crystal display device of claim 1, further comprising
an overcoat disposed on the first color filter, the second color filter, the third color filter, and the first transparent region.

4. The liquid crystal display device of claim 1, further comprising
a transparent member disposed in the first transparent region.

5. The liquid crystal display device of claim 1, wherein the second color filter and the third color filter are disposed in the first transparent region.

6. The liquid crystal display device of claim 5, wherein, in the first transparent area, the second color filter is disposed adjacent to at least a part of the third color filter, and the first color filter is disposed adjacent to at least a part of the second color filter.

7. The liquid crystal display device of claim 1, further comprising:
a pixel electrode formed in each of the first, second, and third color pixel areas,
wherein the pixel electrode is formed to have a shape obtained by connecting two first parallelograms arranged symmetrically to each other, and
the first transparent region is in the shape of a second parallelogram having at least one side that is parallel to a side of either one of the two first parallelograms.

8. The liquid crystal display device of claim 7, wherein the first transparent region overlaps with an upper right portion of the pixel electrode.

9. The liquid crystal display device of claim 7, wherein the first transparent region overlaps with a lower portion of the pixel electrode.

10. The liquid crystal display device of claim 7, wherein the first transparent region is formed of two third parallelograms including sides that are parallel with sides of the two first parallelograms.

11. The liquid crystal display device of claim 10, wherein the first transparent region overlaps with a right portion of the pixel electrode.

12. The liquid crystal display device of claim 1, wherein the first, second, and third color pixel areas include a plurality of domains, and
the first transparent region overlaps with at least one of the plurality of domains.

13. The liquid crystal display device of claim 12, further comprising:
a plurality of the first, second, and third color pixel areas,
wherein the first transparent region is disposed at different domains in an adjacent first color pixel area.

14. The liquid crystal display device of claim 13, wherein the plurality of domains are vertically or horizontally disposed, or are disposed in a matrix form.

15. The liquid crystal display device of claim 1, wherein the first color pixel area is adjacent to the second color pixel area, and
the second color pixel area includes a second transparent region at which the second color filter is absent.

16. The liquid crystal display device of claim 15, wherein the first transparent region is disposed at a first domain and a second domain of the first color pixel area, and the second transparent region is disposed at a third domain and a fourth domain of the second color pixel area.

17. The liquid crystal display device of claim 1, further comprising
a pixel electrode formed in the first color pixel area,
wherein the pixel electrode includes a first subpixel electrode that overlaps with the first color filter, and
a second subpixel electrode that overlaps with the first transparent region.

18. The liquid crystal display device of claim 17, wherein different data voltages are applied to the first subpixel electrode and the second subpixel electrode.

19. The liquid crystal display device of claim 1, wherein the first color is one of red, green, and blue.

20. The liquid crystal display device of claim 1, wherein the second color pixel area includes a second transparent region from which the second color filter is absent, or
the third color pixel area includes a third transparent region at which the third color filter is not disposed.

21. A liquid crystal display device comprising:
a first color pixel area, a second color pixel area, and a third color pixel area;
a first substrate and a second substrate;
a first color filter disposed in the first color pixel area on the first substrate or the second substrate;
a second color filter disposed in the second color pixel area on the first substrate or the second substrate;
a third color filter disposed in the third color pixel area on the first substrate or the second substrate; and
a liquid crystal layer disposed between the first substrate and the second substrate,
wherein the first color pixel area includes a first transparent region from which the first color filter is absent,
wherein the second color filter is disposed in the first transparent region.

22. The liquid crystal display device of claim 21, wherein the third color filter is further disposed in the first transparent region, and
in the first transparent area, the second color filter is disposed adjacent to at least a part of the third color filter, while the first color filter is disposed adjacent to at least a part of the second color filter.

23. The liquid crystal display device of claim 21, wherein the second color pixel area includes a second transparent region from which the second color filter is absent, and
the first color filter is disposed in the second transparent region.

24. The liquid crystal display device of claim 23, wherein the first color is red and the second color is green.

25. The liquid crystal display device of claim 23, wherein the first color is red and the second color is blue.

26. The liquid crystal display device of claim 23, wherein the first color is green and the second color is blue.

27. The liquid crystal display device of claim 21, wherein the second color pixel area includes a second transparent region from which the second color filter is absent,
the third color filter is disposed in the second transparent region,
the third color pixel area includes a third transparent region at which the third color filter is not disposed, and
the first color filter is disposed in the third transparent region.

28. The liquid crystal display device of claim 27, wherein the first color is red, the second color is green, and the third color is blue.

29. The liquid crystal display device of claim 21, wherein a ratio of the first transparent region of the first color pixel area to the first color pixel area is in a range of 1/1000 to 1/2, inclusive.

30. The liquid crystal display device of claim 21, further comprising
a white pixel area, wherein at least one of the first color filter, the second color filter, and the third color filter are disposed in the white pixel area.

31. The liquid crystal display device of claim 30, wherein the second color pixel area includes a second transparent region from which the second color filter is absent, and
the second transparent region displays a white color.

32. The liquid crystal display device of claim 30, further comprising
an overcoat disposed on the first color filter, the second color filter, the third color filter, and the first transparent region.

33. The liquid crystal display device of claim 30, further comprising
a transparent member disposed in the white pixel areas.

34. The liquid crystal display device of claim 30, wherein the second color pixel area includes a second transparent region from which the second color filter is absent,
the second transparent region displays a white color,
the third color pixel area includes a third transparent region from which the third color filter is absent, and
at least one of the first color filter and the second color filter is disposed in the third transparent region.

* * * * *